(12) United States Patent
Porat

(10) Patent No.: US 8,879,472 B2
(45) Date of Patent: Nov. 4, 2014

(54) LONG TRAINING FIELD (LTF) FOR USE WITHIN SINGLE USER, MULTIPLE USER, MULTIPLE ACCESS, AND/OR MIMO WIRELESS COMMUNICATIONS

(75) Inventor: Ron Porat, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 137 days.

(21) Appl. No.: 13/454,010

(22) Filed: Apr. 23, 2012

(65) Prior Publication Data
US 2012/0269124 A1    Oct. 25, 2012

Related U.S. Application Data

(60) Provisional application No. 61/478,537, filed on Apr. 24, 2011, provisional application No. 61/493,577, filed on Jun. 6, 2011, provisional application No. 61/496,153, filed on Jun. 13, 2011, provisional application No. 61/501,239, filed on Jun. 26, 2011, provisional application No. 61/507,955, filed on Jul. 14, 2011, provisional application No. 61/512,363, filed on Jul. 27, 2011, provisional application No. 61/522,608, filed on Aug. 11, 2011, provisional application No. 61/542,602, filed on Oct. 3, 2011, provisional application No. 61/561,722, filed on Nov. 18, 2011, provisional application No. 61/577,597, filed on Dec. 19, 2011, provisional application No. 61/584,142, filed on Jan. 6, 2012, provisional application No. 61/592,514, filed on Jan. 30, 2012, provisional application No. 61/595,616, filed on Feb. 6, 2012, provisional application No. 61/598,293, filed on Feb. 13, 2012, provisional application No. 61/602,504, filed on Feb. 23, 2012.

(51) Int. Cl.
*H04W 4/00* (2009.01)
*H04J 3/24* (2006.01)
*H04J 3/16* (2006.01)
*H04J 3/22* (2006.01)
*H04W 72/12* (2009.01)
*H04W 84/12* (2009.01)
*H04L 27/26* (2006.01)

(52) U.S. Cl.
CPC .......... *H04W 72/1231* (2013.01); *H04W 84/12* (2013.01); *Y02B 60/50* (2013.01); *H04L 27/2666* (2013.01)
USPC ........... 370/328; 370/474; 370/465; 370/491; 370/338

(58) Field of Classification Search
USPC ......... 370/320–329, 470–474, 491, 500, 509, 370/513–515, 338, 465
See application file for complete search history.

(56) References Cited

U.S. PATENT DOCUMENTS 7,173,899 B1 * 2/2007 Rupp ............................ 370/208
7,436,758 B2 * 10/2008 Suh et al. ...................... 370/203
(Continued)

*Primary Examiner* — Benjamin H Elliott, IV
*Assistant Examiner* — Eric Nowlin
(74) *Attorney, Agent, or Firm* — Garlick & Markison; Shayne X. Short

(57) ABSTRACT

Long training field (LTF) for use within single user, multiple user, multiple access, and/or MIMO wireless communications. Classification of a signal may be performed using one or more LTF's therein. While such one or more LTF's may also be employed for performing functions such as channel estimation, channel characterization, etc., one or more particular characteristics of an LTF extracted from a received signal may also be employed to classify the signal as corresponding to one of a number of possible signal types. For example, such LTF-based classification may be used to classify the respective channel bandwidths associated with the signal (e.g., as being either 1 MHz or 2 MHz channel bandwidth). Generally, one or more LTF fields within one or more signals are employed for any of a number of additional uses beyond or in addition to such functions as channel estimation, channel characterization, etc.

20 Claims, 43 Drawing Sheets

(56) References Cited

U.S. PATENT DOCUMENTS

| | | | |
|---|---|---|---|
| 2002/0118730 A1* | 8/2002 | Svensson et al. | 375/150 |
| 2005/0180361 A1* | 8/2005 | Hansen et al. | 370/334 |
| 2005/0190786 A1* | 9/2005 | Jones et al. | 370/465 |
| 2005/0233709 A1* | 10/2005 | Gardner et al. | 455/101 |
| 2006/0251193 A1* | 11/2006 | Kopmeiners et al. | 375/345 |
| 2006/0252386 A1* | 11/2006 | Boer et al. | 455/101 |
| 2010/0027473 A1* | 2/2010 | Ghosh | 370/328 |
| 2010/0315952 A1* | 12/2010 | Pare et al. | 370/241 |
| 2010/0315953 A1* | 12/2010 | Pare et al. | 370/241 |
| 2011/0051747 A1* | 3/2011 | Schmidl et al. | 370/474 |

* cited by examiner

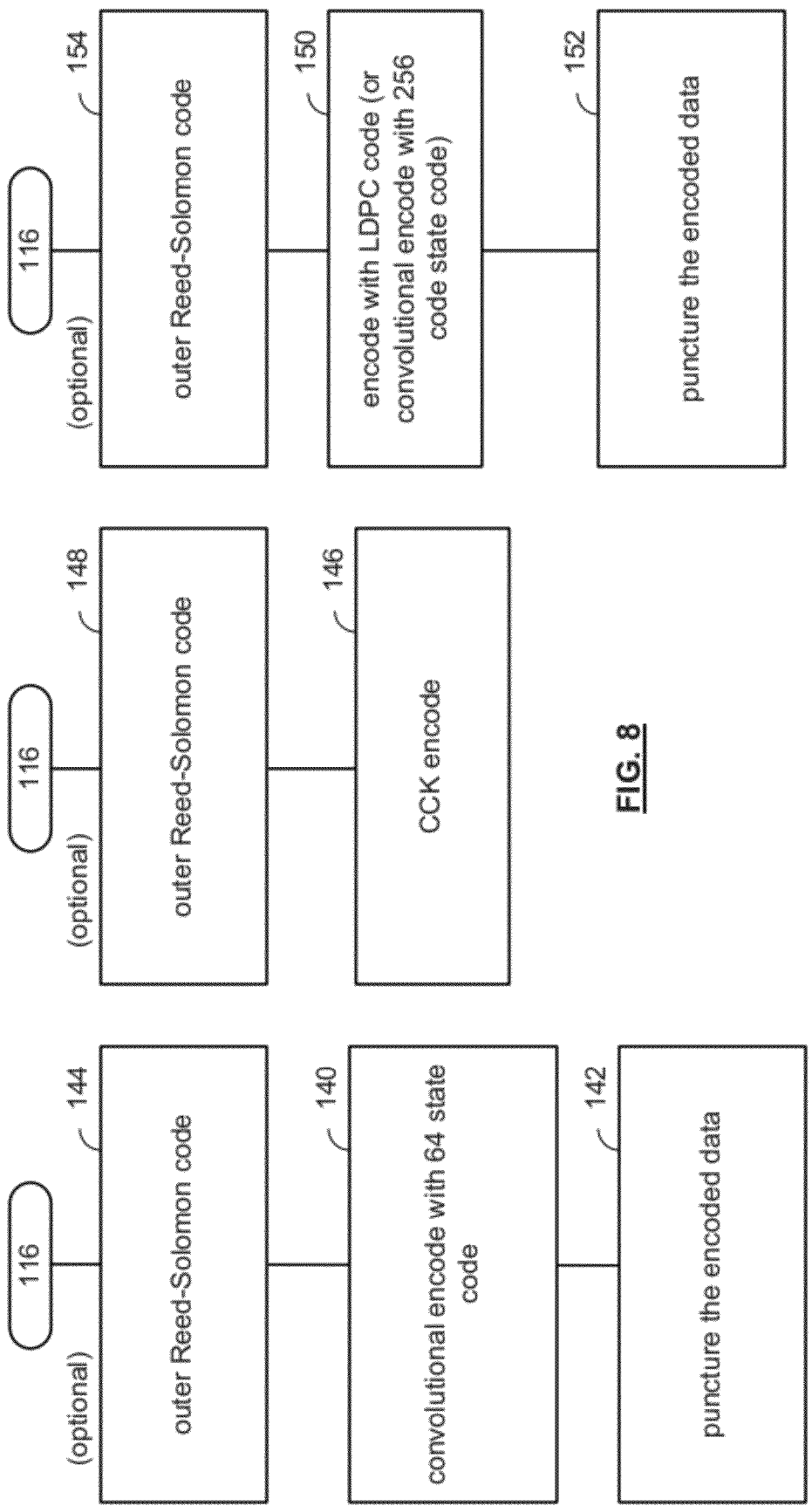

2 MHz: 1, 1, $LTF_{left}$, 0, $LTF_{right}$, −1, −1

4 MHz: $LTF_{left}$, 1, $LTF_{right}$, −1, −1, −1, 1
−1, 1, 1, −1, $LTF_{left}$, 1, $LTF_{right}$

8 MHz: $LTF_{left}$, 1, $LTF_{right}$, −1, −1, −1, 1, 1
−1, 1, −1, 1, 1, 1, −1, $LTF_{left}$, 1, $LTF_{right}$, 1, −1, 1, −1
1, −1, −1, 1, $LTF_{left}$, 1, $LTF_{right}$, −1, −1, −1, 1, 1
−1, 1, −1, 1, 1, 1, −1, $LTF_{left}$, 1, $LTF_{right}$

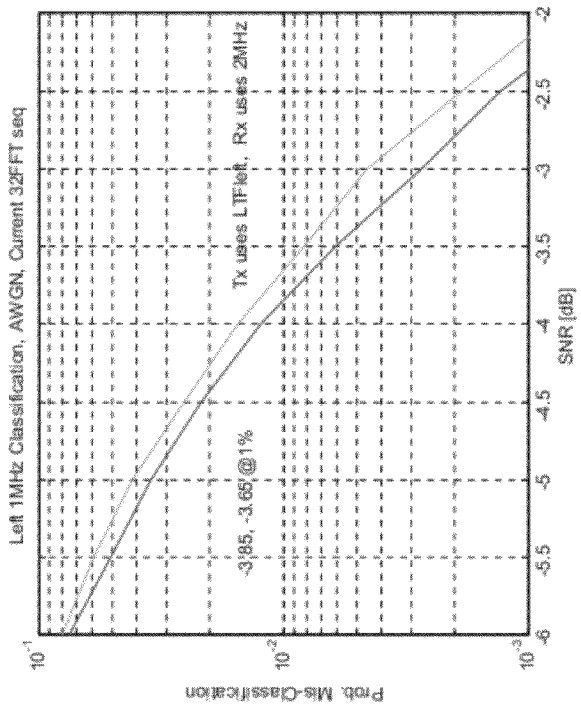
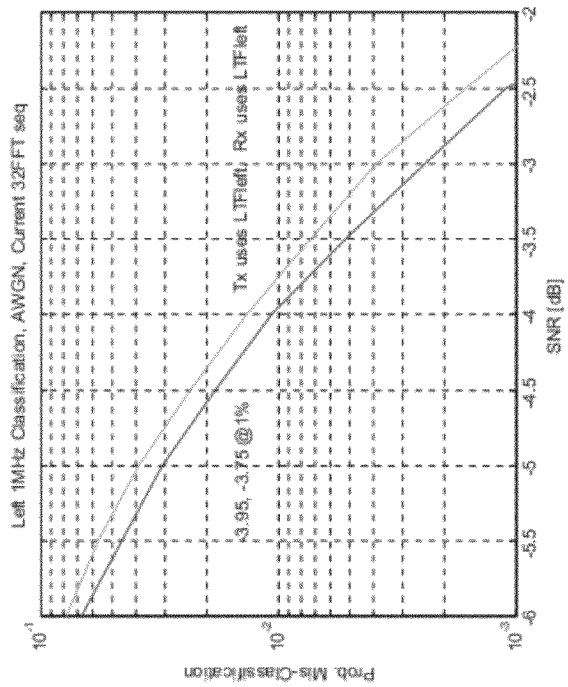
FIG. 27

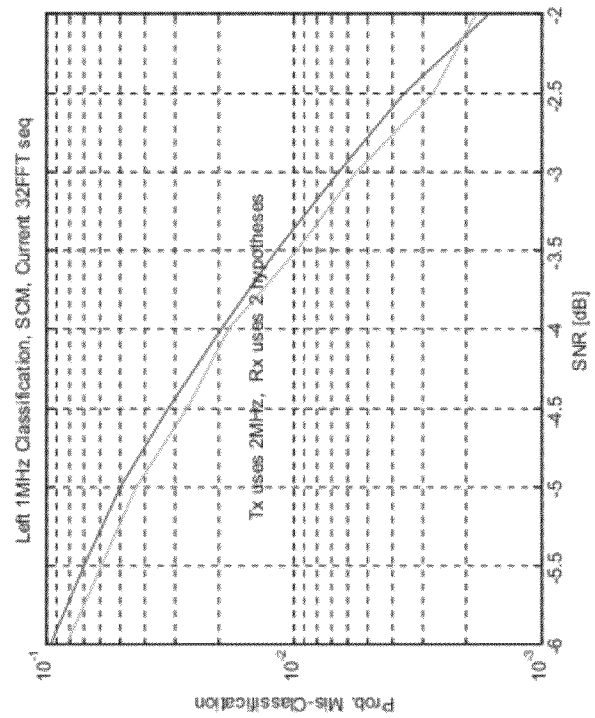
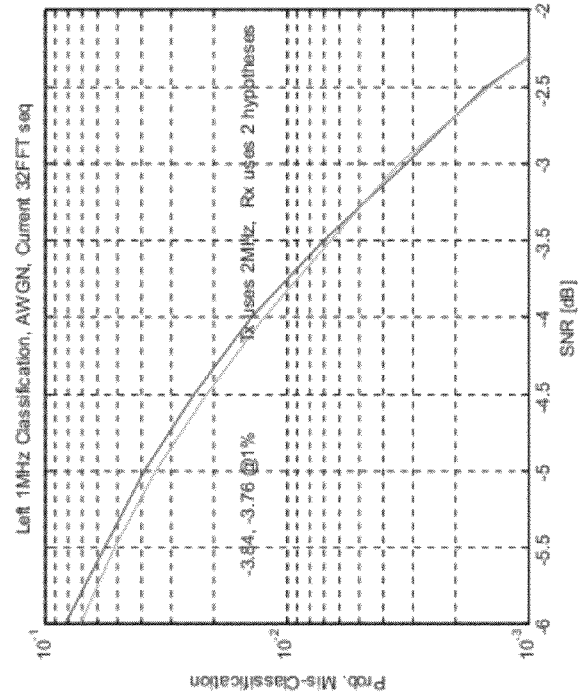
FIG. 31

3200

| | left most | 2 MHz sub-channel in 8 MHz | | right most |
| | | center left | center right | |
|---|---|---|---|---|
| left 1 MHz tones −28, −27 | 1, 1 or 0, 0 | 1, 1 or 1, −1 | 1, 1 or 0, 0 or −1, 1 | 1, 1 or 1, −1 |
| right 1 MHz tones 27, 28 | −1, −1 | −1, −1 or 0, 0 or 1, −1 | 1, −1 | −1, −1 or 0, 0 |

2 options only: all look like 2 MHz (1, 1, $LTF_{left}$, 0, $LTF_{right}$, −1, −1) with 28 tones or ($LTF_{left}$ or $LTF_{right}$, −1, −1) have 26 tones

Option 1

2 MHz
1, 1, $LTF_{left}$, 0, $LTF_{right}$, −1, −1

4 MHz
$LTF_{left}$, 1, $LTF_{right}$, −1, −1, 1
−1, 1, 1, 1, $LTF_{left}$, 1, $LTF_{right}$

8 MHz
$LTF_{left}$, 1, $LTF_{right}$, −1, −1, 1, 1, $LTF_{left}$, 1, $LTF_{right}$, −1, −1, 1, 1
−1, 1, −1, 1, 1, 1, 1, $LTF_{left}$, 1, $LTF_{right}$, −1, −1, −1, −1, 1, 1, $LTF_{left}$, 1, $LTF_{right}$

Option 2

2 MHz
1, 1, $LTF_{left}$, 0, $LTF_{right}$, −1, −1

4 MHz
$LTF_{left}$, 1, $LTF_{right}$, −1, −1, −1, 1
−1, 1, 1, −1, $LTF_{left}$, 1, $LTF_{right}$

8 MHz
$LTF_{left}$, 1, $LTF_{right}$, −1, −1, −1, 1, $LTF_{left}$, 1, $LTF_{right}$, −1, −1, 1, 1
1, −1, −1, 1, 1, 1, −1, $LTF_{left}$, 1, $LTF_{right}$, −1, −1, −1, 1, 1, $LTF_{left}$, 1, $LTF_{right}$

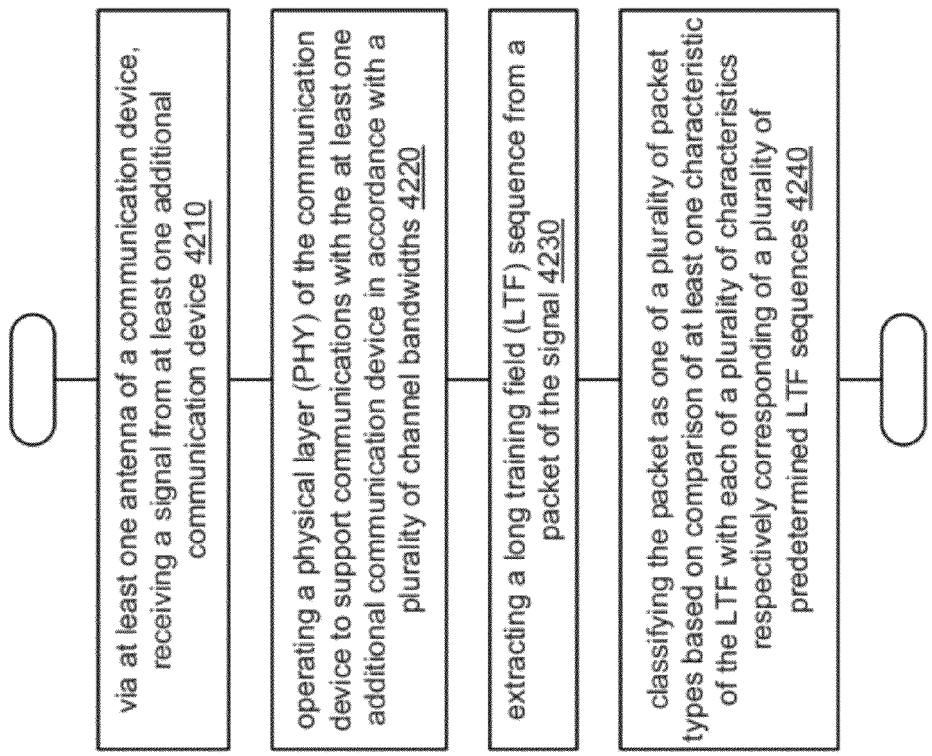

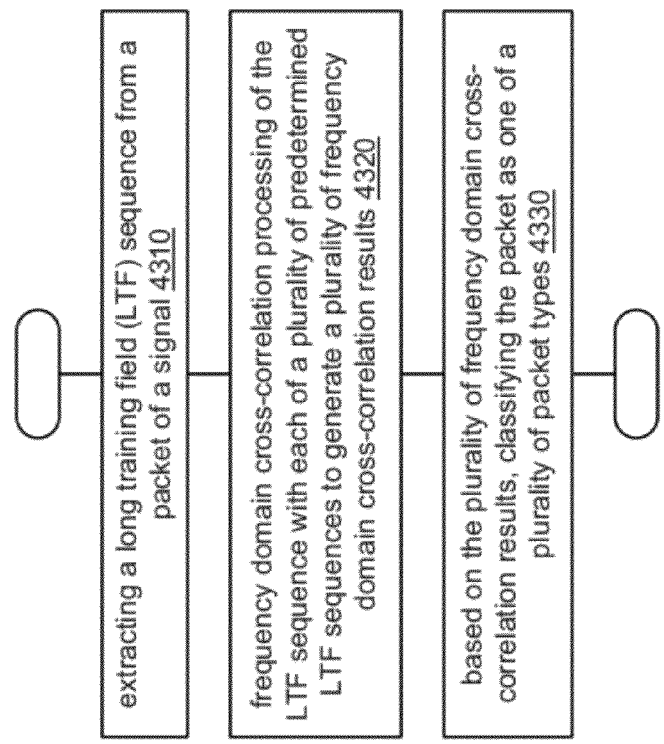

LONG TRAINING FIELD (LTF) FOR USE WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/478,537, entitled "Preamble for use within multiple user, multiple access, and/or MIMO wireless communications," filed Apr. 24, 2011.

2. U.S. Provisional Patent Application Ser. No. 61/493,577, entitled "Preamble for use within multiple user, multiple access, and/or MIMO wireless communications," filed Jun. 6, 2011.

3. U.S. Provisional Patent Application Ser. No. 61/496,153, entitled "Preamble for use within multiple user, multiple access, and/or MIMO wireless communications," filed Jun. 13, 2011.

4. U.S. Provisional Patent Application Ser. No. 61/501,239, entitled "Preamble for use within multiple user, multiple access, and/or MIMO wireless communications," filed Jun. 26, 2011.

5. U.S. Provisional Patent Application Ser. No. 61/507,955, entitled "Preamble for use within multiple user, multiple access, and/or MIMO wireless communications," filed Jul. 14, 2011.

6. U.S. Provisional Patent Application Ser. No. 61/512,363, entitled "Preamble for use within multiple user, multiple access, and/or MIMO wireless communications," filed Jul. 27, 2011.

7. U.S. Provisional Patent Application Ser. No. 61/522,608, entitled "Preamble for use within multiple user, multiple access, and/or MIMO wireless communications," filed Aug. 11, 2011.

8. U.S. Provisional Patent Application Ser. No. 61/542,602, entitled "Preamble for use within single user, multiple user, multiple access, and/or MIMO wireless communications," filed Oct. 3, 2011.

9. U.S. Provisional Patent Application Ser. No. 61/561,722, entitled "Preamble for use within single user, multiple user, multiple access, and/or MIMO wireless communications," filed Nov. 18, 2011.

10. U.S. Provisional Patent Application Ser. No. 61/577,597, entitled "Preamble for use within single user, multiple user, multiple access, and/or MIMO wireless communications," filed Dec. 19, 2011.

11. U.S. Provisional Patent Application Ser. No. 61/584,142, entitled "Preamble for use within single user, multiple user, multiple access, and/or MIMO wireless communications," filed Jan. 6, 2012.

12. U.S. Provisional Patent Application Ser. No. 61/592,514, entitled "Preamble for use within single user, multiple user, multiple access, and/or MIMO wireless communications," filed Jan. 30, 2012.

13. U.S. Provisional Patent Application Ser. No. 61/595,616, entitled "Preamble for use within single user, multiple user, multiple access, and/or MIMO wireless communications," filed Feb. 6, 2012.

14. U.S. Provisional Patent Application Ser. No. 61/598,293, entitled "Preamble for use within single user, multiple user, multiple access, and/or MIMO wireless communications," filed Feb. 13, 2012.

15. U.S. Provisional Patent Application Ser. No. 61/602,504, entitled "Preamble for use within single user, multiple user, multiple access, and/or MIMO wireless communications," filed Feb. 23, 2012.

Incorporation by Reference

The following U.S. Utility Patent Applications are hereby incorporated herein by reference in their entirety and made part of the present U.S. Utility Patent Application for all purposes:

1. U.S. Utility patent application Ser. No. 13/453,703, entitled
"Preamble for use within single user, multiple user, multiple access, and/or MIMO wireless communications," filed concurrently on Apr. 23, 2012, pending.

2. U.S. Utility patent application Ser. No. 13/453,998, entitled "Doppler adaptation using pilot patterns within single user, multiple user, multiple access, and/or MIMO wireless communications," filed concurrently on Apr. 23 2012, pending.

3. U.S. Utility patent application Ser. No. 13/454,021, entitled "Short training field (STF) for use within single user, multiple user, multiple access, and/or MIMO wireless communications," filed concurrently on Apr. 23, 2012, pending.

4. U.S. Utility Patent Application Serial No. 13/454,033, entitled "Device coexistence within single user, multiple user, multiple access, and/or MIMO wireless communications," filed concurrently on Apr. 23 2012, pending.

Incorporation by Reference

The following IEEE standards/draft IEEE standards are hereby incorporated herein by reference in their entirety and are made part of the present U.S. Utility Patent Application for all purposes:

1. IEEE Std 802.11™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, Sponsored by the LAN/MAN Standards Committee, IEEE Std 802.11™-2012, (Revision of IEEE Std 802.11-2007), 2793 total pages (incl. pp. i-xcvi, 1-2695).

2. IEEE Std 802.11n™-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11™-2007 as amended by IEEE Std 802.11k™-2008, IEEE Std 802.11r™-2008, IEEE Std 802.11y™-2008, and IEEE Std 802.11r™-2009), 536 total pages (incl. pp. i-xxxii, 1-502).

3. IEEE Draft P802.11-REVmb™/D12, November 2011 (Revision of IEEE Std 802.11™-2007 as amended by IEEE Std 802.11k™-2008, IEEE Std 802.11r™-2008, IEEE Std 802.11y™-2008, IEEE Std 802.11w™-2009, IEEE Std 802.11n™-2009, IEEE Std 802.11p™-2010, IEEE Std 802.11z™-2010, IEEE Std 802.11v™-2011, IEEE Std 802.11u™-2011, and IEEE Std 802.11s™-2011), "IEEE Standard for Information technology—Telecommunications and information exchange between systems—Local and metropolitan area networks—Specific requirements; Part 11: Wireless LAN Medium Access Control (MAC) and Physical Layer (PHY) Specifications," Prepared by the 802.11 Working Group of the LAN/MAN Standards Committee of the IEEE Computer Society, 2910 total pages (incl. pp. i-cxxviii, 1-2782).

4. IEEE P802.11ac™/D2.1, March 2012, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338).

5. IEEE P802.11ad™/D6.0, March 2012, (Draft Amendment based on IEEE P802.11REVmb D12.0), (Amendment to IEEE P802.11REVmb D12.0 as amended by IEEE 802.11ae D8.0 and IEEE 802.11aa D9.0), "IEEE P802.11ad™/D6.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," Sponsor: IEEE 802.11 Committee of the IEEE Computer Society, IEEE-SA Standards Board, 664 total pages.

6. IEEE Std 802.11ae™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11ae™-2012, (Amendment to IEEE Std 802.11™-2012), 52 total pages (incl. pp. i-xii, 1-38).

7. IEEE P802.11af™/D1.06, March 2012, (Amendment to IEEE Std 802.11REVmb™/D12.0 as amended by IEEE Std 802.11ae™/D8.0, IEEE Std 802.11aa™/D9.0, IEEE Std 802.11ad™/D5.0, and IEEE Std 802.11ac™/D2.0), "Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 140 total pages (incl. pp. i-xxii, 1-118).

BACKGROUND OF THE INVENTION

1. Technical Field of the Invention

The invention relates generally to communication systems; and, more particularly, it relates to effectuating long range and low rate wireless communications within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802, 11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIGS. 7-9 are diagrams illustrating various embodiments for encoding the scrambled data.

FIG. 26 illustrates an embodiment of LTF sequences (e.g., according to a current proposal).

FIG. 27 illustrates an embodiment of performance diagrams showing the probability of mis-classification as a function of signal to noise ratio (SNR).

FIG. 28, FIG. 29, FIG. 30, and FIG. 31 illustrate various alternative embodiments of performance diagrams showing the probability of mis-classification as a function of signal to noise ratio (SNR).

FIG. 32 illustrates an embodiment of different respective 2 MHz channels in 8 MHz.

FIG. 33 illustrates an embodiment contrasting of a first embodiment of LTF sequences (e.g., according to a current proposal) and a second embodiment of LTF sequences (e.g., according to an alternative proposal).

FIG. 41, FIG. 42, and FIG. 43 are diagrams illustrating embodiments of methods for operating one or more wireless communication devices.

DETAILED DESCRIPTION OF THE INVENTION

Figure 1:
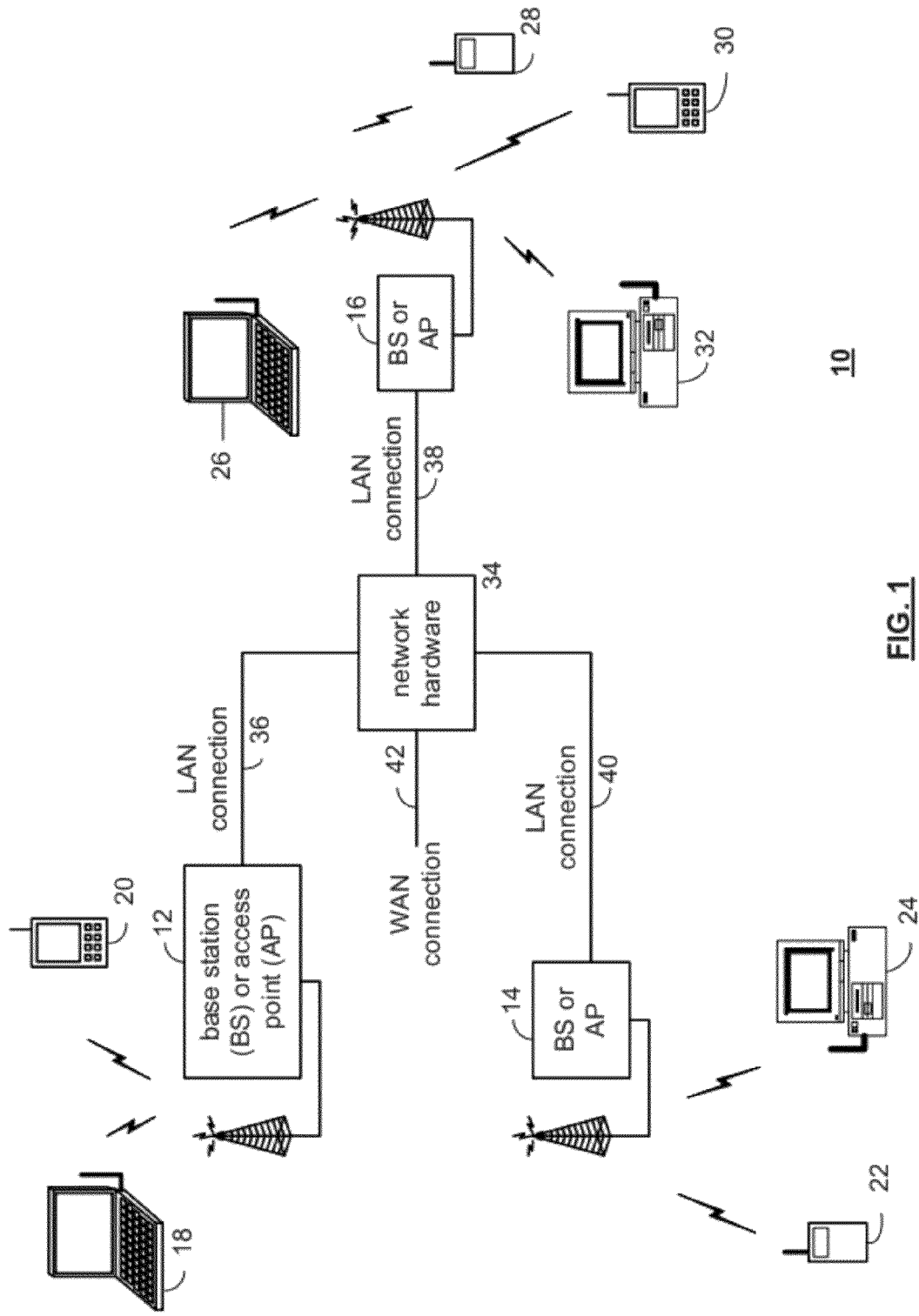
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
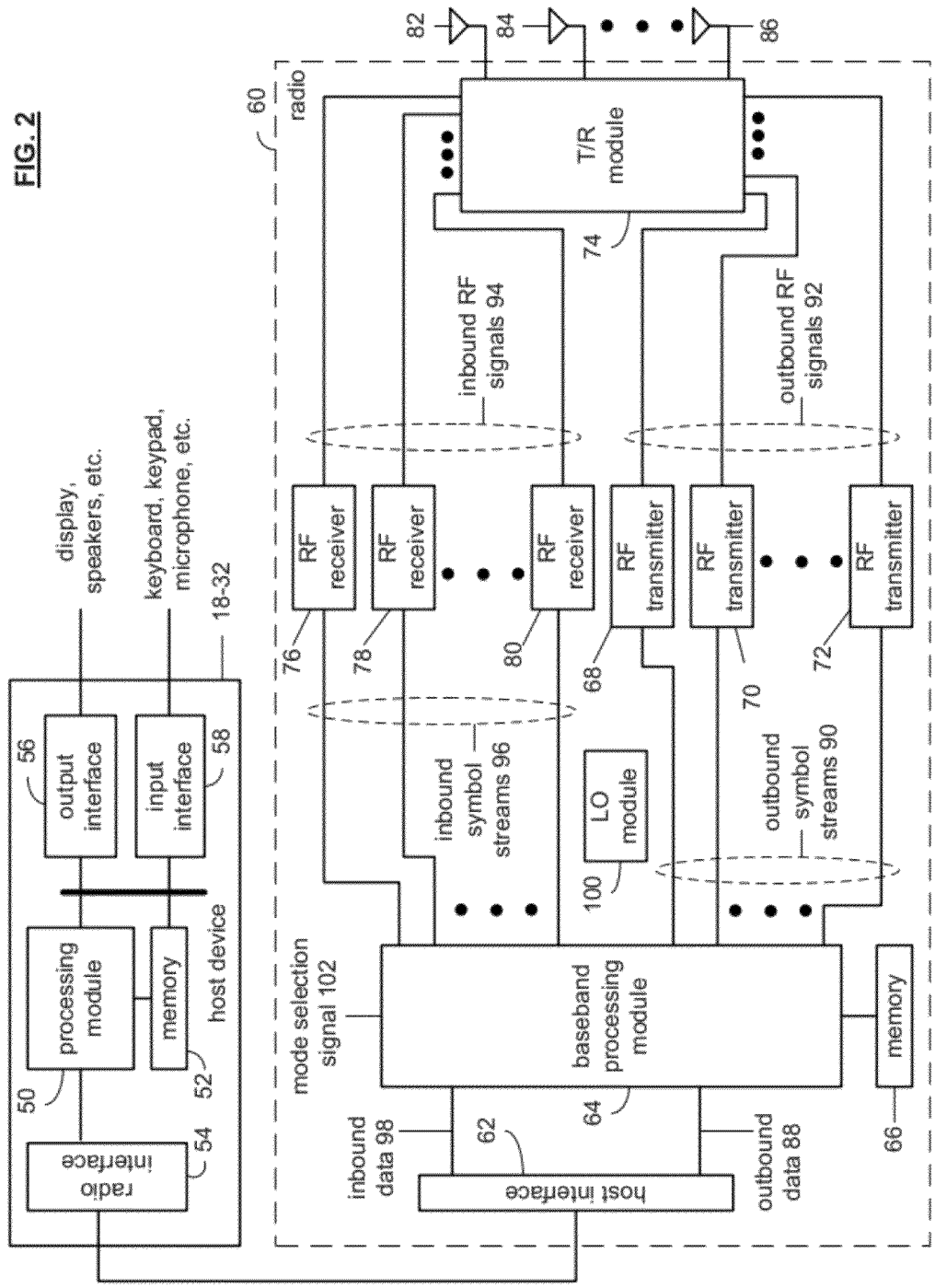
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per sub-carrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
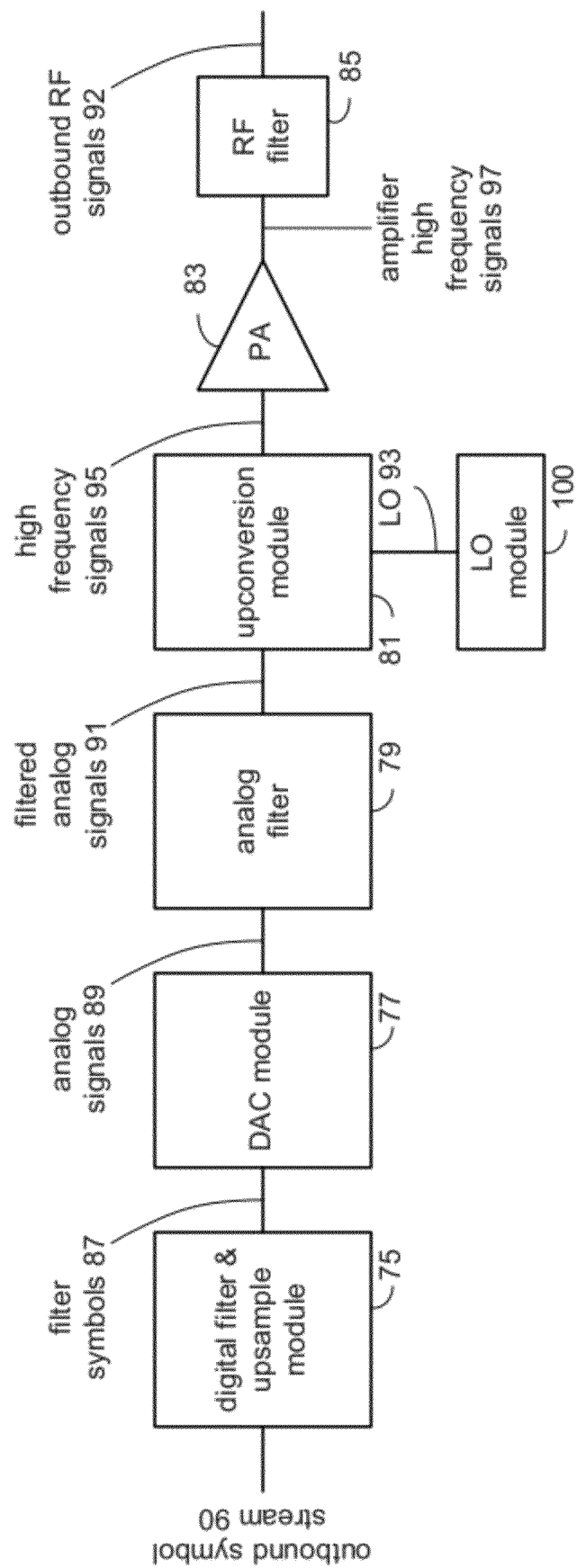
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
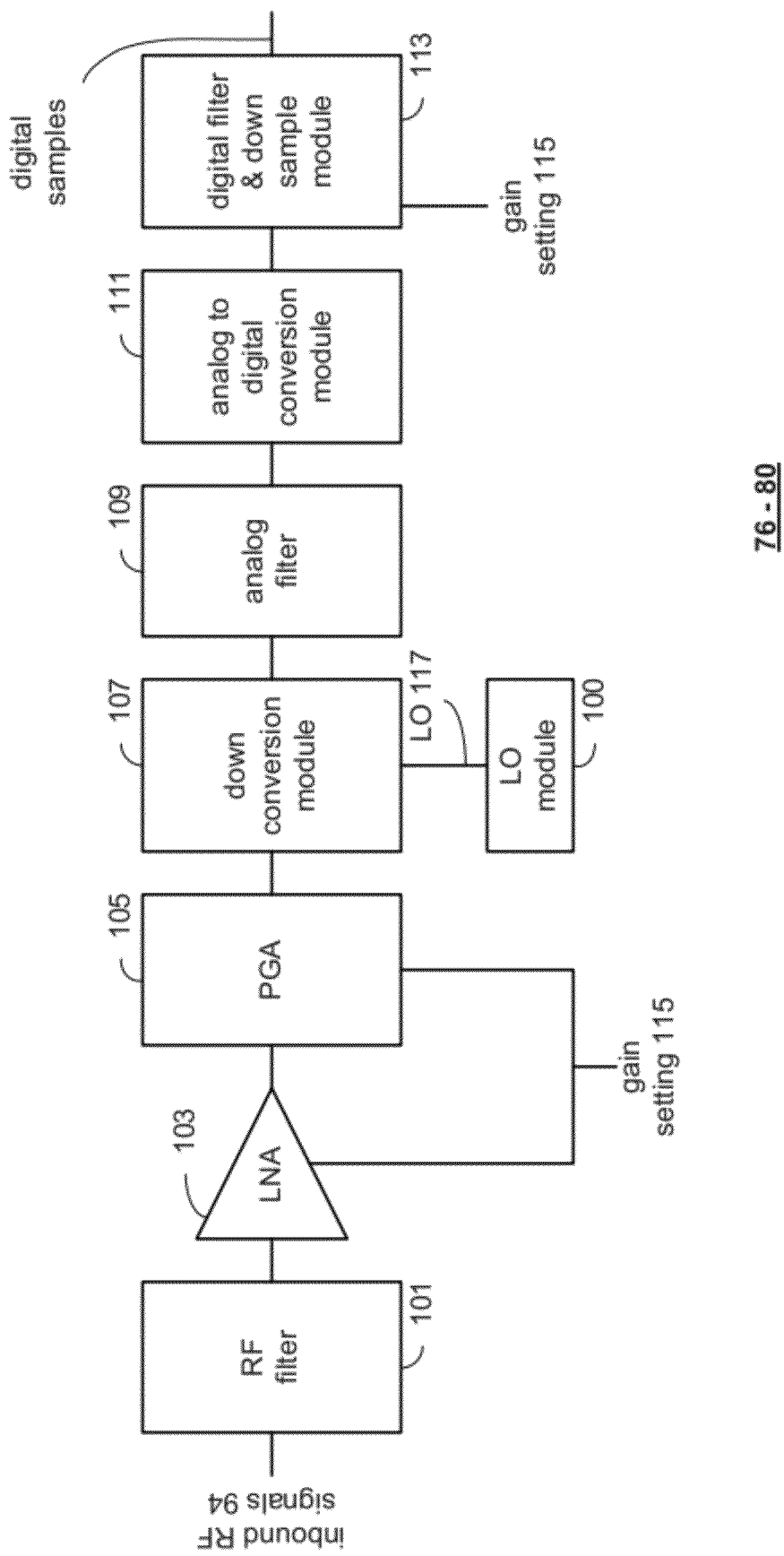
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
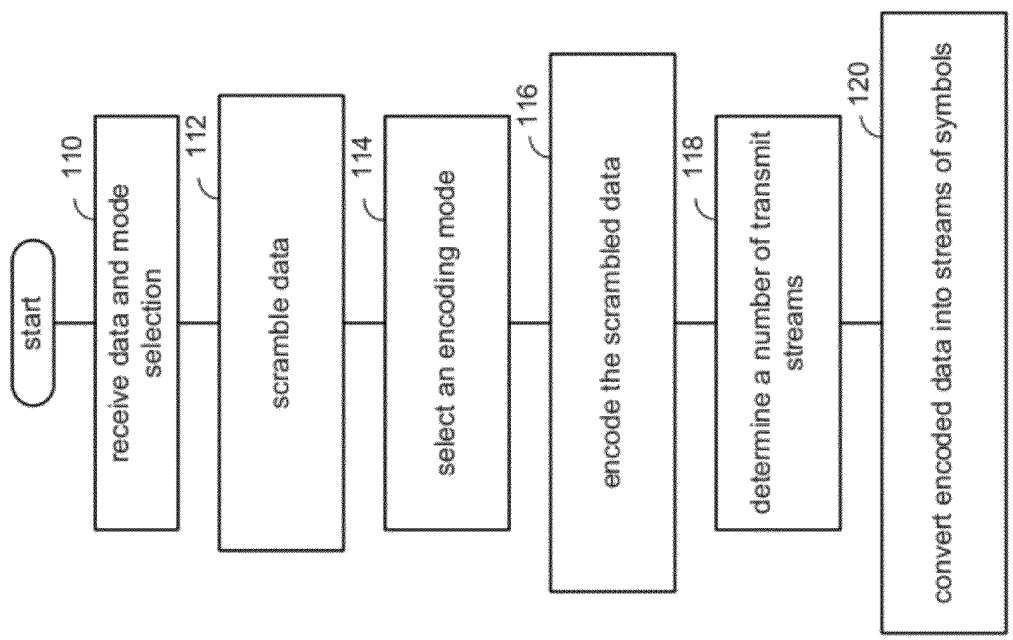
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
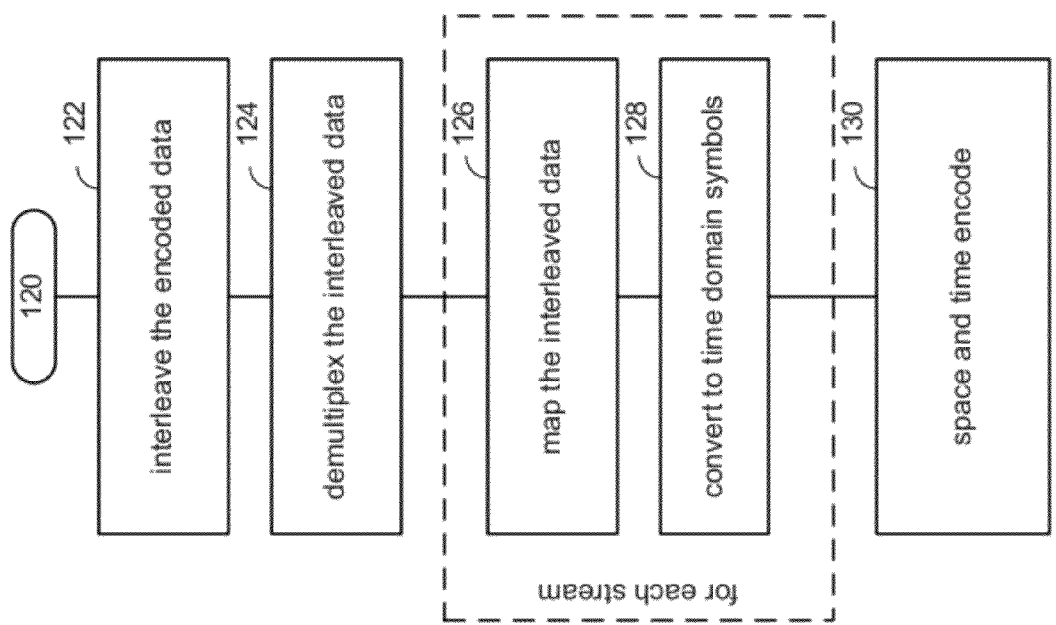
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and sub-carriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include 1/2, 2/3 and/or 3/4, or any rate as specified in tables 1-12. Note that, for a particular mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
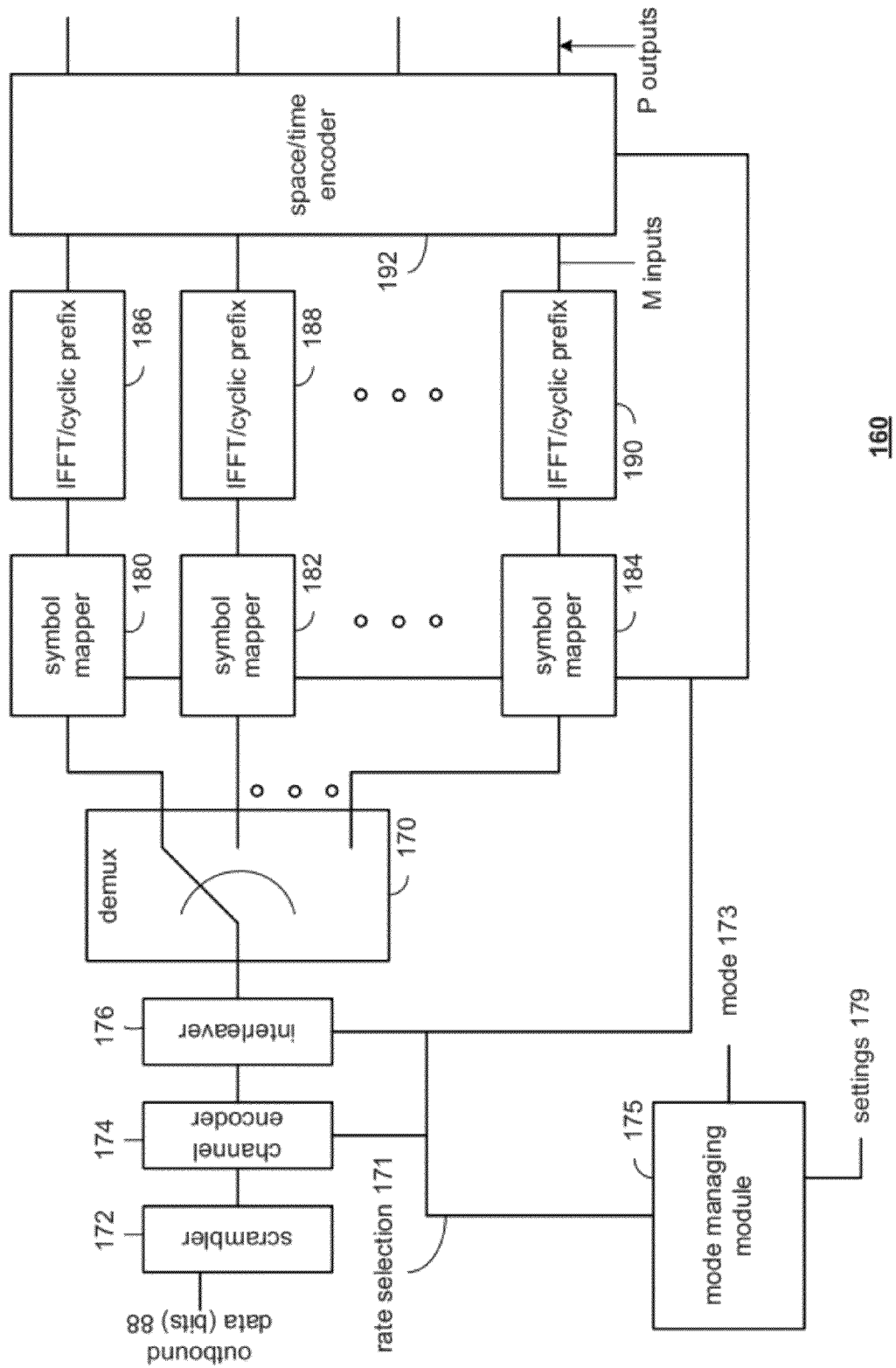
FIGS. 10A and 10B are diagrams illustrating embodiments of a radio transmitter.
Figure 10B:
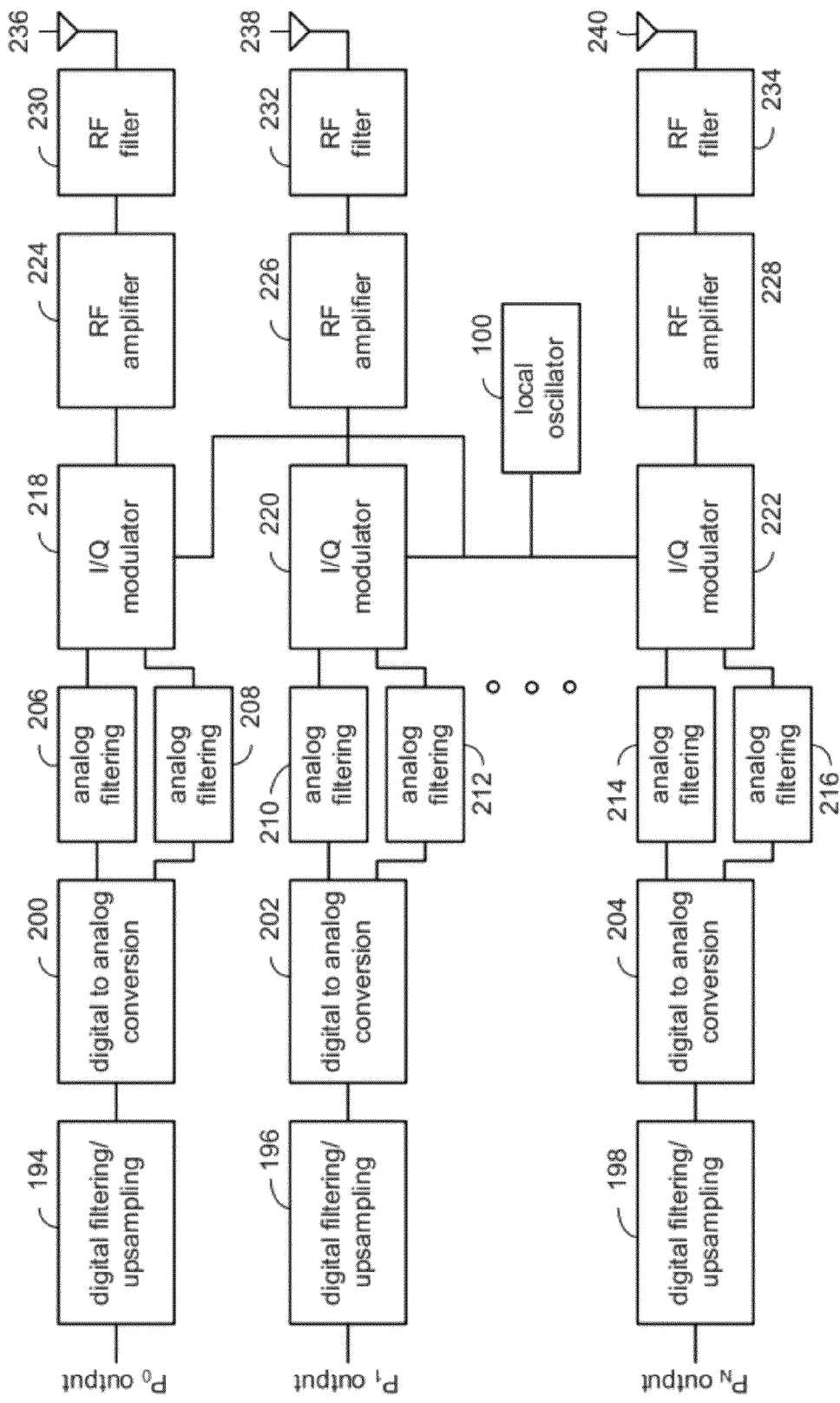

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate 1/2 convolutional encoder with 64 states and a generator polynomials of $G_0=133_8$ and $G_1=171_8$. The output of the convolutional encoder may be punctured to rates of 1/2, 2/3, and 3/4 according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, etc.) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216 (shown as analog filters by reference numerals 206, 208, 210, 212, up through 214, 216 in the diagram), I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-216 (shown as analog filters by reference numerals 206, 208, 210, 212, up through 214, 216 in the diagram) filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
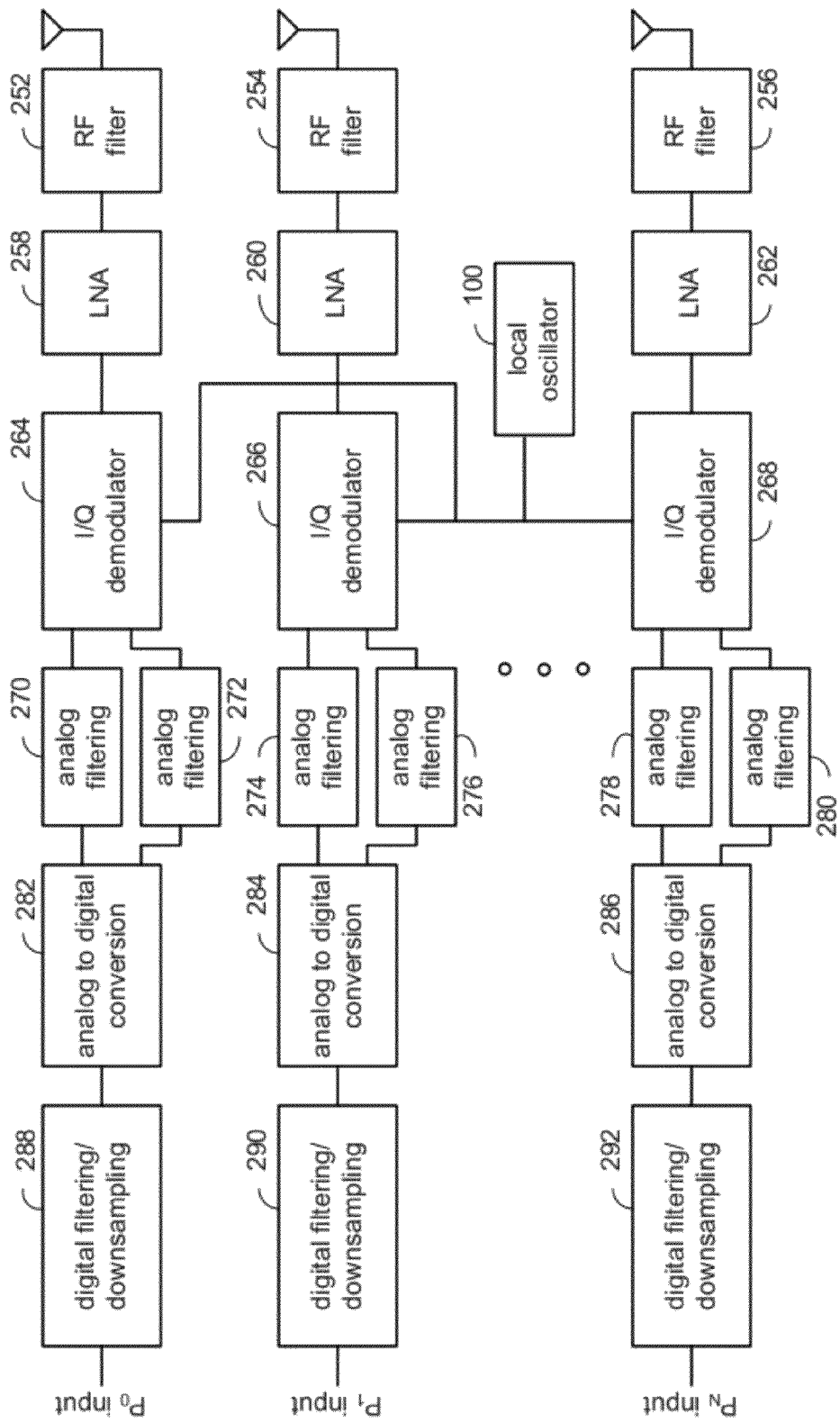
FIGS. 11A and 11B are diagrams illustrating embodiments of a radio receiver.
Figure 11B:
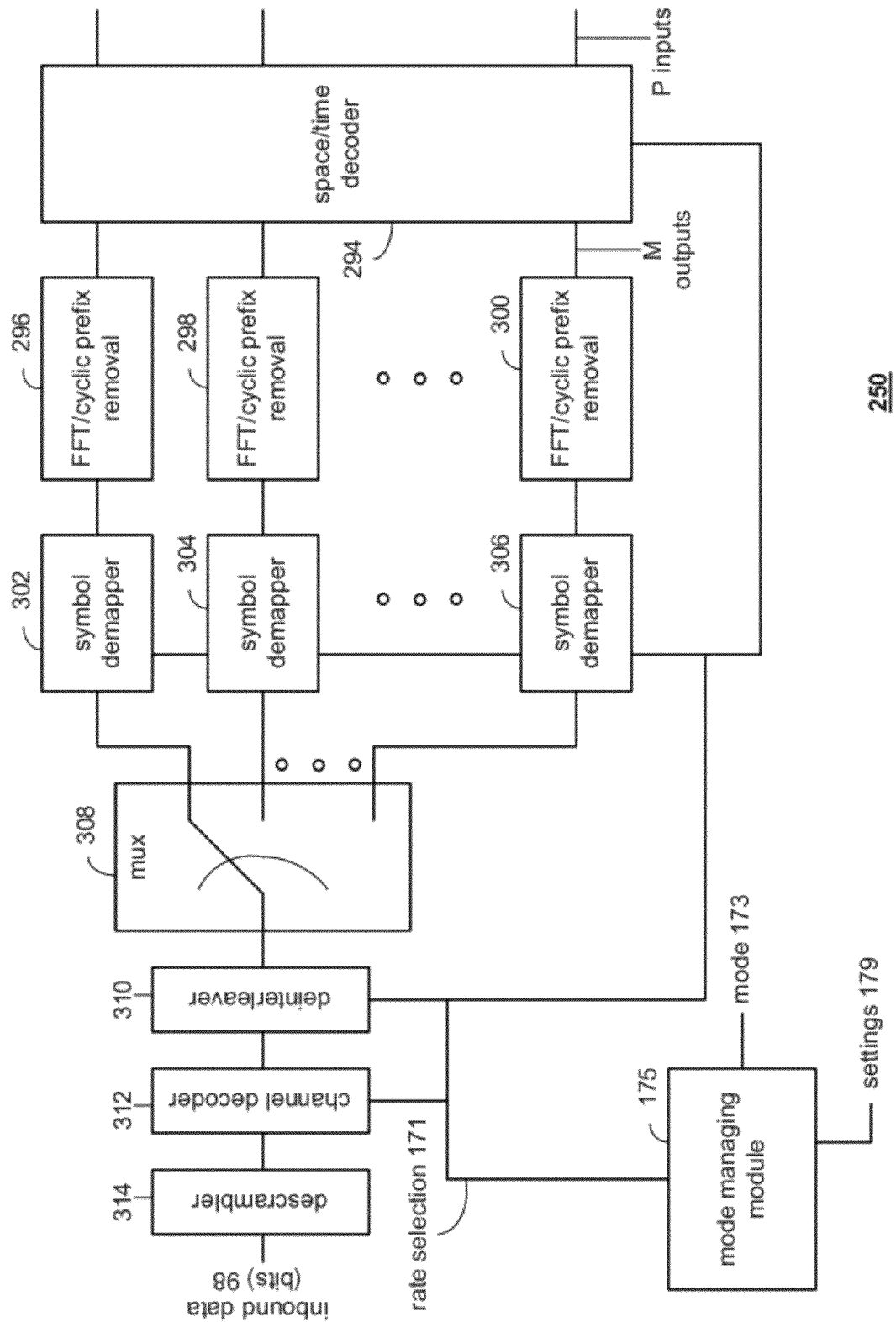

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-292 (as shown by reference numerals 288, 290, up through 292 in the diagram).

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-292 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
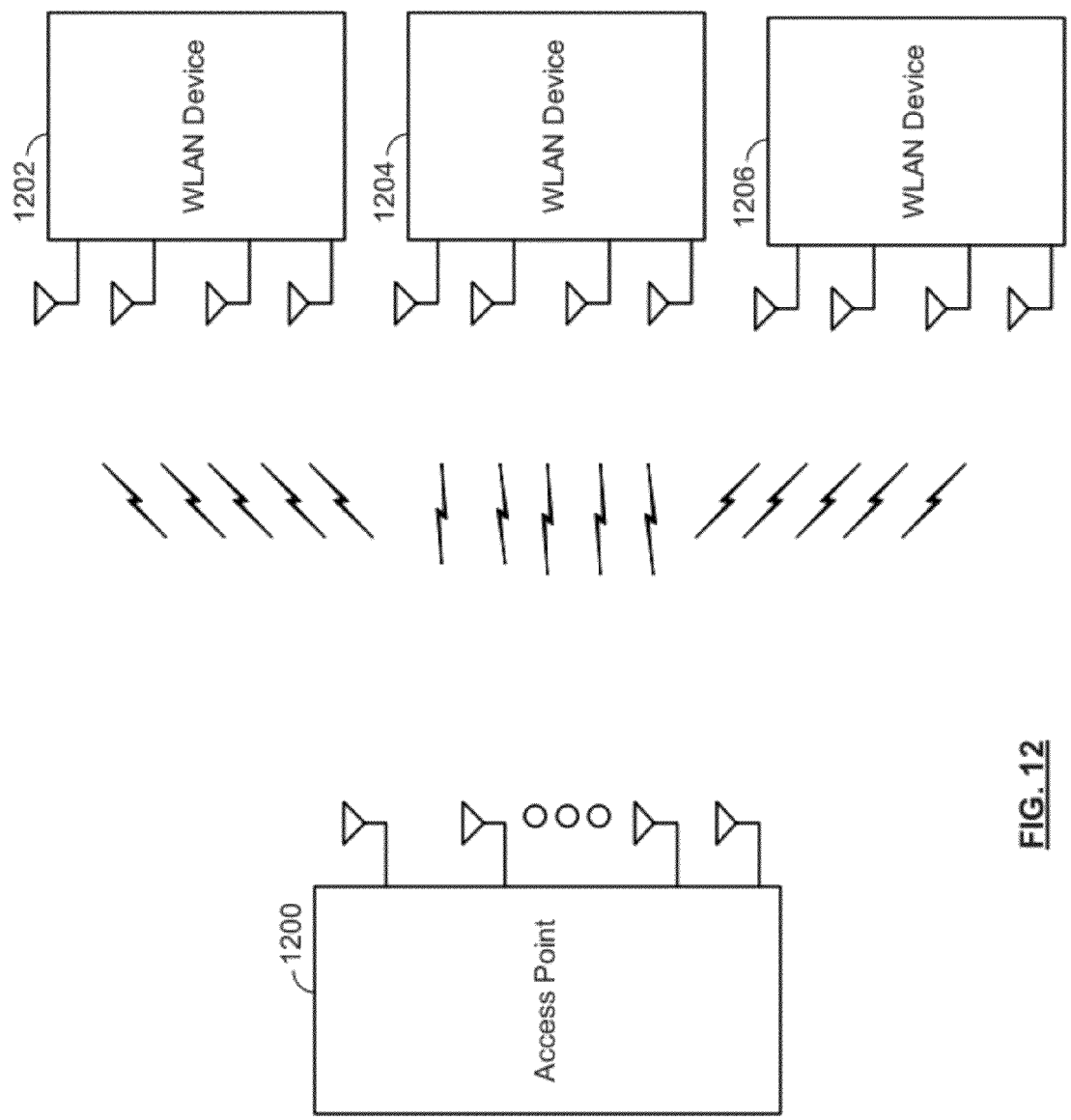
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11 (a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 13:
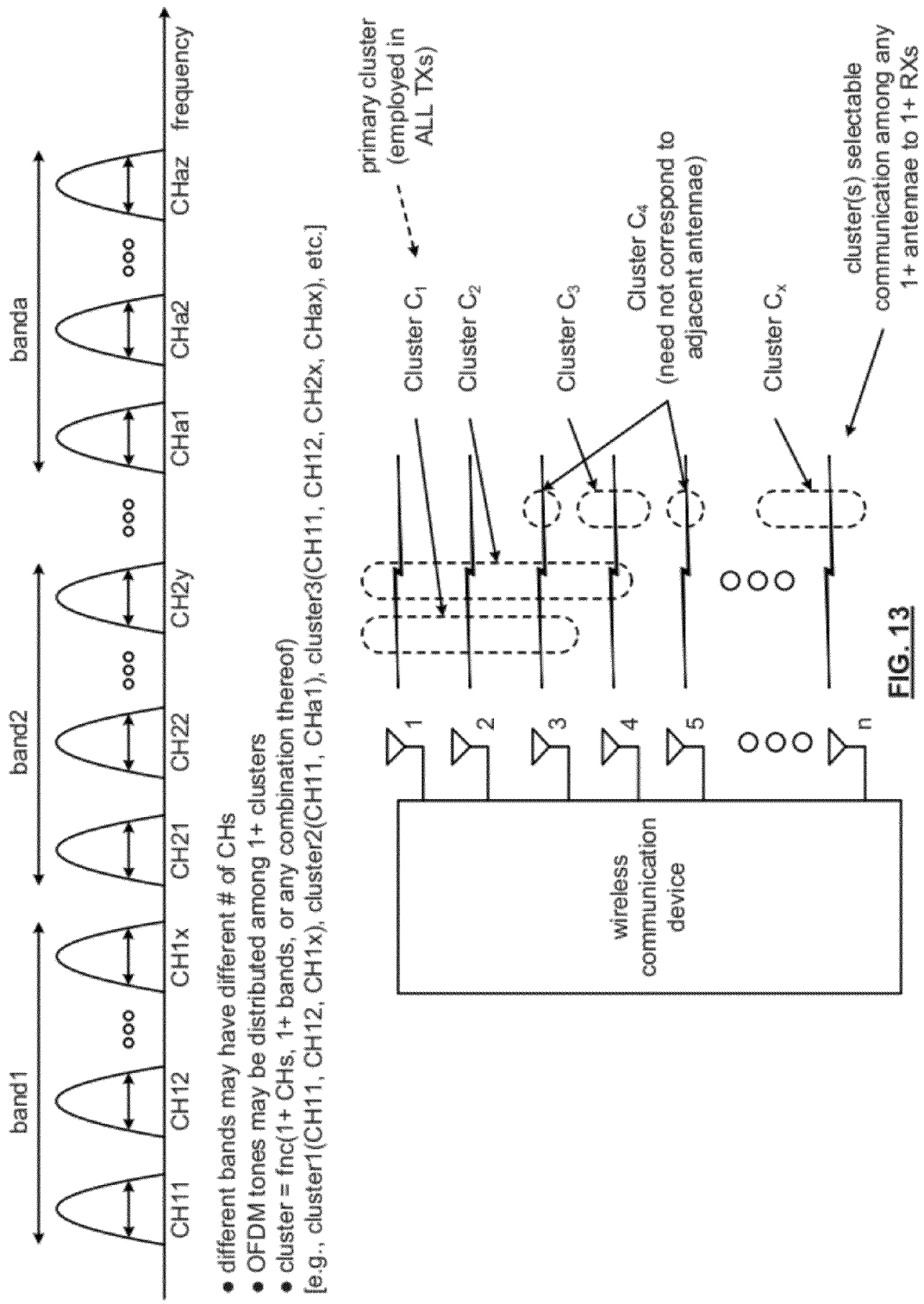
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Also, it is noted that, with respect to certain embodiments, general nomenclature may be employed wherein a transmitting wireless communication device (e.g., such as being an Access point (AP), or a wireless station (STA) operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system. Generally speaking, such capability, functionality, operations, etc. as described herein may be applied to any wireless communication device.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ad, ae, af, ah, etc.).

For example, the IEEE 802.11ah is a new protocol/standard currently under development and is intended for long range and low rate applications operating in worldwide spectrum below 1 GHz. The available spectrum in each country differs and requires flexible design to accommodate different options. As such, modifications to the IEEE 802.11 standards, protocols, and/or recommended practices may be made to effectuate longer delay spread and lower data rate applications such as may be employed in accordance with the IEEE 802.11ah developing standard.

Herein, from certain perspectives, certain adaptation and/or modification may be made with respect to IEEE 802.11ac standards, protocols, and/or recommended practices to provide efficient support for longer delay spread and lower data rate applications.

Figure 14:
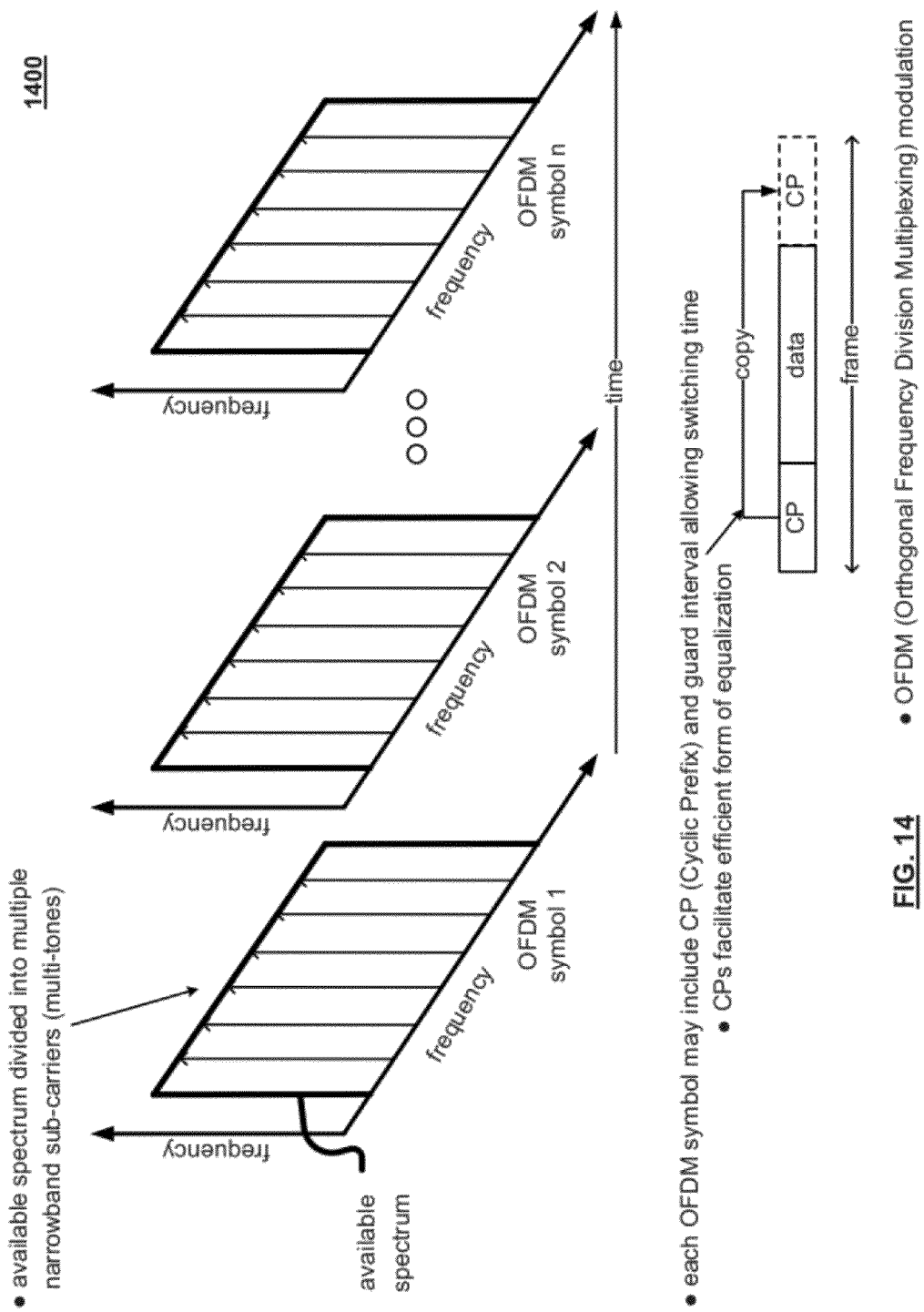
FIG. 14 illustrates an embodiment of OFDM (Orthogonal Frequency Division Multiplexing).

FIG. 14 illustrates an embodiment 1400 of OFDM (Orthogonal Frequency Division Multiplexing). OFDM modulation may be viewed as dividing up an available spectrum into a plurality of (narrowband) tones or sub-carriers (e.g., lower data rate tones or carriers). Typically, the frequency responses of these sub-carriers are overlapping and orthogonal. Each tone or sub-carrier may be modulated using any of a variety of modulation coding techniques.

OFDM modulation operates by performing simultaneous transmission of a larger number of (narrowband) tones or sub-carriers (or multi-tones). Oftentimes a guard interval (GI) or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols. Generally speaking, OFDM system design is based on the expected delay spread within the communication system (e.g., the expected delay spread of the communication channel).

Herein, a novel preamble structure is presented that is suitable for a variety of operational modes including those applicable for single-user (SU) case, multi-user (MU) case, and a low Doppler/high Doppler case. For example, with respect to the low Doppler/high Doppler case, additional long training fields (LTFs) may be needed to assist in channel estimation, channel training, etc. If desired, a single bit may be included to indicate the high Doppler case. Such Doppler effects may be realized in situations in which a wireless communication device has a relatively high mobility (e.g., a wireless communication device being operated within a fast moving vehicle, on a train, etc.). In such a situation, multipath effects and/or various reflections may deleteriously affect performance.

With respect to IEEE 802.11ac, it is noted that only a single preamble is included with respect to the SU case (e.g., the second signal field (SIG-B) is disregarded for the SU case. With respect to the lower frequency, narrowband channel, and longer range applications associated with the currently developing IEEE 802.11ah standard (e.g., in accordance with the Task Group TGah), a proposal for two different types of preambles is presented herein (e.g., with respect to embodiments for a short preamble structure and a long preamble structure).

The following signaling may be included in the preamble employed for wireless communication.

An indication of the preamble having a format corresponding to either single-user (SU) or multi-user (MU) applications may be provided in the SIG-A field. For example, 1 or 2 bits (or a series or group of bits) may be implemented to provide indication for different preamble types and/or types of transmissions (e.g., MU, SU Open Loop, SU Beamforming).

An indication of the preamble having a format corresponding to a high Doppler suitable packet may be provided by a bit (e.g., one bit) in the SIG-A or SIG-B field. For example, long training fields (LTFs) (and/or possibly short training fields (STFs)) may periodically be repeated after some number of orthogonal frequency division multiplexing (OFDM) DATA symbols in order to track the high Doppler channel. If desired, the LTFs may be repeated only for the SU case. For the MU case, repeated symbols may result in a significantly longer packet. In addition, MU transmissions may be vulnerable to high Doppler (e.g., increased inter-user interference). Rotation of the pilot symbols may be made over different positions within a packet or a communication. A high Doppler bit may not necessarily be included in which case there are two possibilities: (1) high Doppler suitable packet as default, and (2) no high Doppler provision in the packet as default.

In addition, there may be some indication before the Signal field (SIG-A) that would indicate one of the two (or more) modulation coding set (MCS) possibilities of SIG-A and/or a second Signal field (SIG-B). This indication may be in the short training field (STF) and/or within the long training field (LTF). The indication may be related to field content, inverted polarity, and/or phase shifts.

With respect to the lower frequency, narrowband channel, and longer range applications associated with the currently developing IEEE 802.11ah standard (e.g., in accordance with the Task Group TGah), it may be desirable to construct relatively shorter preambles (as opposed relatively long fields being employed within the preambles thereof). As such, novel approaches are presented herein by which the preamble may be shortened such as in accordance with the construction of the STF and/or LTF fields therein.

For example, bits start to appear in a packet within the signal field (SIG-A) to indicate information related to the packet. However, herein, additional information may be provided even before those bits related to the signal field (SIG-A) begin to appear (e.g., such as in accordance with what may be viewed as being an encrypted pre-SIG-A field). That is to say, even if the MCS of SIG-A is specified (e.g., usually as being a relatively lowest order so that all wireless communication devices can properly receive, demodulate, decode, etc. at least the SIG-A of the packet), but some means of communicating such information can be provided changing some indication that the signal field (SIG-A) is not of that default MCS (e.g., by effectuating at least one phase shift, and/or at least one polarity shift, etc.) because up to and before the SIG-A field, there are no bits there to indicate such. A change may be effectuated for certain properties of the signal corresponding to these proportions of the signal to indicate what is happening later in the field (e.g., such as in accordance with an encrypted pre-SIG-A field as may be effectuated by these at least one phase shift, and/or at least one polarity shift, etc.).

Figure 15:
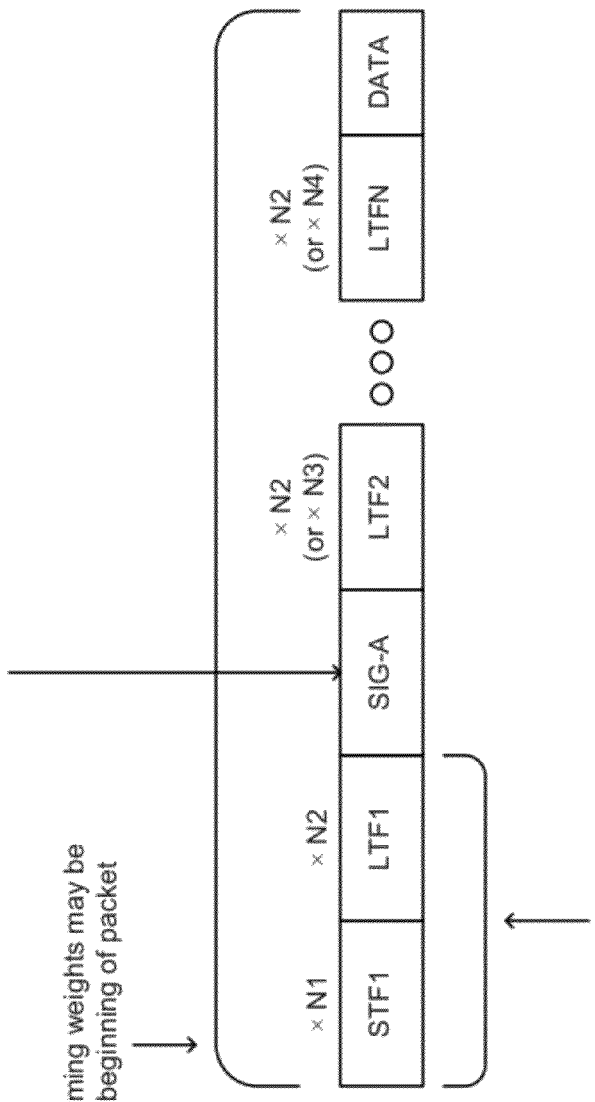
FIG. 15 illustrates an embodiment of a preamble for use in packetized communications for single-user (SU) applications.

FIG. 15 illustrates an embodiment 1500 of a preamble for use in packetized communications for single-user (SU) applications. This embodiment 1500 may be viewed as being a SU Case Option 1. As may be seen, transmit beamforming weights may be applied at the beginning of the packet.

Figure 16:
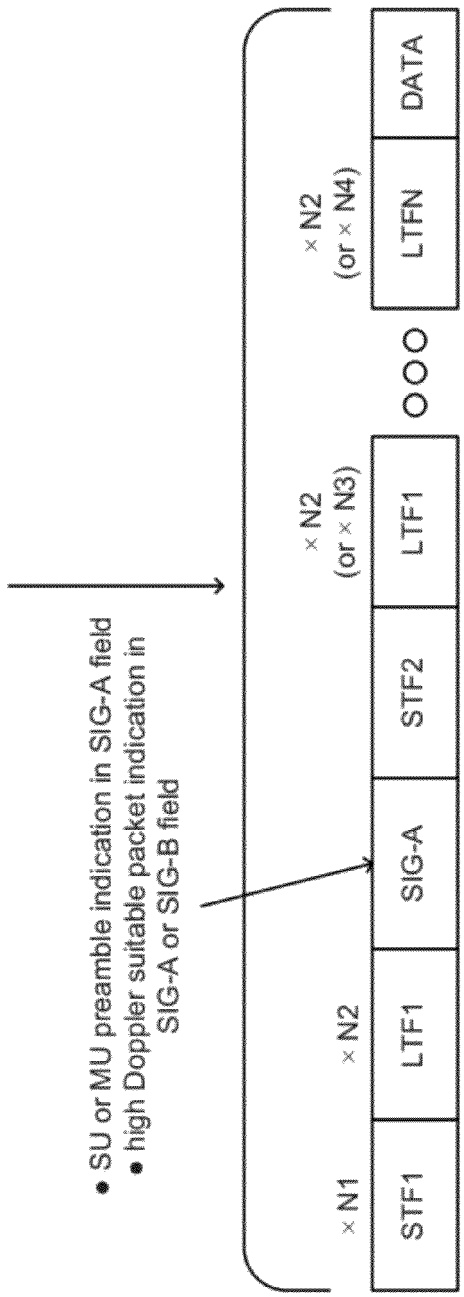
FIG. 16 illustrates an alternative embodiment of a preamble for use in packetized communications for SU applications.

FIG. 16 illustrates an alternative embodiment 1600 of a preamble for use in packetized communications for SU applications. This embodiment 1600 may be viewed as being a SU Case Option 2. As may be seen, transmit beamforming weights may be applied after the signal field (SIG-A).

Figure 17:
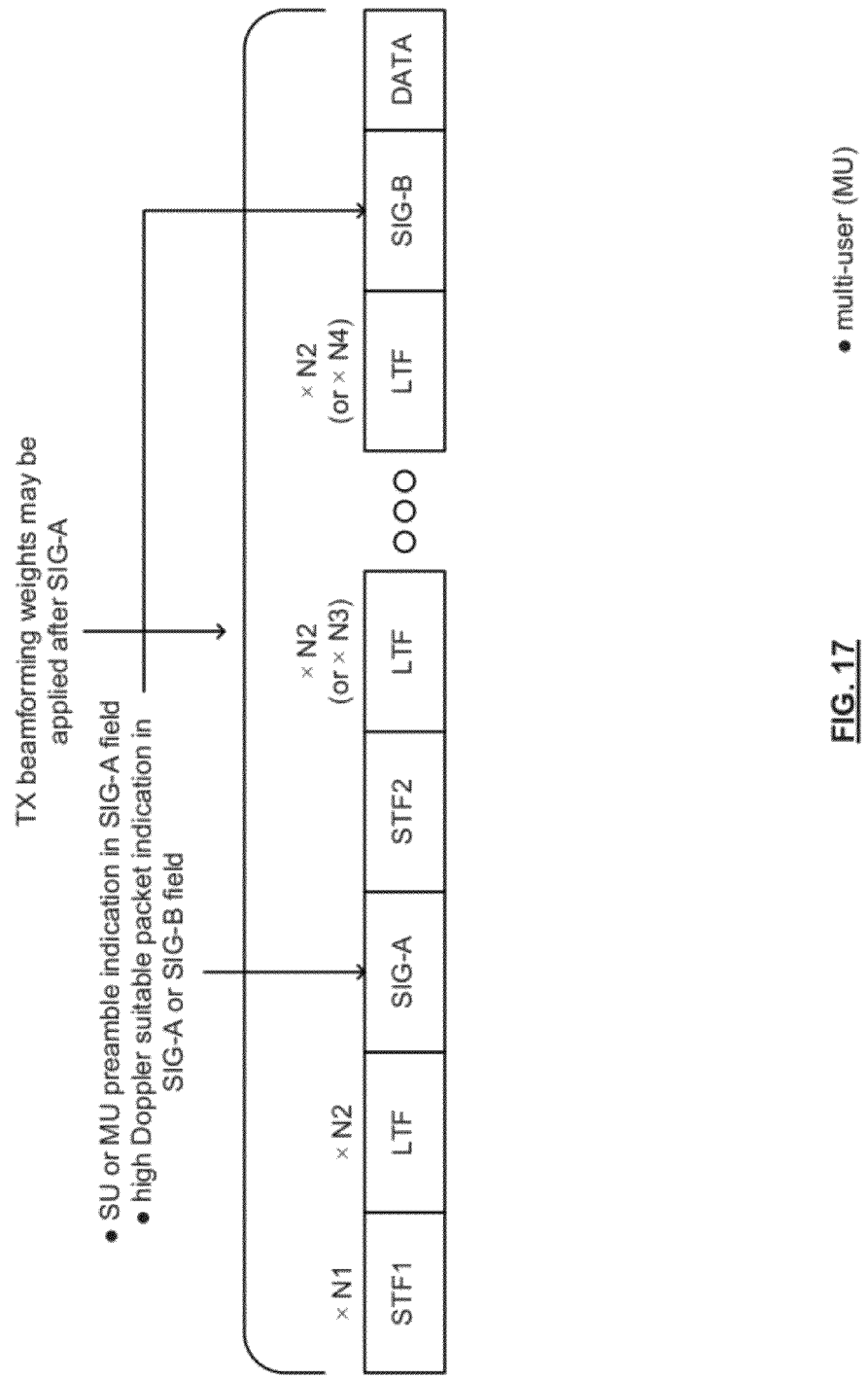
FIG. 17 illustrates an embodiment of a preamble for use in packetized communications for multi-user (MU) applications.

FIG. 17 illustrates an embodiment 1600 of a preamble for use in packetized communications for multi-user (MU) applications. This embodiment 1700 may be viewed as being a MU Preamble Case.

As may be seen, beamforming (precoding) may be applied after the signal field (SIG-A). The preamble structure may be used for both the MU Beamforming and SU Beamforming cases. The indicia of N1, N2 (and/or N3, N4) indicate that symbols may be repeated by a different number of repetitions (e.g., any integer between 1-4 in one embodiment).

A preamble structure such as may be suitable for the currently developing IEEE 802.11ah standard may have some attributes that are analogous to that which is compliant with IEEE 802.11ac. For example, the signal field (SIG-A) may be implemented to include bits that must be seen by all users and uses the lowest MCS in the system (e.g., lower order modulation, lower code rate, etc.) so that all wireless communication devices can receive, demodulate, decode, etc. at least that portion of the packet. Also, the second signal field (SIG-B) may be implemented to include bits that are user specific.

However, a preamble structure such as may be suitable for the currently developing IEEE 802.11ah standard may have other attributes that are different and particularly suited for such lower frequency, narrowband channel, and longer range applications. For example, the signal field (SIG-A) may be implemented to include bits that may signal the MCS used for Data and the MCS used for the second signal field (SIG-B). In an embodiment in which the Data MCS and SIG-B MCSs are different, a delta (difference, such as A) between the two MCSs may be signaled in the signal field (SIG-A). For example, the signal field (SIG-A) may signal the MCS used for the second signal field (SIG-B) and the second signal field (SIG-B) then signals the MCS used for DATA. That is to say, the signal field (SIG-A) may indicate within the MCS for each of the separate and respective different, following fields.

Alternatively, the signal field (SIG-A) may indicate a ΔMCS (e.g., a difference based on at least one additional MCS) such that the ΔMCS is with respect to the MCS of the second signal field (SIG-B) so that the MCS of the second signal field (SIG-B) and the ΔMCS may be used for properly processing the DATA.

A variety of preamble combinations (e.g., from among 5 rep combinations) may be chosen. For example, the signal field (SIG-A) may contain 1 or 2 bits (or a series or group of bits) may be implemented to provide indication for different preamble types and/or types of transmissions (e.g., MU, SU Open Loop, SU Beamforming).

With respect to these various combinations, it is submitted that at least one column (such as with respect to FIG. 18 referenced below) would be selected, and then, based on that selected column, the preamble format will be specified as a function of the type of transmission.

Combination #1:
  SU Option 1 may be used for both SU Beamforming and SU Open loop
  MU preamble may be used for MU transmissions
  Two preamble types
Combination #2:
  SU Option 2 may be used for both SU Beamforming and SU Open loop
  MU preamble may be used for MU transmissions
  Two preamble types
Combination #3:
  SU Option 1 may be used for Open Loop SU transmissions only
  SU Option 2 in that case may be used for SU Beamforming (Closed Loop) transmissions
  MU preamble may be used for MU transmissions
  Three preamble types
Combination #4:
  SU Option 1 may be used for Open Loop SU transmissions only
  MU preamble may be used for both SU Beamforming and MU case
  In the SU Beamforming case SIG-B may not be relevant, it may be ignored
  Two preamble types
Combination #5:
  To reduce the implementation complexity, only MU preamble may be selected for SU (Open Loop and Beamforming) and MU transmissions
  Single preamble type
  SIG-A indicates SU or MU transmission case With respect to the STF1 field indicated in the beginning of the packet, the STF1 field may be implemented in accordance with power boosting when compared to the other fields of the packet. The increased power may provide for better packet detection, timing and synchronization.

In some embodiments, the STF2 field may be considerably shorter than the STF1 field since it is used for automatic gain control (AGC) and/or AGC estimation, which can be coarse. For example, in accordance with IEEE 802.11a/n/ac, there are 10 short repetitions of 0.8 μs in the STF. In accordance with one embodiment that may be employed within the currently developing IEEE 802.11ah standard, one or two short repetitions may be used only. However, in accordance with the currently developing IEEE 802.11ah standard, each repetition may be longer because of the bandwidth scaling (down-clocking).

It is noted that the STF2 field may not be present in all embodiments. For example, a cyclic prefix of the next orthogonal frequency division multiplexing (OFDM) symbol may be used for automatic gain control (AGC) and/or AGC estimation. In some situations, the cyclic prefix can be longer than in other embodiments.

A receiver communication device can take advantage of this novel design by differentiating between the different respective LTF types (e.g., as few as a first LTF type and a second LTF type) by using any of a number of means (e.g., a matched filter (or two different respective matched filters)

that may be adapted and applied respectively to each of two or more LTF options and choosing the strongest one, comparison processing, correlation processing, frequency domain cross-correlation processing, and/or some other form of processing, etc.

Generally speaking, certain of the various diagrams and/or embodiments presented above provided for various preamble details in a bandwidth agnostic manner. That is to say, such certain of the previous diagrams and/or embodiments may particularly define the manner in which bandwidth is allocated for various embodiments of preambles (e.g., they may be suitable for different respective bandwidths in some instances).

As described elsewhere herein, certain embodiments operate by using different and limitations of down-clocking. For example, in certain embodiments, a 32 FFT PHY, such as may be implemented in accordance with the currently developing IEEE 802.11ah standard, may be viewed as being in addition to a down-clocked version of a PHY compliant in accordance with any one or more of IEEE 802.11a/n/ac. That is to say, the implementation of a 32 FFT PHY may be viewed as a relatively lower bandwidth implementation, which could be achieved via a down-clocking embodiment as presented herein, that nonetheless should the operable within systems having a lowest bandwidth implementation associated with 64 FFT PHY (e.g., such as accordance with any one or more of IEEE 802.11a/n/ac). From another perspective, the implementation of a 32 FFT PHY may be viewed as being in addition to a down-clocked version employed in accordance with IEEE 802.11ac in order to meet necessary regulatory domains in the compliant in order to operate within different domains and/or countries around the world.

In accordance with one possible embodiment, a 32 FFT is employed to provide for a lowest available bandwidth option. In order to provide for coexistence between such a 32 FFT design and the FFT designs for other bandwidth options (e.g., 64, 128, 256, 512 respective FFTs), various embodiments are presented herein for signal (SIG) field design.

In accordance with certain embodiments, such as those compliant in accordance with IEEE 802.11ac, a signal (SIG) field design is based on the principle that the high FFT size is a duplicate of the SIG field of the lowest FFT size. For example, considering and implementation in which the lowest bandwidth option corresponds to a 64 FFT in frequency, then for a 128 FFT, the SIG field is repeated twice in frequency. For example, considering embodiment in which frequency may be viewed as extending along a vertical axis, and time may be viewed as extending along a horizontal axis, a 128 FFT would be twice as high in frequency (e.g., repeated twice in frequency), yet would occupy the same duration along the time axis. Below, with respect to FIG. 21, such a possible embodiment is presented in which scaling is performed as a function of frequency for relatively higher bandwidth options.

Figure 18:
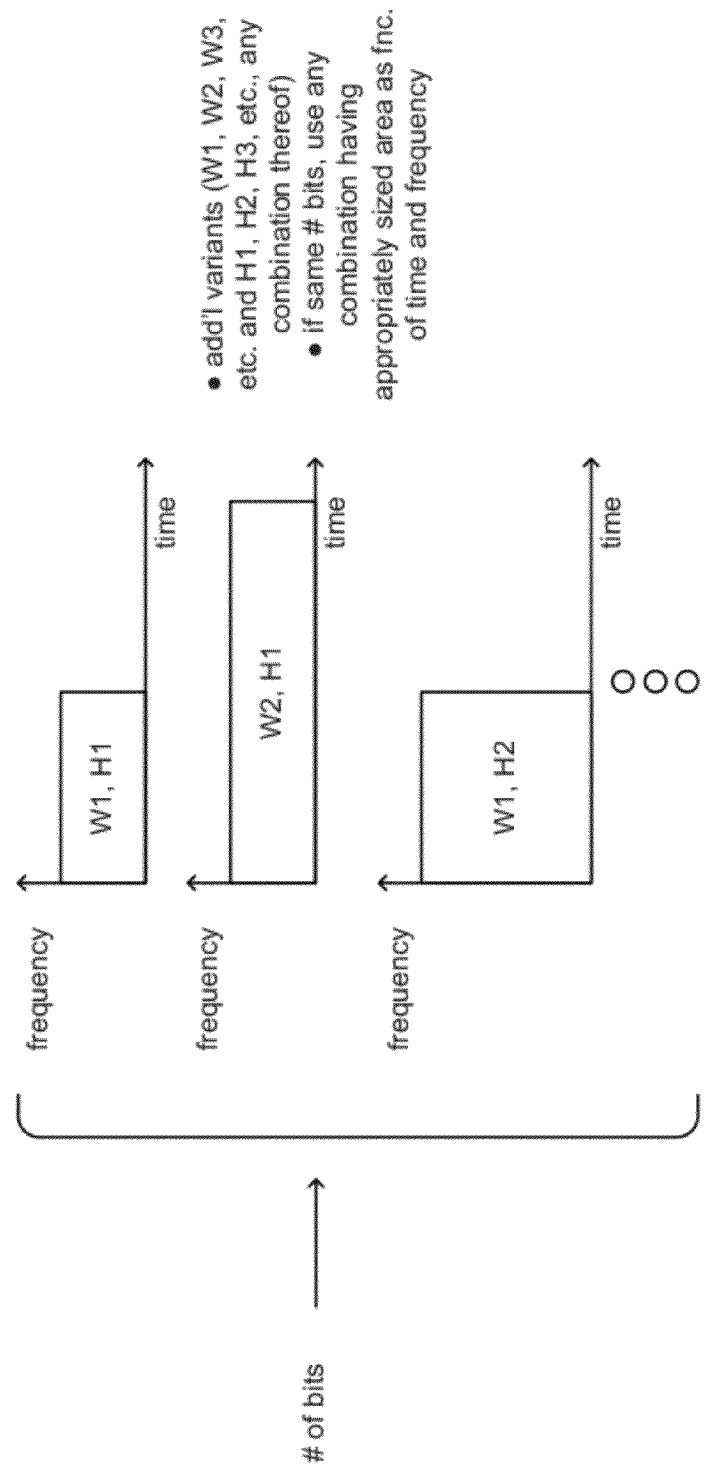
FIG. 18 illustrates an embodiment of packing bits into various options of time and frequency combinations.

FIG. 18 illustrates an embodiment 1800 of packing bits into various options of time and frequency combinations. As can be seen with respect to this diagram, in considering a number of bits to be packed into a given amount of time in frequency, any of a number of combinations may be employed. For example, assuming a same number of bits is to be packed, then any of a number of different combinations of time and frequency may be employed so long as, relatively speaking, the same amount of time-frequency area is used. For example, considering a number of bits at the left-hand side of the diagram to be packed into a given combination of time and frequency, any appropriately selected and sized area may be employed as a combinatorial function of both time and frequency.

For example, at the top of the diagram, a first width in terms of time and a first height in terms of frequency is shown. In the middle of the diagram, a second width in terms of time and a first height in terms of frequency is shown. Closer to the bottom, a first width in terms of time and a second height in terms of frequency as shown. Generally speaking, any of a number of different widths and heights may be employed, and any desired combination thereof, in accordance with the principles presented herein. Generally speaking, depending upon the number of bits to be packed into a given combination of time and frequency, any of a number of combinations may be employed.

In certain embodiments, such packing of bits into given options of time and frequency is made with consideration that all communication devices (e.g., wireless communication devices in a wireless communication system context) will be able to receive, demodulate, process, etc. that information. For example, within certain communication system applications, different respective communication devices may have different capabilities. To ensure that all communication devices within the system will be able to process such information, appropriate packing of these bits within a particular combination of time and frequency is made. That is to say, certain information may be packed appropriately as a function of some time and frequency combination to ensure that all communication devices can in fact receive and process certain information.

Again, it is noted that this diagram illustrates only some possible variations including two different respective widths and two different respective heights. It is once again pointed out that any desired combination of width and height may be employed from among any desired number of widths and any desired number of heights.

Figure 19:
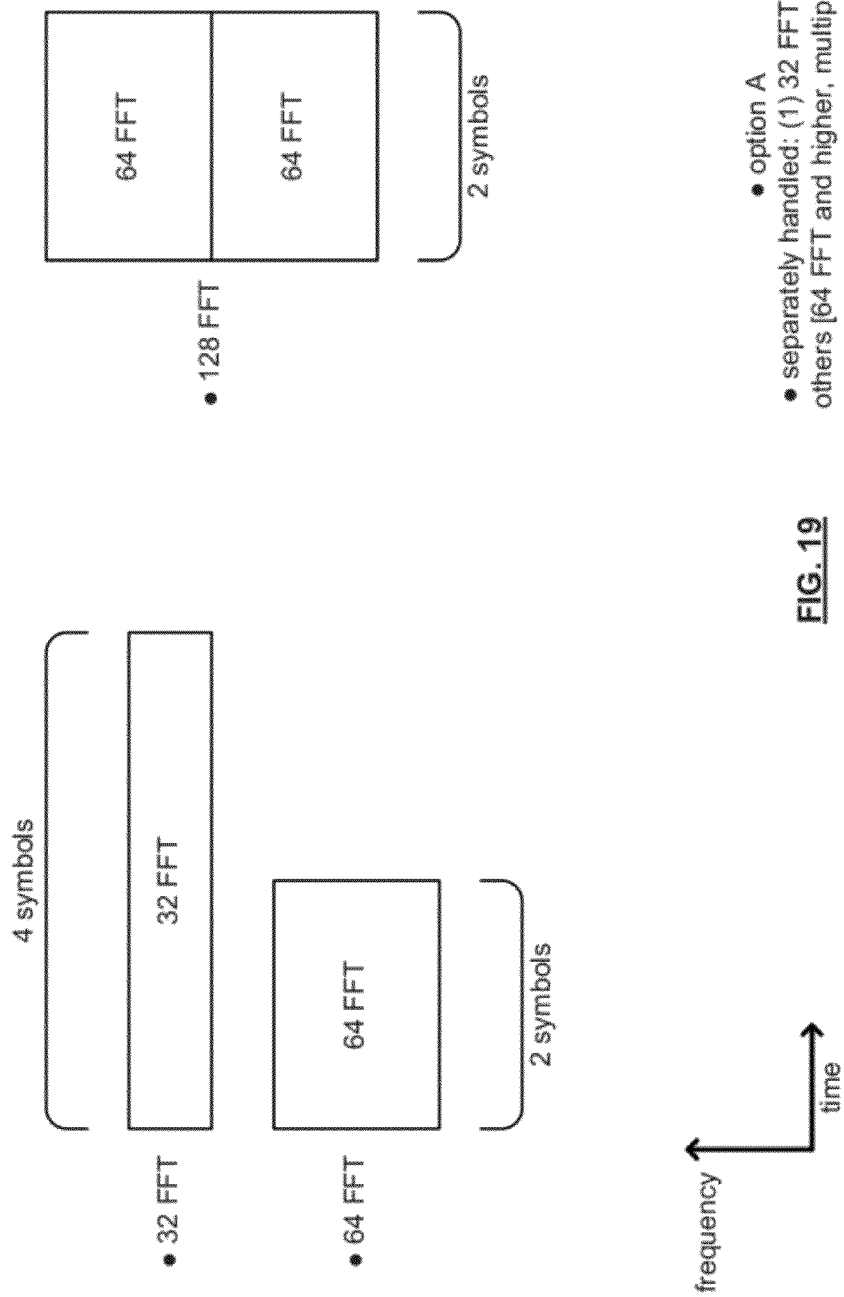
FIG. 19 illustrates an embodiment of a relatively high efficiency coexistence option (shown as option A).

FIG. 19 illustrates an embodiment 1900 of a relatively high efficiency coexistence option (shown as option A). As can be seen with respect to this diagram, a separately designed and implemented SIG field is employed for 32 FFT. The SIG field for 64 FFT and for higher FFTs (e.g., 128, 256, and 512) are implemented as being scaled versions of one another; that is to say, each of the other higher FFTs is a respective multiple of the SIG field for 64 FFT. However, an entirely different and separately implemented SIG field is employed for 32 FFT. It is noted that this embodiment 3300 may be viewed as providing for a relatively higher efficiency with respect to other embodiments presented herein.

If desired in certain embodiments, the implementation of the SIG field for 64 FFT and for higher FFTs (e.g., 128, 256, and 512) may be implemented in accordance with a down-clocking architecture. For example, for 64 FFT and for higher FFTs (e.g., 128, 256, and 512), a down-clocking architecture may be employed in accordance with IEEE 802.11 ac. However, for 32 FFT, separately implemented functionality, circuitry, etc. may be employed.

Again, the implementation associate with this diagram does allow for a relatively highly efficient design for 64 FFT and for higher FFTs (e.g., 128, 256, and 512), as 52 tones implemented across 2 respective symbols are used to convey the SIG content for those respective cases. As can be seen within the diagram, the 32 FFT is for symbols in length, and is narrower vertically (e.g., by a factor of one half) than the 64 FFT. Generally speaking, a same number of bits is implemented within each of the respective time and frequency combinations, and as such, the respective time-frequency area is the same for both the 32 FFT and for the 64 FFT.

As can be seen respect to this diagram, there is commonality in terms of the structure of the 64 FFT and a 128 FFT. It is noted that the other higher FFTs (e.g., 256 and 512) may be viewed as being scaled versions of the 64 FFT as well. That is to say, in a similar manner that the 128 FFT is a scaled version of the 64 FFT, each of the other respective higher FFTs are similarly scaled versions thereof, eating scaled by the appropriate amount required for that respective FFT.

It is also noted that because there are two different types of FFTs, a given communication device needs to know whether a given transmission FFT size is 32 or one of the other FFT sizes (e.g., 64, 128, 256, or 512) in order to decode the SIG field correctly. For example, a given communication device can be implemented to detect the location of the 32 FFT channel where at least two different options may exist. For example, the 32 FFT channel may be located on the left-hand side of the 64 FFT channel or alternatively on the right-hand side of the 64 FFT channel That is to say, the 64 FFT channel may be subdivided into two respective halves, left and right, and the 32 FFT channel may appropriately correspond to one of them (e.g., either the left-hand side or the right-hand side of the 64 FFT channel). In even another embodiment, the 32 FFT channel may be located within the middle of the 64 FFT channel such that one fourth of the 64 FFT channel is to the left of the 32 FFT channel and another one fourth of the 64 FFT channel is to the right of the 32 FFT channel Within such wireless communication system applications, all of the wireless communication devices therein may be implemented to support both 32 FFT and 64 FFT. Wireless communication devices implemented therein may use the STF autocorrelation triggering on the two respective halves of the 64 FFT bandwidth, or the middle half, in order to decide which 32 FFT channel is particularly occupied and also specifically where. That is to say, such STF autocorrelation triggering may be performed on different respective portions of the 64 FFT bandwidth (e.g., on the left-hand side thereof, on the right-hand side thereof, in the middle portion thereof, and/or any other particular desired section in which the 32 FFT channel may be implemented within the 64 FFT bandwidth). In accordance with such processing, if more than one respective portion of the 64 FFT bandwidth triggers detection within a given wireless communication device (e.g., if both the left-hand side portion and the right-hand side portion of the 64 FFT bandwidth both result in detection of a respective 32 FFT channel), then the wireless communication device may appropriately determine that the channel is in fact 64 FFT. Alternatively, if only one respective portion of the 64 FFT bandwidth triggers detection within a given wireless communication device (e.g., if only the left-hand side portion, if only the right-hand side portion, or if only the middle portion, etc.) Results in detection of a respective 32 FFT channel, then the wireless communication device may appropriately determine that the channel is in fact 32 FFT.

A number of possible implementations may be made for appropriate distinction between these two types of FFTs (e.g., between the design associated with 32 FFT and the design associated with the other FFT sizes—64, 128, 256 or 512). For example, additional classification schemes may be employed for distinguishing between a 32 FFT or a 64 FFT transmission bandwidth.

One possible embodiment operates by employing auto-detection on the SIG field. For example, with respect to the first or second SIG symbols for 32 FFT, some form of rotational BPSK modulation may be employed (e.g., which may be effectuated via a 90° phase shift such as by multiplying by j). For 64 FFT and the other FFT sizes (e.g., 64, 128, 256, or 512), the same phase may be employed for the two respective SIG symbols therein. As such, distinction between the two different types may be made based upon some form of rotational BPSK modulation associated with different respective symbols within the SIG field (e.g., such that rotation indicates 32 FFT and a lack of rotation indicates otherwise, such as 64 FFT and/or some other higher order of FFT).

Alternatively, then an alternative implementation, some form of rotational BPSK modulation may be employed for the two respective SIG symbols for 64 FFT and the other FFT sizes (e.g., 64, 128, 256, or 512), while the same phase may be employed for the respective SIG symbols for 32 FFT. That is to say, some form of phase rotation may be implemented with respect to those symbols of the different FFT types for assisting in their respective identification.

Another possible embodiment operates by employing auto-detection on the LTF field, as described elsewhere herein in which to respective LTF symbols of different degrees, such as one having 0° and the other having 180°, change between the respective modulating values of the two successive symbols. That is to say, certain phase rotation implementation of the LTF field may be alternatively employed in accordance with such an embodiment. If such an implementation is performed, it may be appropriate that LTF phase rotation is not used for the purpose of classifying an extended range frame format preamble. That is to say, the appropriate use of the LTF field, including any phase rotation associated therewith, would be appropriately employed for either the purpose of classifying an extended range frame format preamble or for distinguishing among different FFT types.

Yet another possible embodiment operates by employing no auto-detection bit whatsoever (e.g., no auto-detection bit). Communication devices that implement the 32 FFT type and at least the 64 FFT type will detect which 32 FFT channels are occupied for regular operation. Such a communication device may be implemented only to perform detection of the 32 FFT type. As such, such a location device need not necessarily also decode extended range 32 FFT packets, and may use energy detection for coexistence functionality. For example, such a communication device could process a first portion of the received packet, then, based upon certain decision-making criteria associated with that first portion of the received packet, the communication device could go to sleep or enter a different operational mode (e.g., lower power consumption, modified functionality set such as a reduced functionality set, etc.), and then awake or exit from that different operational mode at the end of the packet.

Figure 20:
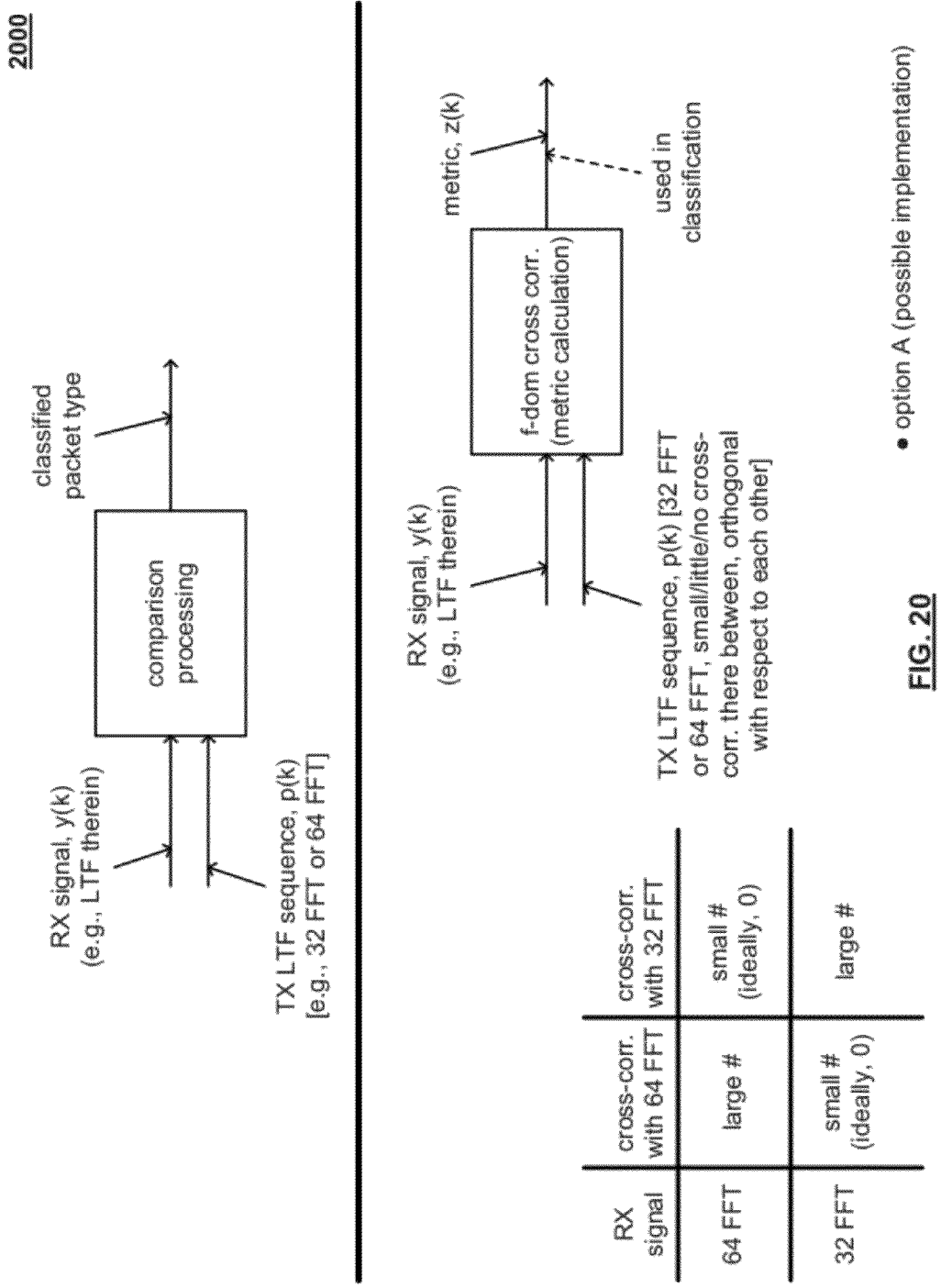
FIG. 20 illustrates an alternative embodiment of a relatively high efficiency coexistence option (shown as option A), and particularly with respect to employing two different long training field (LTF) sequences.

FIG. 20 illustrates an alternative embodiment 2000 of a relatively high efficiency coexistence option (shown as option A), and particularly with respect to employing two different long training field (LTF) sequences.

As described with respect other embodiments and are diagrams herein, one manner by which differentiation may be made between different types of preambles (e.g., including those corresponding to extended range, normal range, etc.) is to perform appropriate comparison processing of a received signal with one or more predetermined signals. For example, with respect to performing classification of a packet, or a signal including that packet, based upon one or more LTF's within the packet, comparison processing may be made using an LTF within a packet of the signal and the one or more predetermined LTF sequences. When such comparison processing results in a favorable result, then the packet, or a signal including that packet, may be appropriately classified.

Any of a number of different types of processing may be performed in accordance with such packet (or signal) classification including performing or using any one or more of auto-correlation or cross-correlation functions, which may be implemented within the frequency and/or time domains. For example, as may be understood with respect to using a given LTF symbol carrying one out of two or more sequences as described above, a receiving wireless communication device they perform cross-correlation of successive tones in an effort to eliminate the effect of the channel and to compare the results to a cross-correlation of adjacent symbols in the transmitting sequences. Specifically with respect to distinguishing between a 32 FFT and a 64 FFT, frequency domain cross-correlation processing may be performed in accordance with metric calculation as described below.

For example, in such an implementation, frequency domain cross-correlation processing may be performed in an effort to generate the following metric, z(k).

$$\max_p \Sigma_k z(k)z(k+1)^*| \text{ where, } z(k) \equiv y_p y(k)p(k)^*.$$

The variable y(k) is the final received and averaged LTF sequence (e.g., used for channel estimation (CHEST)).

It is noted here that such a metric and associated processing may be described with reference to the frequency domain, it is of course noted that another metric (e.g., equivalent to the metric, z(k), above, yet expressed in the time domain) may alternatively be employed in certain embodiments. For example, in one possible embodiment, a new metric may be generated by taking an inverse fast Fourier transform (IFFT) of the sequence, z(k), above, to generate an equivalent metric in the time domain. As such, using such a time domain based metric, consideration of a root mean squared (RMS) delay spread of a signal may be made such that a relatively smallest value may be used to indicate that the correct sequence has been identified. For example, consideration of the RMS delay spread (e.g., corresponding to compactness in time, such as in accordance with a compactness metric with respect to the time domain) may be used to identify the proper sequence. Generally, any such operations described herein with reference to the frequency domain may alternatively be performed in the time domain in accordance with taking the appropriate considerations, transformations, etc. to convert between the frequency domain and the time domain (or vice versa).

The variable p(k) is the transmitted LTF sequence belonging to a 64 FFT or 32 FFT transmission, and the variable, $y_p$, is a biasing factor used to give more weight to some sequence over another, if desired. Of course, in certain embodiments, the variable, $y_p$, maybe soon chosen for such a value as to give equal weight to all sequences with respect to one another.

By performing such frequency domain cross-correlation processing, the resultant cross-correlation with the transmitted sequence may be used in an effort to identify the most likely transmitted sequence and auto-correlation of successive tones and also to remove the effect of the channel. For example, for the correct sequence, a relatively large positive number, approximately equal to, $\cong \Sigma_k H(k)|^2$. That is to say, if the received sequence undergoes appropriate frequency domain cross-correlation processing in conjunction with the appropriate transmitted LTF sequence belonging to that same received sequence, then the resultant and generated metric identified above, z(k), will then a relatively large positive number. For specific example, if the received sequence corresponds to 64 FFT, and that received sequence undergoes frequency domain cross-correlation processing in conjunction with the appropriate transmitted LTF sequence belonging to 64 FFT, then the resulting and generated metric will be a relatively large number.

Alternatively, if the received signal corresponds to 32 FFT, and that received sequence undergoes frequency domain cross-correlation processing in conjunction with the appropriate transmitted LTF sequence instead belonging to 32 FFT, then the resultant and generated metric will be a relatively small number or ideally, zero. The converse would also be true, in that, if the received sequence corresponds a 32 FFT, then when that received sequence undergoes frequency domain cross-correlation processing in conjunction with the appropriate transmitted LTF sequence belonging to 64 FFT, then a relatively small number or ideally, zero, would be generated; alternatively, when that received sequence undergoes frequency domain cross-correlation processing in conjunction with the appropriate LTF sequence belonging instead to 34 FFT, then a relatively large number would be generated. From certain perspectives, when the instance arises when the relatively small number is generated (e.g., a received sequence of one type undergoes frequency domain cross-correlation processing in conjunction with the other appropriate transmitted LTF sequence), then the resultant and generated metric may be viewed as being a sum of random numbers, thereby resulting in such a relatively small number being generated.

In certain embodiments, it may be preferable to ensure that the 32 FFT LTF sequence and the 64 FFT LTF sequence are orthogonal with respect to one another at least with respect to one of the following considerations:

$$\sum_k p_{32}(k)p_{32}(k+1)^* p_{64U}(k)p_{64U}(k+1)^* = 0$$

$$\sum_k p_{32}(k)p_{32}(k+1)^* p_{64D}(k)p_{64D}(k+1)^* = 0$$

The resulting sum of random numbers could also be a relatively small number, though not necessarily zero in all instances. Also, given that the 32 FFT may fall on either half of the 64 FFT, on different tones within 64 available tones, on different respective tones specified for 64 FFT, etc. (e.g., such as in accordance with embodiments in which 32 respective tones may be resident within different respective portions of a total available number 64 tones), then two respective constraints may be employed and applied appropriately to the different respective portions of the total available number 64 tones. For example, considering an embodiment in which the 32 FFT may fall on either half of a 64 FFT, to respective constraints may be employed and specifically applied appropriately to the upper and lower halves, respectively, of the 64 FFT LTF sequence. That is to say, in embodiments in which the 32 FFT may fall on less than all of the 64 available tones, then appropriately designed and applied constraints may be employed to any of a number of different variations by which the respective 64 tones may be partitioned (e.g., upper half and lower half, every other tone, lower quarter and upper quarter as compared to middle half portion, etc.). Again, as may be understood with respect to other diagrams and/or embodiments herein, any of a number of different ways may be employed by which 32 respective tones are selected and distributed among 64 available tones. Considering a concrete and exemplary embodiment in which the 32 FFT may fall on either an upper half or lower half of the 64 FFT, a searching classification process, k, may be limited to the respective indices of [1:16 18:31] (including skipping DC).

Generally speaking, any of a number of different binary sequences may be designed to meet the one or more constraints as described above and be appropriately implemented for use in such an application. For example, one possible candidate of such a binary sequence is presented below, particularly in providing a relatively low peak to average power ratio, PAPR (2.4 dB). The embodiment below assumes 26 tones are used.

$p_{32}$=[0 0 0 –1 1 1 –1 1 –1 –1 1 –1 1 1 1 1 0 1 1 –1 1 1 1 –1 1 –1 –1 –1 1 0 0], where it is again assumed that 26 tones are used.

Figure 21:
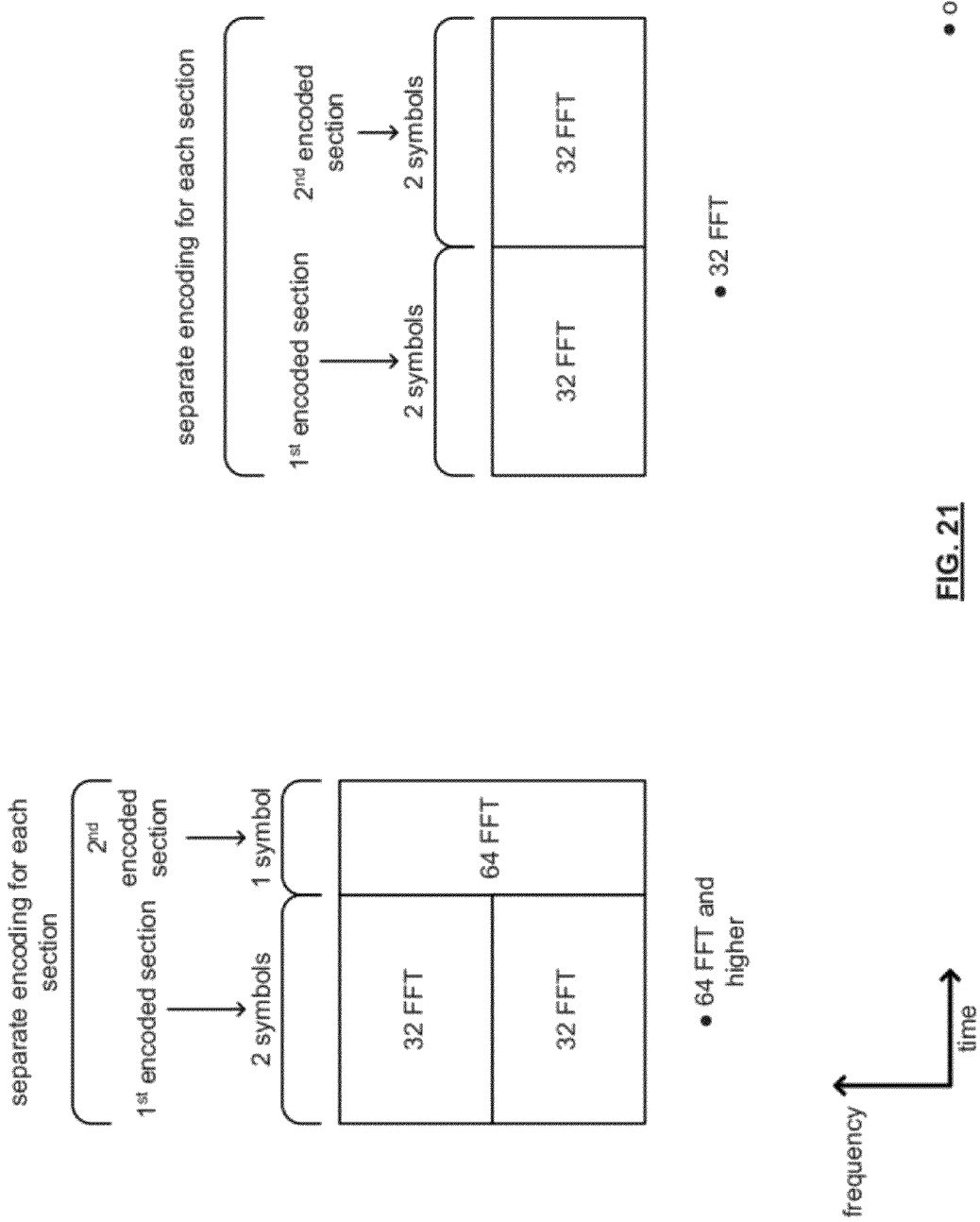
FIG. 21 illustrates an embodiment of a relatively medium efficiency coexistence option (shown as option B).

FIG. 21 illustrates an embodiment 2100 of a relatively medium efficiency coexistence option (shown as option B). As can be seen with respect to this diagram, an alternative option of the SIG field for 64 FFT and the other FFT sizes (e.g., 128, 256, or 512) is split into two respective sections that undergo separate encoding. For example, 2 symbols (operational in accordance with the duplicate mode) are employed for the 32 FFT mode, and one symbol is employed for the 64 FFT mode. The duplicate symbol employed within the 32 FFT mode may be implemented to carry the length field and other parameters as desired. The symbol employed in accordance with the 64 FFT mode may be implemented to carry any remaining information. As can be seen on the left-hand side of the diagram, such an implementation of the SIG field for 64 FFT and the other FFT sizes (e.g., 128, 256, or 512) spans a given multiple of 3 symbols of 64 FFT duration.

With respect to 32 FFT, the SIG field is similarly split into two respective sections as pictorially illustrated on the right-hand side of the diagram in which to respective sections of 32 FFT follow one another. As also described with respect to other embodiments, each respective section may be separately encoded.

As can be seen, this embodiment 3500 may be viewed as providing for a efficiency relatively less than the previous embodiments 3300 and 3400, in that, this embodiment 3500 employees a SIG field that now spans three symbols instead of 2 symbols for 64 FFT. For the other FFT sizes (e.g., 128, 256, or 512), the design employed for the 64 FFT is repeated along the horizontal wartime access. For example, for 128 FFT, the 64 FFT would be repeated twice; for 256 FFT, the 128 FFT would be repeated twice; etc. If desired within such higher FFT sizes, each different than respective section may be separately encoded.

Figure 22:
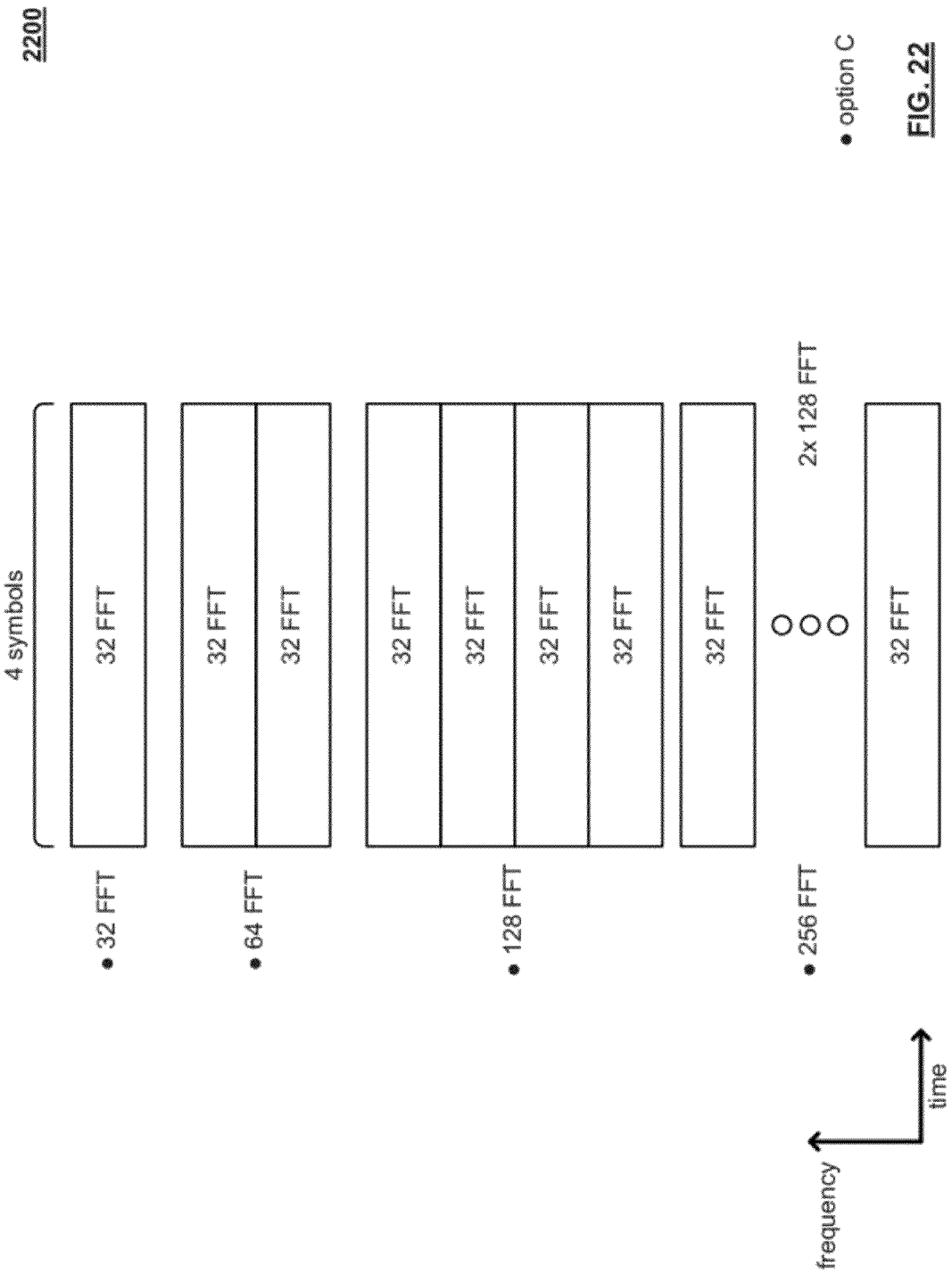
FIG. 22 illustrates an embodiment of a relatively low efficiency coexistence option (shown as option C).

FIG. 22 illustrates an embodiment 2200 of a relatively low efficiency coexistence option (shown as option C). Comparing this diagram to the previous two diagrams, it may be noted that this diagram has a relatively lower efficiency than the other two. For example, this diagram may be viewed as providing for a relatively lower efficiency than the other two options described with reference to option A and B.

In this diagram, the SIG field for 64 FFT and certain other FFT sizes (e.g., 128, 256, or 512) is a full duplicate of the SIG field for 32 FFT. That is to say, considering an embodiment in which the 32 FFT SIG stands 4 respective symbols, then the 64 FFT SIG is twice as high vertically along the frequency axis as the 32 FFT. Analogously, the 128 FFT SIG is twice as high vertically along the frequency axis as the 64 FFT. Also analogously, the 256 FFT SIG is twice as high vertically along the frequency axis as the 128 FFT. Generally speaking, as the size of the FFT scales, so does the respective size along the frequency axis. When comparing this diagram to the previous two diagrams, it may be seen that this diagram has a relatively lower efficiency for 64 FFT and certain other FFT sizes (e.g., 128, 256, or 512) as the SIG field stands 4 symbols instead of 2 symbols.

As the reader will understand, a variety of different options for packing a given number of bits into certain time and frequency combinations is presented herein in such a way that different respective communication devices will be able to receive and process such packets. For example, within such communication system embodiments in which different communication devices are implemented that have different capabilities, appropriate design of the time and frequency combination employed for communicating such SIG field information may be made in such a way that any communication device within the communication system will be able to receive and process that information.

For example, considering an implementation in which one or more communication devices operate in accordance with communication channels of a first width, and one or more other communication devices operate in accordance with communication channels of a second width, it may be desirable that all such communication devices will be able to receive and process packets according to the most narrow of those respective communication channel widths. For a more specific example, considering an implementation in which one or more communication devices operate in accordance with 20 MHz channels (e.g., such as in accordance with IEEE 802.11ac), and one or more other communication device is operative in accordance with 2 MHz channels [with a down-clock factor of 10] (e.g., such as in accordance with IEEE 802.11 ah, which may be implemented in accordance with a down-clocking architecture as described herein based upon IEEE 802.11ac, down-clocked by a factor of 10), by employing one or more appropriately designed time and frequency combinations, each of the respective communication devices within the communication system will be able to appropriately receive and process packets regardless of the particular communication channel width with which that given communication device operates.

It is also noted that the in accordance with various aspects, and their equivalents, of the invention, may also be extended to an STF design implemented in accordance with 32 FFT. For example, somewhat analogous to the design presented herein with respect to 64 FFT, the STF of a preamble may be implemented to modulate every fourth tone to allow for repetition every eight ($8^{th}$) samples for use in accordance with timing acquisition. Below, one possible embodiment of a sequence with a relatively low PAPR is presented:

stf_tone_index=[–12:4:–4, 4:4:12] (indicating tones [–12 –8 –4 4 8 12])

Values: [1 –sqrt(2), 1, –1, –sqrt(2), –1] papr=1.3 dB
stf_tone_index=[–12:4:–4, 4:4:12]
Values: [1, –2, 2, –2, –2, –1] papr=0.45 dB, and the respective values may be scaled accordingly as follows:
stf_tone_index=[–12:4:–4, 4:4:12]
Values: [1, –2, 2, –2, –2, –1]×(1+j) (where j=sqrt(–1)) papr=0.45 dB
stf_tone_index=[–12:4:–4, 4:4:12]; or as follows:
Values: [1, –2, 2, –2, –2, –1]×(1+j)×k (where j=sqrt(–1), and k is a normalization factor) papr=0.45 dB Such sequences may also be normalized (e.g., based on the normalization factor, k) to have a desired or preferred power. As may be understood with respect to the tone indices above, the respective power or energy on the tones of the STFs are not necessarily equal. For example, the respective power or values associated with the tone indices of an STF need not all be the same. Generally speaking, any desired profile may be employed such that there is non-equal power across the STF tone indices, and this can operate to provide for a relatively low peak to average power ratio (PAPR). In one possible preferred embodiment, the respective power or energy on the tones on the outer edges of the STFs above are relatively lower than the power or energy on the tones more centrally located within the STFs above. That is to say, in one such embodiment, the power or energy on the tones on the outer edges of the STFs above are tapered with respect to the power or energy on the tones more centrally located within the STFs above. Again, however, generally, any desired profile may be employed such that there is non-equal power across the STF tone indices.

A similar convention is presented just above as has been presented with respect to other embodiments presented elsewhere herein. For example, in accordance with a mathematical depiction of the tone index for the STF, the values [which may be viewed as being the actual values of an STF sequence] vary between −12 and −4 via step of 4, and also between 4 and 12 via step of 4. The values depicted are the actual values of the STF sequence. Instead of employing only values of +1 or −1, additional values including the square root of two, and its negative, may be employed for effectuating a relatively lower PAPR.

In order to provide preamble classification between the two different types of preamble formats (e.g., the extended range preamble and the regular or modified IEEE 802.11ac preamble), and analogous approach as presented above with respect to an STF design in accordance with 64 FFT may also be adapted for application here with respect to an STF design in accordance with 32 FFT. For example, by using two different periodicities (e.g., 8 and 11, 8 and 12, or 8 and 16), differentiation between the two respective preamble types may be made in accordance with an appropriately implemented auto-correlator match to the correct periodicity. For example, when the auto-correlator is appropriately matched to the correct periodicity, it will have a relatively higher peak.

In order to generate a periodicity of 16, one embodiment may be implemented by reusing the STF sequence in accordance with 64 FFT, as presented elsewhere herein, and in conjunction with modulation of every second subcarrier thereof. For example, in order to generate a periodicity of 11, an appropriately selected FFT size of 33 FFT may be employed in conjunction with modulation of every third subcarrier.

Figure 23:
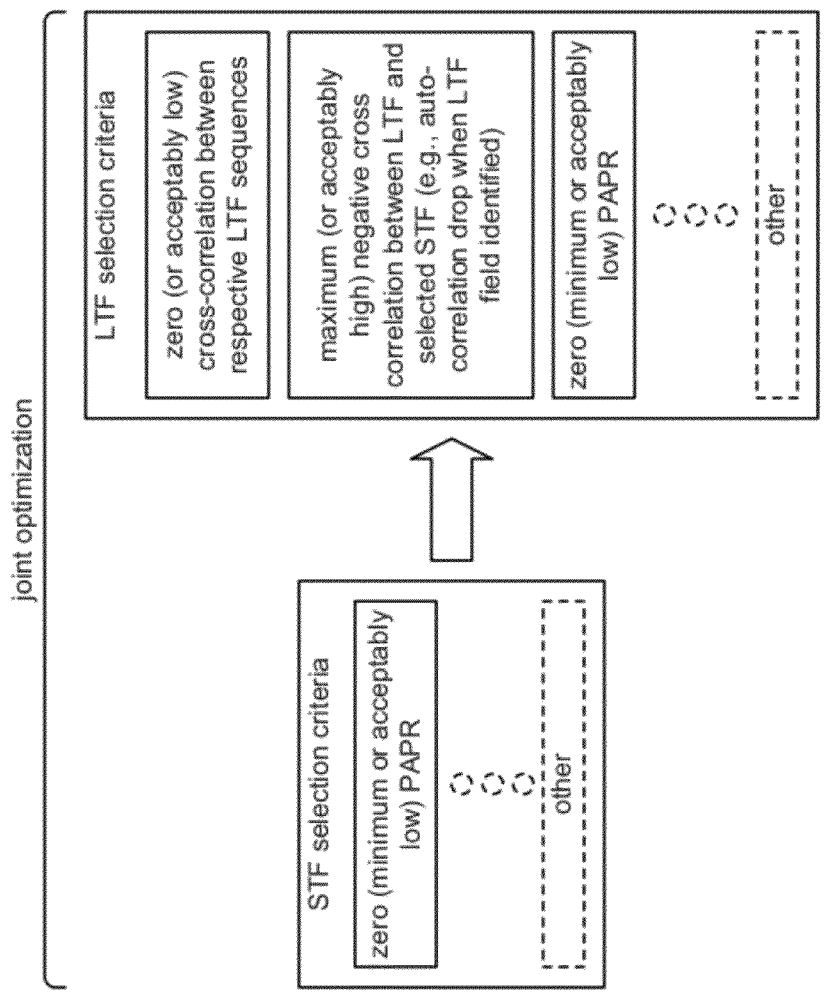
FIG. 23 illustrates an embodiment of design criteria employed in accordance with joint optimization of long training field (LTF) and short training field (STF) sequences based on one or more parameters.

Analogously, in order to generate a periodicity of 12, an appropriately selected FFT size of 36 FFT may be employed in conjunction with modulation of every third subcarrier. Below, three different examples of an STF sequence are presented along with their respective PAPRs.

stf_seq=[1 −1 1 1 1 −1 −1 −1], papr=2.7 dB
stf_seq=[−sqrt(2) sqrt(2) sqrt(2) −sqrt(2) −1 −1 −sqrt(2) −1], papr=1.9 dB
stf_seq=[1 −2 1 1 −sqrt(2) −sqrt(2) −1 −1], papr=1.2 dB FIG. 23 illustrates an embodiment 2300 of design criteria employed in accordance with joint optimization of long training field (LTF) and short training field (STF) sequences based on one or more parameters. In certain prior embodiments and/or diagrams, design of respective LTF sequences and STF sequences have been made independently with respect to one another. That is to say, design of certain LTF sequences have been made independently with respect to STF sequences, and vice versa. In this embodiment 2300 and others, joint optimization of LTF and STF sequences (e.g., 32 FFT LTF and STF sequences) is made based upon consideration of one or more parameters jointly affecting and treating off between the respective LTF and STF sequences. For example, in the process of performing timing acquisition, a receiver communication device may be implemented to lock on to the STF sequence and then to use the fact that the LTF sequence is different, to a certain or acceptable degree with respect to the STF sequence, in order to detect the start of the LTF field within a received signal and therefore identify the beginning of the packet. It is noted that the LTF field may be used for channel estimation, and such channel estimation operations generally perceived packet decoding. Generally speaking, the distinctions and characteristics that differentiate the STF sequence and the LTF sequence may be used to detect the start of the LTF field and consequently the start of the packet.

As such, herein, jointly designed LTF and STF sequences may be made such that a receiver communication device can better benefit in the acquisition process. For example, in accordance with using an STF sequence having a relatively lowest, or acceptably low, peak average power ratio (PAPR), then an appropriately selected LTF sequence may be made based upon one or more additional criteria. As may be understood, there is joint optimization and consideration in designing and selecting respective LTF and STF sequences. Again, rather than design the respective LTR sequences and STF sequences independently with respect to one another, joint consideration is made between them which may also involve making one or more trade-offs between the one or more respective design criteria.

In accordance with one possible embodiment of joint optimization of an LTF and STF sequence, such as particularly directed towards 32 FFT LTF and STF sequences, and STF sequence may be initially selected. Any one or more criteria may be employed in accordance with selecting a candidate STF sequence.

In one embodiment, an STF sequence particularly tailored for operation in accordance with IEEE 802.11ah developing standard, recommended practices, etc. having a PAPR of 0.45 dB may be selected as a candidate STF sequence. Then, joint optimization in accordance with selecting an LTF sequence based upon the candidate STF sequence may be performed based upon one or more design criteria.

For example, one particular design criterion may be to ensure zero, or an acceptably low valued, cross-correlation between each respective candidate LTF sequence and the 64 FFT LTF sequence. Of course, it may be very difficult to ensure exactly zero (0) cross-correlation value, but a cross-correlation value having a relatively low or acceptably low value between each respective candidate LTF sequence and the 64 FFT LTF sequence. Such a cross-correlation value may be specified particularly in accordance with the metric described with respect to ensuring that the 32 FFT LTF sequence and the 64 FFT LTF sequence are orthogonal with respect to one another at least with respect to one of the following considerations and/or metrics:

$$\sum_k p_{32}(k)p_{32}(k+1)^* p_{64U}(k)p_{64U}(k+1)^* = 0$$

$$\sum_k p_{32}(k)p_{32}(k+1)^* p_{64D}(k)p_{64D}(k+1)^* = 0$$

Also, it is noted that a relatively higher cross-correlation value may be allowed in trade-off if one or more other constraints may not be able to be met. For example, a designer is given a wide degree of latitude in allowing movement of one parameter at the expense of or in reaction to another parameter.

In addition, a maximum or relatively high (to an acceptable degree), negative cross-correlation between the candidate STF sequence and an LTF sequence may be another design criterion. For example, based upon the candidate STF, and appropriately selected LTF sequence may be made such that the negative cross-correlation there between will allow for a relatively quick drop of the auto-correlation metric. Such negative cross-correlation between the candidate STF sequence and an appropriately selected LTF sequence can allow for better detection of the start of the LTF field and therefore the start of the packet. Various examples of auto-correlation value drop off are illustrated with respect to FIG. 24.

Yet another design criterion may be associated with insuring that 0 dB (e.g., minimum or relatively low (to an acceptable degree, if not specifically 0 dB)) peak to average power ratio (PAPR) is achieved. For example, in accordance with IEEE 802.11ah developing standard, recommended practices, etc., a relatively low PAPR can also mean a relatively low PAPR of a sequence with flipped polarity in the pilot locations of the LTF. Because of these properties, the two respective numbers may be checked with respect to one another. In certain situations, PAPR values lower than approximately 6 dB may be viewed as being acceptable sent the data PAPR made generally be in the range around approximately 9 dB. Of course, it is noted that various trade-off considerations may be made with respect to these various design criteria, parameters, constraints, etc. (e.g., cross-correlation, PAPR, auto-correlation drop [rate thereof], etc.).

Figure 24:
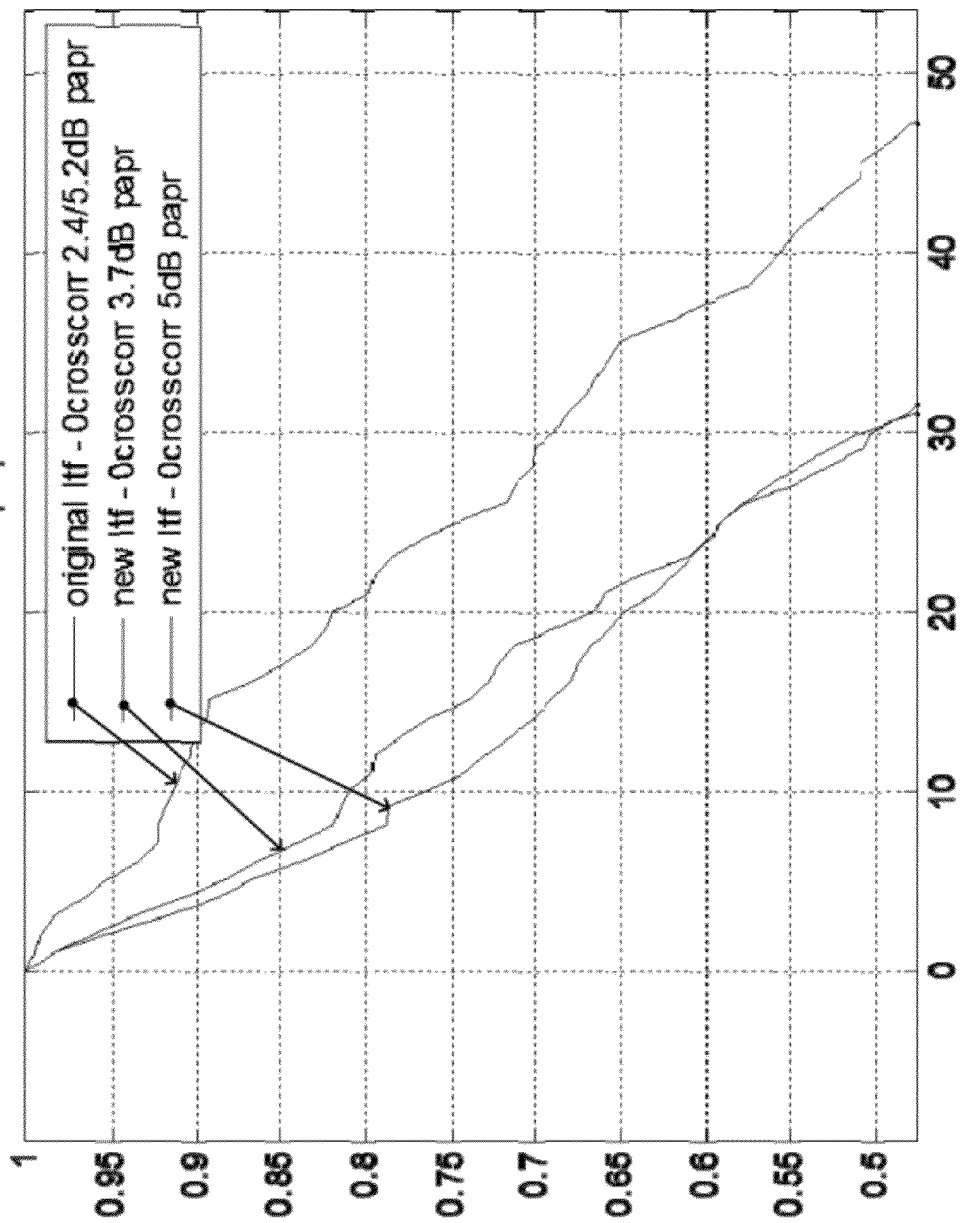
FIG. 24 illustrates an embodiment of auto-correlation value drop off based on different respective designs of LTF and STF sequences.

FIG. 24 illustrates an embodiment 2400 of auto-correlation value drop off based on different respective designs of LTF and STF sequences. With respect to this diagram, one of the sequences proposed above, as follows:

$p_{32}$=[0 0 0 −1 1 1 −1 1 −1 −1 1 −1 1 1 1 1 0 1 1 1 −1 1 1 1 −1 1 1 −1 −1 −1 1 0 0], where it is again assumed that 26 tones are used, is compared with two new sequences designed according to the joint optimization constraints are up. As may be seen with respect to the diagram, the output of an auto-correlation module, circuitry, functional block, etc. is used to acquire the packet at the boundary (e.g., time=0) between an STF field and an LTF field (e.g., the boundary indicating the transition between the STF and LTF fields). It is noted that the auto-correlation metric is very low when encountered with random noise, and the auto-correlation metric rises to a value of one (1) during the STF field. An appropriately and better designed LTF field may allow for a faster drop of the auto-correlation metric thereby assisting the receiver communication device to identify the LTF field more easily. For example, a faster drop of the auto-correlation metric can allow a receiver communication device to identify the LTF field by detecting that the auto-correlation metric value has dropped below a certain threshold. Additional considerations may be made such as considering the relative rate by which the auto-correlation metric value drops. As may be understood, there may be more than one potential candidate of an LTF, and consideration of one or more parameters may be used to determine whether or not to select one LTF sequence over others. For example, considering the two new LTF sequences, each respectively having zero cross-correlation with the candidate STF, and yet having different respective PAPR's (e.g., 3.7 dB and 5 dB), the LTF sequence having a PAPR of approximately 3.7 dB may be acceptable and suitable yet not providing specifically the fastest auto-correlation value drop rate. That is to say, an acceptable LTF sequence, sufficiently meeting one or more design constraints, may be selected because it may provide for optimization, in accordance with the joint optimization described herein, for one or more other design constraints. As may be understood, a designer is given great latitude in accordance with trading off the various respective design constraints in accordance with arriving at a jointly optimized STF and LTF design such that one or more considerations associated with the STF are made in accordance with one or more considerations associated with the LTF.

With respect to FIG. 24, the following LTF sequences are employed.

$1^{st}$ proposed LTF, optimal zero (0) cross-correlation metric value, 3.7 dB PAPR=[0 0 0 1 −1 1 −1 −1 1 −1 1 1 −1 1 1 1 0 −1 −1 −1 1 −1 −1 −1 1 −1 1 1 1 −1 0 0];

$2^{nd}$ proposed LTF, optimal zero (0) cross-correlation metric value, 5 dB PAPR=[0 0 0 1 −1 1 −1 −1 1 1 −1 1 1 1 −1 1 −1 −1 0 1 −1 −1 1 −1 1 −1 1 −1 1 1 1 −1 0 0];

Another LTF sequence (shown below as $3^{rd}$ proposed LTF, cross-correlation metric value of two (2), 4 dB PAPR), not necessarily having the optimal zero (0) cross-correlation metric value, but instead having a slightly higher cross-correlation value, namely, two (2), can achieve performance relatively similar to the $2^{nd}$ proposed LTF, optimal zero (0) cross-correlation metric value, 5 dB PAPR in FIG. 24.

$3^{rd}$ proposed LTF, cross-correlation metric value of two (2), 4 dB PAPR=[0 0 0 1 1 1 −1 −1 1 −1 1 1 −1 1 −1 −1 −1 0 1 −1 −1 1 −1 1 1 −1 1 −1 1 1 1 −1 0 0].

Also, it is noted that any of a number of different STF sequence candidates may be employed. For example, while certain of the embodiments described herein employ an STF sequence candidate particularly tailored for operation in accordance with IEEE 802.11ah developing standard, recommended practices, etc. having a PAPR of 0.45 dB may be selected as a candidate STF sequence, it is noted that other STF sequence candidates may alternatively be employed.

For example, one alternative STF sequence candidate includes equal power distributed across all of the respective tones. Unfortunately, this may come with an increased PAPR of approximately 2.3 dB.

stf_tone_index=[−12:4:−4, 4:4:12]

Values: [1, −1,1, −1, −1, −1]×(1+j) papr=2.3dB

In consideration of such an alternative STF sequence candidate, certain embodiments may appropriately select the $1^{st}$ proposed LTF, optimal zero (0) cross-correlation metric value, 3.7 dB PAPR (described above, and assuming a cross-correlation value of either the optimal value of zero (0) or the non-optimal value of two (2)) as the optimal LTF. That is to say, such joint optimization between STF and LTF sequences is a function of both the STF sequence candidate and the available LTF sequences associated therewith. When beginning with a different or alternative STF sequence candidate, a different one of a number of possible LTF sequences may be selected in accordance with forming the appropriate and more jointly optimal STF and LTF sequences. In the embodiment or implementation described in the few preceding paragraphs, when beginning with an alternative STF sequence candidate, in another one of the proposed LTF sequences may then be selected for combination with the alternative STF sequence candidate.

Figure 25:
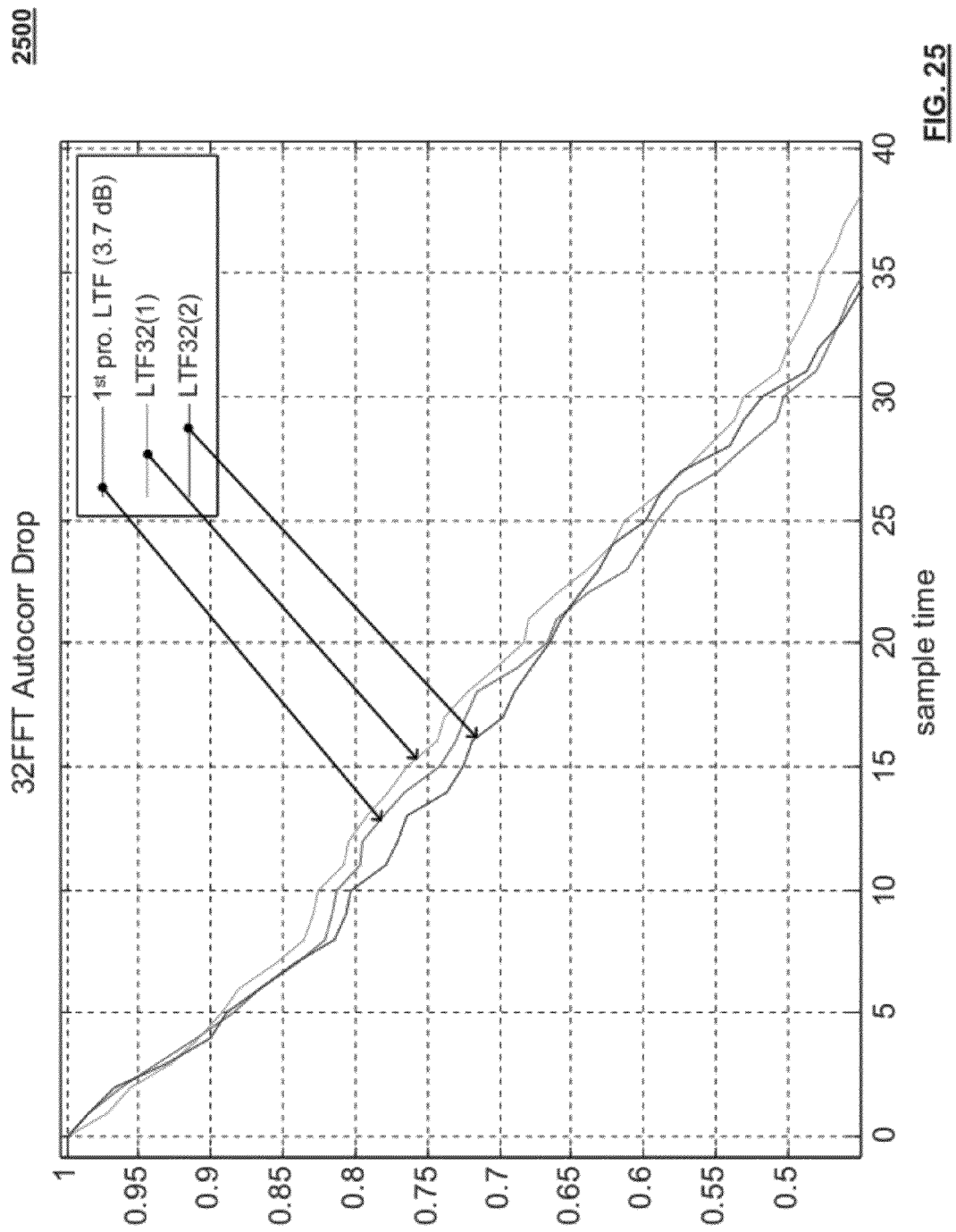
FIG. 25 illustrates an alternative embodiment of rapid auto-correlation value drop off based on different respective designs of LTF and STF sequences.

FIG. 25 illustrates an alternative embodiment 2500 of rapid auto-correlation value drop off based on different respective designs of LTF and STF sequences. The respective sequences described and discussed above operates in accordance with the assumption of a 64 FFT LTF sequence used for 2 MHz as shown as follows:

VHTLTF$_{-28,28}$={1, 1, LTF$_{left}$, 0, LTF$_{right}$, −1, −1}

In accordance with such definition, LTF$_{left}$ and LTF$_{right}$ are each a respective sequence of 26 tones or values drawn from the values of +1, −1.

However, it is also noted that the respective sequences used for 4/8/16 MHz differ in four outer tones, namely, 27, 28 and −27, −28. In some cases, these respective tones are not transmitted, and in embodiments, the respective tones' values are different. As such, two respective classes of solutions may be employed to maintain orthogonally between the 32 FFT LTF sequence and the 64 FFT sequence inner −26 to 26 tones only (e.g., $LTF_{left}$ and $LTF_{right}$).

Solution A—the sequence portion, $LTF_{right}$, is still orthogonal to the above described the $1^{st}$ proposed LTF, optimal zero (0) cross-correlation metric value, 3.7 dB PAPR defined above. However, with respect to such a proposed LTF, $LTF_{left}$ is not. Herein, a novel solution is proposed in which the sign of the left most value in $LTF_{left}$ (mapped to tone −26) is flipped from 1 (or +1) to −1 which will effectuate getting the cross correlation corresponding to the 32 FFT LTF (e.g., $1^{st}$ proposed LTF, optimal zero (0) cross-correlation metric value, 3.7 dB PAPR defined above) to be 0 again.

Solution B—another novel solution is presented herein which involves changing the 32 FFT LTF sequence to have all the right properties described above (e.g., such as with respect to joint optimization of LTF and STF sequences (e.g., 32 FFT LTF and STF sequences)) but with respect to the 64 FFT inner tones −26 to 26 ($LTF_{left}$ and $LTF_{right}$.

Based on a search, it is proposed to employ the following two newly designed optimal sequences:

LTF32(1)=[0 0 0 1 1 1 1 −1 1 −1 1 1 −1 1 1 1 0 −1 −1 −1 1 −1 −1 −1 1 1 −1 1 1 1 −1 0 0]

LTF32(2)=[0 0 0 1 −1 1 1 −1 1 −1 1 1 1 −1 1 1 1 1 0 1 −1 −1 1 −1 1 1 1 −1 1 1 1 −1 0 0]

The first sequence above, LTF32(1), has a maximum PAPR of 3.9 dB and the second sequence above, LTF32(2), has a maximum PAPR of 4.26 dB but also provides for a faster auto-correlation drop off.

In addition, it is noted that because certain embodiments may operate such that 2 MHz bandwidth signaling will occur mostly, with relatively less (if any) 4 MHz signaling, certain design optimizations may be made based on such considerations.

One of the solutions outlined below assumes that the receiver only looks at the inner 26 tones since they are the only common tones to all 2/4/8/16 MHz transmission bandwidth. However, as may be seen below, some better options have been found. Below, and with respect to corresponding diagrams, simulations for additive white Gaussian noise (AWGN) or normalized SCM are provided Urban Macro with 100,000 channel instantiations to provide robust misdetection performance at the 1% point. Misdetection error rate when 1 MHz is transmitted (left hand sided performance lines) and 2 MHz transmitted (right hand sided performance lines) [except for FIG. 31 in which 1 MHz is transmitted (right hand sided performance lines) and 2 MHz transmitted (left hand sided performance lines)].

The exact description of the current LTF sequences is as follows:

2 MHz
  1,1,$LTF_{left}$,0,$LTF_{right}$,−1,−1
4 MHz
  $LTF_{left}$,1,$LTF_{right}$,−1,−1,−1,1
  −1,1,1,−1,$LTF_{left}$,1, $LTF_{right}$
8 MHz
  $LTF_{left}$,1, $LTF_{right}$,−1,−1,−1,1,1
  −1,1,−1,1,1,−1,$LTF_{left}$,1, $LTF_{right}$,1,−1,1,−1
  1,−1,−1,1,$LTF_{left}$,1, $LTF_{right}$,−1, −1, −1,1,1
  −1,1, −1,1,1, −1,$LTF_{left}$,1, $LTF_{right}$ FIG. 26 illustrates an embodiment 2600 of LTF sequences (e.g., according to a current proposal). As may be seen with respect to this diagram, there may be effect of sequence mismatch on LTF classification. For example, the LTF based classification may be performed based on match filtering (e.g., for optimum performance, a receiver communication device needs to know the exact transmitted sequence).

It has been argued that since the receiver communication device only knows with certainty the inner 26 tones, it should only use those tones for classification. However, this constitutes a sequence mismatch if 28 tones are occupied (such as with 2 MHz BSS or 4/8 MHz BSS in most cases—which may be a vast majority of cases).

Herein, it is shown that contrary to some perspectives, the loss is higher when the receiver communication device assumes 26 tones for a 28 tone packet than when that receiver communication device assumes 28 tones for a 26 tone packet.

FIG. 27 illustrates an embodiment 2700 of performance diagrams showing the probability of mis-classification as a function of signal to noise ratio (SNR).

FIG. 28, FIG. 29, FIG. 30, and FIG. 31 illustrate various alternative embodiments 2800, 2900, 3000, and 3100 of performance diagrams showing the probability of mis-classification as a function of signal to noise ratio (SNR).

Figure 28:
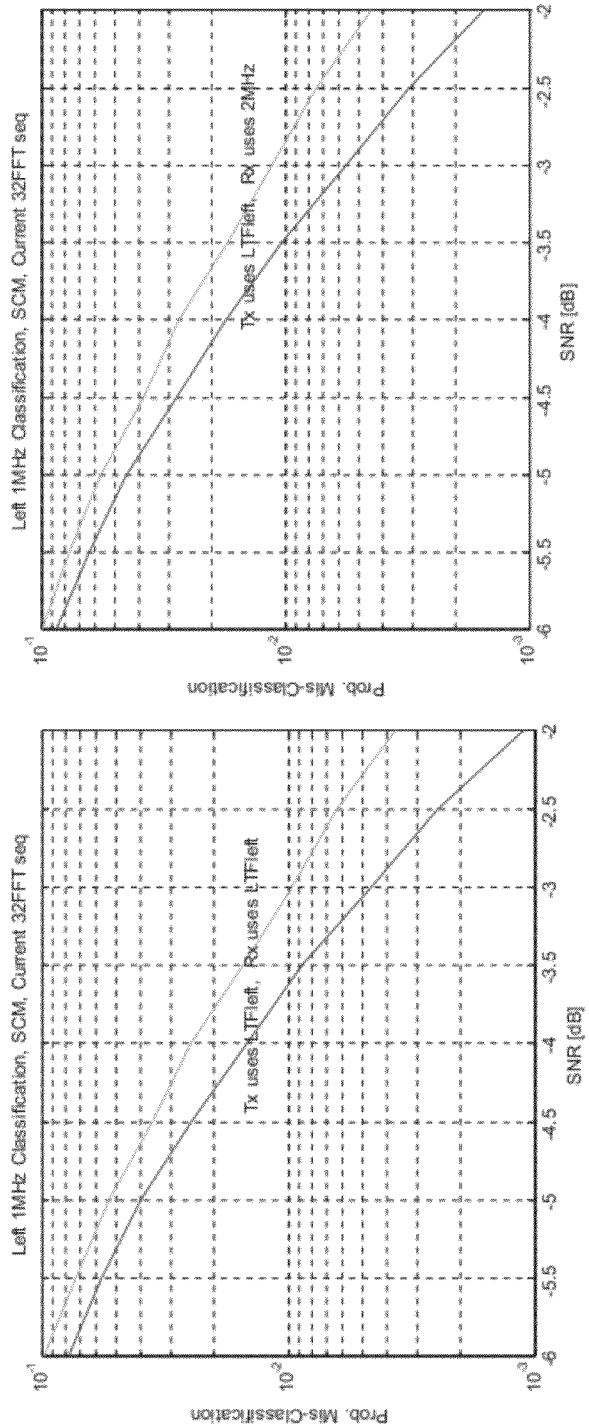
Figure 29:
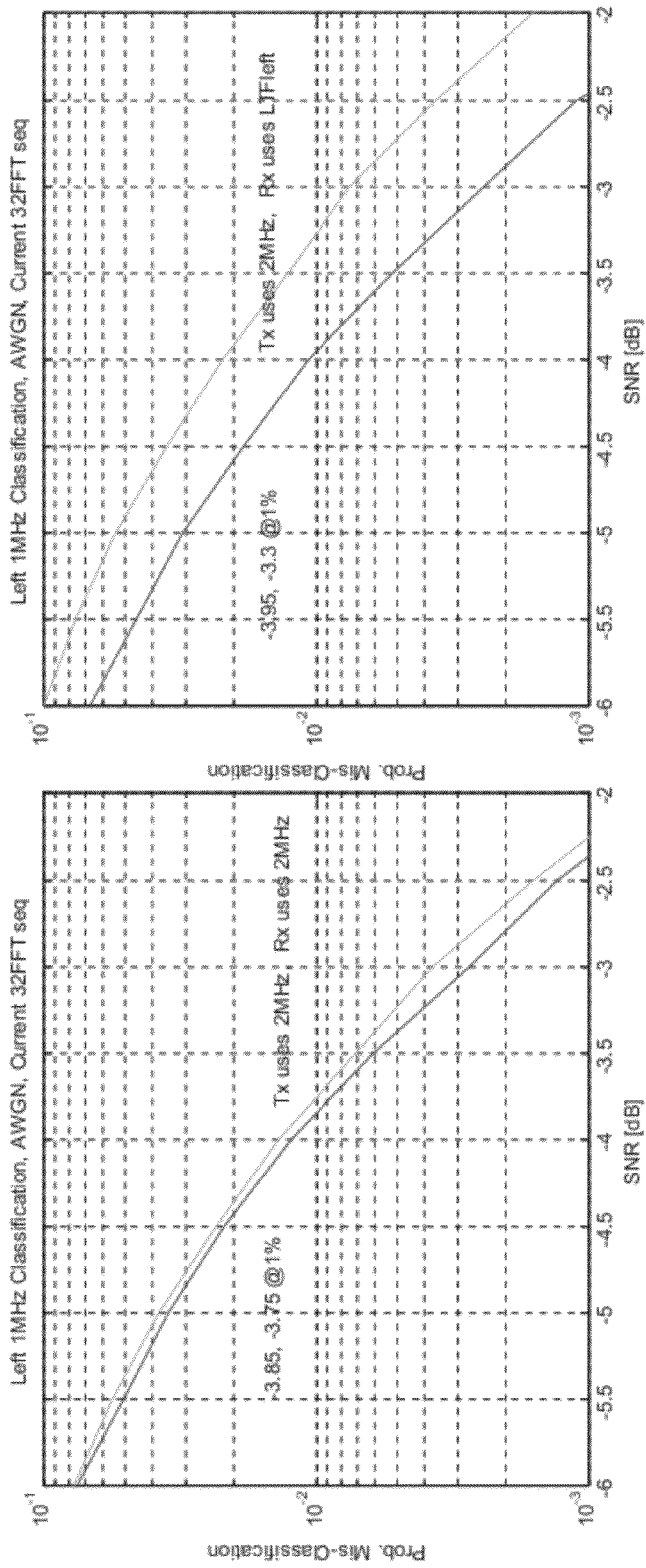

For example, referring to embodiment 2800 of FIG. 28, it can be seen that there is a loss of 0.1 dB in AWGN and 0.2 dB in SCM.

Figure 30:
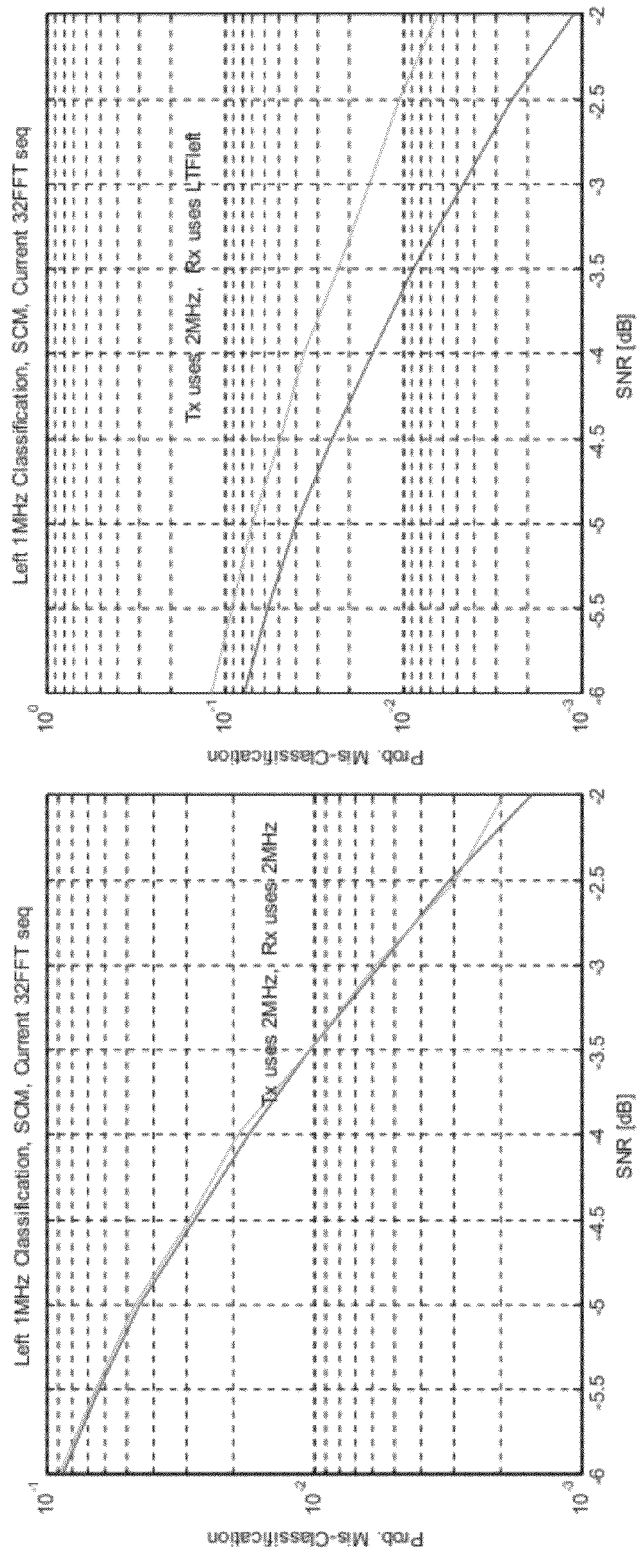

For another example, referring to embodiment 3000 of FIG. 30, it can be seen that there is a loss of 0.45 dB in AWGN and 1 dB in SCM.

Generally speaking, it may be concluded that, in certain embodiments, it may be preferable to use more tones in the metric employed by a receiver communication device.

For example, such a receiver communication device may be implemented as a modified and/or advanced receiver communication device. In such an embodiment, the receiver communication device may be implemented to build 2 metrics for the 2 MHz waveform: (1) one metric with 26 tones and (2) one metric with 28 tones (e.g., matched to the 2 MHz BSS) or one with 28 tones matched to a first sequence and another matched to a second sequence.

Any extra complexity associated with a receiver communication device is little to none (e.g., close to zero increase in complexity). The inner 26 tones are identical, the receiver communication device adds 2 more tones that are either 0,0 or 1,1 (for the left side) and chooses the highest metric to represent the 2 MHz hypothesis Comparing this performance diagram to previous performance diagrams, there is only a relatively small loss in the 1 MHz mis-detection, but there is also an improvement in 2 MHz mis-detection.

Similarly, a similar implementation may be extended to a receiver communication device looking at more than 2 hypotheses (e.g., two 28 tone sequences plus one 26 tone sequence).

In accordance with such an implemented receiver communication device, the receiver communication device may be implemented to:

1. Always use only 26 tones;
2. Always use 28 tones matched to a 2 MHz BSS LTF; and/or
3. Use an advanced receiver that used both options initially and when connected to a BSS use that BSS specific sequence.

Based on the frequency spectrum associated with IEEE 802.11ah outside the United State of America (USA), it is expected that only 1 and 2 MHz will most likely be used and hence the best strategy is to assume (at least initially) the 2 MHz LTF for the purpose of classification.

In the USA, it is possible that, in addition to 2 MHz BSS used for sensors, some 4 MHz or 8 MHz BSS(s) will be used for high speed extended range WiFi. In this case, and taking into account all bandwidth options, a device is expected to see up to 3 options depending on the 2 MHz channel number and only up to 2 options if 4 MHz BSS is not considered in the receiver initial metric (but rather only after it is identified as a 4 MHz BSS).

FIG. 32 illustrates an embodiment 3200 of different respective 2 MHz channels in 8 MHz. With respect to such an embodiment, a proposed revised 4/8 MHz LTF. In certain embodiments, it may be advantageous to align all 28 tones (where they exist) with the 2 MHz LTF which is expected to be the most commonly used in order to reduce receiver communication device processing options to a minimum.

FIG. 33 illustrates an embodiment 3300 contrasting of a first embodiment of LTF sequences (e.g., according to a current proposal) and a second embodiment of LTF sequences (e.g., according to an alternative proposal).

In one proposed embodiment, it is proposed to flip the sign on the highlighted tones on the left side:

The exact description of the current LTF sequences is as follows:

2 MHz
1,1,$LTF_{left}$,0,$LTF_{right}$,-1,-1
4 MHz
$LTF_{left}$,1, $LTF_{right}$,-1,-1,-1
-1,1,1,-1,$LTF_{left}$,1, $LTF_{right}$
8 MHz
$LTF_{left}$,1, $LTF_{right}$,-1,-1,-1,1,1
-1,1,-1,1,1,-1,$LFT_{left}$,1, $LTF_{right}$,1,-1,1,-1
1,-1, -1,1,$LTF_{left}$,1, $LTF_{right}$,-1,-1,-1,1,1
-1,1,-1,1,1,-1,$LTF_{left}$,1, $LTF_{right}$ Certain bold faced tones (e.g., red color or the −1 to the left of $LTF_{left}$ of 4 MHz as well as those bold faced tones of 8 MHz) tones should be flipped to align with 2 MHz. Other bold faced tones (e.g., green color or those other bold faced tones of 4 MHz) are flipped to reduce 2 MHz PAPR down to 5.8 dB (8 MHz PAPR remains low at 5.6 dB.

After making such changes, the novel and newly proposed description for the LTF sequences is as follows:

2 MHz
1,1,$LTF_{left}$,0,$LTF_{right}$,-1,-1
4 MHz
$LTF_{left}$,1, $LTF_{right}$,-1,-1,-1,1
-1, -1,1,1,$LTF_{left}$,1, $LTF_{right}$
8 MHz
$LTF_{left}$,1 $LTF_{right}$,-1,-1,-1,1,1
-1,1,-1,1,1,1,$LTF_{left}$,1, $LTF_{right}$,-1,-1,1,-1
1,-1,1,1,$LTF_{left}$,1, $LTF_{right}$,-1,-1,-1,1,1
-1,1,-1,1,1,1,$LTF_{left}$,1 $LTF_{right}$ Other tone flipping is possible whereby the 2 tones on the left side of $LTF_{left}$ are aligned with the sequence 1,-1 but the disadvantage of that approach is that the 2 MHz sequence is changed and several metrics such as PAPR and auto-correlation will need to be checked.

Figure 34:
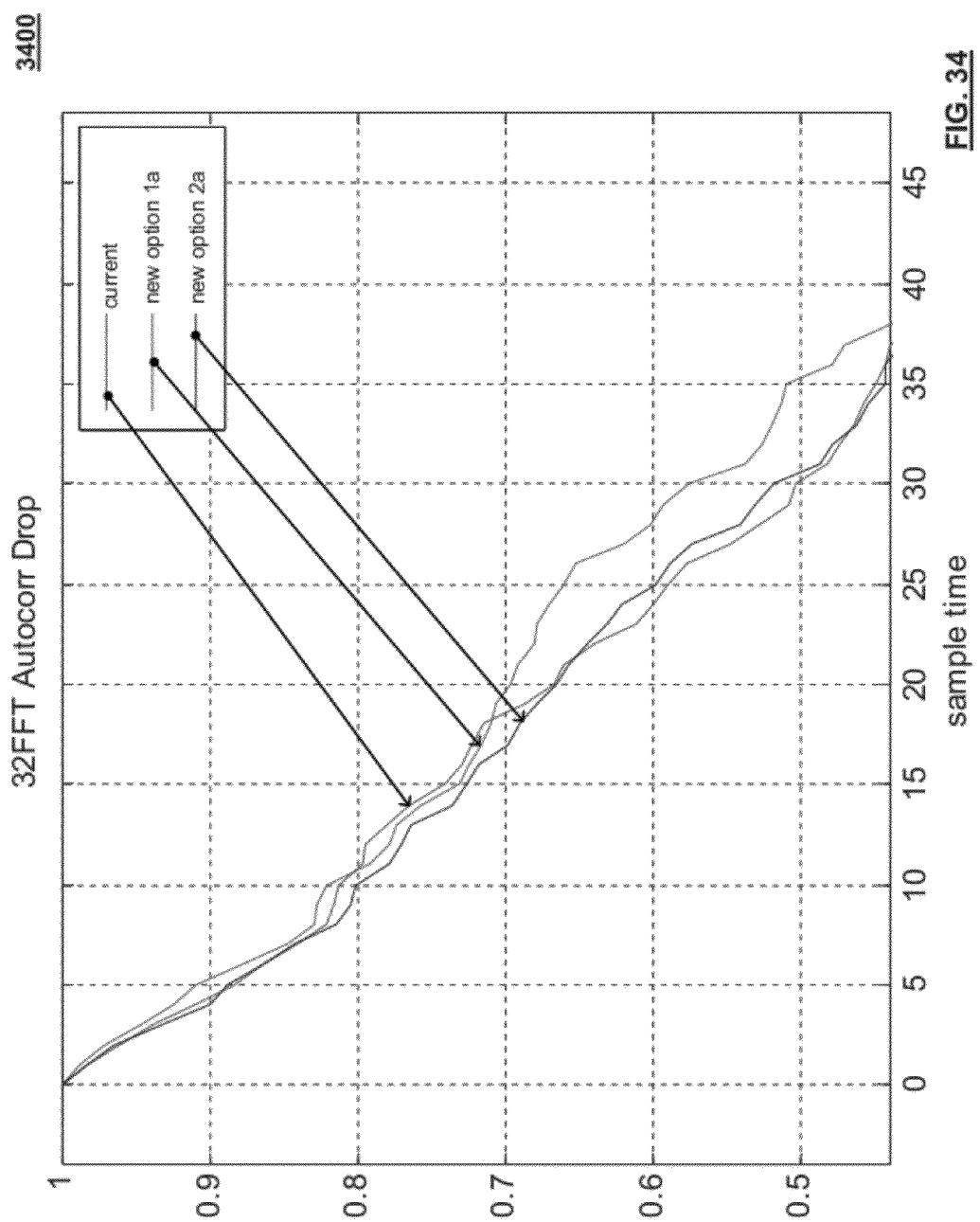
FIG. 34 illustrates an alternative embodiment of rapid auto-correlation value drop off based on different respective designs of LTF and STF sequences.

FIG. 34 illustrates an alternative embodiment 3400 of rapid auto-correlation value drop off based on different respective designs of LTF and STF sequences. This embodiment 3400 operates with respect to an alternative 1 MHz LTF sequence.

The current 1 MHz LTF is designed to provide cross-correlation 0 with the two halves of the 2 MHz LTF. However, it also has cross-correlation 0 with the inner 26 tones in the right half of the 2MHz LTF and cross-correlation 2 with the inner 26 tones in the left half. In certain embodiments, it is advantage to have a 1 MHz sequence having cross-correlation 0 with all 4 options above.

As such, a novel LTF sequence is proposed below having such property and with PAPR 4.2 dB
LTF32=[0 0 0 1 −1 1 1 −1 1 −1 1 1 −1 1 1 1 0 1 −1 −1 1 −1 1 1 1 −1 1 1 1 −1 0 0];

Its autocorr drop is as good and before and superior to at least one other other proposed LTF sequence (eg which doesn't have the above property).

In addition, other LTF sequences with the same cross-correlation properties but with slightly higher PAPR are proposed below:

LTF32=[0 0 0 −1 −1 1 1 −1 1 1 −1 1 1 1 −1 1 −1 −1 1 0 1 −1 −1 1 −1 1 1 1 −1 −1 −1 −1 −1 0 0]

LTF32=[0 0 0 −1 −1 1 1 −1 1 −1 1 1 1 −1 1 1 1 1 0 1 −1 −1 1 −1 1 1 −1 −1 −1 −1 −1 −1 0 0]

LTF32=[0 0 0 1 −1 1 1 −1 1 −1 1 1 1 −1 1 −1 1 1 0 1 −1 −1 1 1 −1 −1 −1 1 1 −1 1 1 1 −1 0 0]

LTF32=[0 0 0 1 −1 1 1 −1 1 −1 1 1 1 −1 1 −1 1 −1 0 1 −1 −1 1 1 1 −1 1 1 1 1 −1 1 1 −1 0 0]

LTF32=[0 0 0 1 −1 1 1 −1 1 −1 1 1 1 −1 1 −1 1 0 1 1 −1 −1 1 −1 1 −1 1 1 1 1 −1 1 1 −1 0 0]

LTF32=[0 0 0 1 −1 1 1 −1 1 1 −1 1 1 1 −1 1 1 1 0 −1 −1 1 −1 1 −1 1 −1 1 1 1 1 1 −1 1 1 −1 0 0]

LTF32=[0 0 0 −1 −1 1 1 1 1 −1 1 1 1 −1 1 −1 −1 1 0 1 1 −1 1 1 −1 −1 −1 1 1 1 −1 1 1 −1 0 0]

LTF32=[0 0 0 −1 −1 1 1 1 −1 1 −1 1 1 1 −1 1 −1 1 1 0 1 1 −1 1 1 1 −1 1 −1 −1 −1 −1 −1 1 0 0]

LTF32=[0 0 0 1 1 1 1 −1 1 −1 1 1 1 −1 1 −1 −1 1 0 1 −1 −1 1 −1 1 1 1 1 −1 1 1 −1 0 0]

Figure 35:
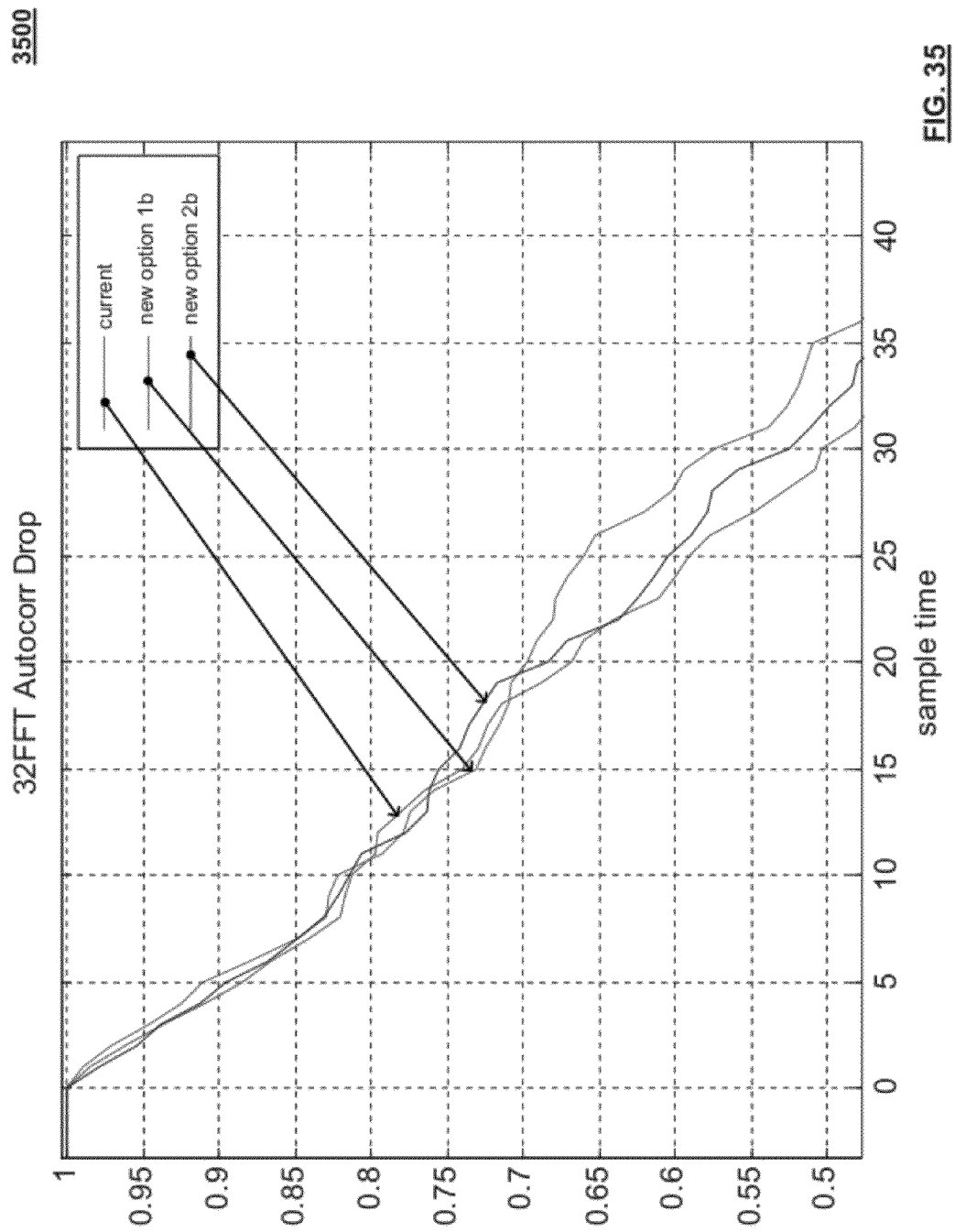
FIG. 35 illustrates an alternative embodiment of rapid auto-correlation value drop off based on different respective designs of LTF and STF sequences.

FIG. 35 illustrates an alternative embodiment 3500 of rapid auto-correlation value drop off based on different respective designs of LTF and STF sequences.

With respect to some other embodiments, the following sequence which has cross-correlation=0 with the left 28 tones and the left 26 tones but cross-correlation=2 with the right 28 and 26 tones does perform better than the current sequence by up to 0.1 dB in all cases but has higher PAPR (4.64 dB) and slightly slower auto-correlation drop as shown below.

LTF32=[0 0 0 −1 −1 1 1 1 1 −1 1 1 1 −1 1 −1 −1 1 0 1 1 −1 1 1 −1 −1 −1 1 1 1 1 −1 1 1 −1 0 0]

Figure 36:
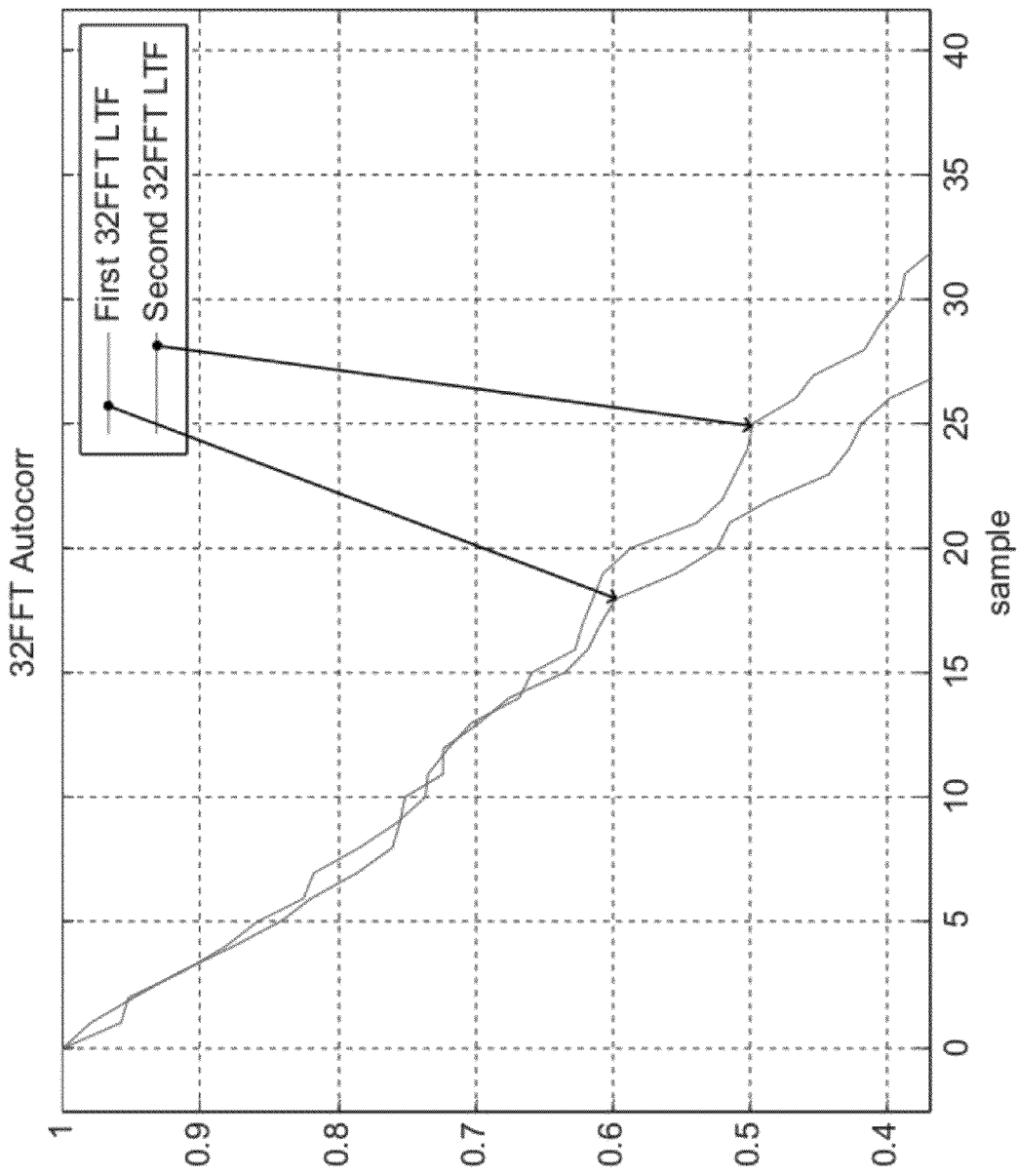
FIG. 36 illustrates an alternative embodiment of rapid auto-correlation value drop off based on different respective designs of LTF and STF sequences.

FIG. 36 illustrates an alternative embodiment 3600 of rapid auto-correlation value drop off based on different respective designs of LTF and STF sequences. Additional 32 FFT sequences maybe constructed in accordance with in accordance with various aspects, and their equivalents, of the invention, including those presented above with respect to option A. For example, the classification metric described above with respect to option A can be used to classify more than just 64 FFT transmission vs. 32 FFT transmission by defining more 32 FFT sequences.

For example, two different frame formats for 32 FFT may be defined and classified via two different 32 FFT sequences. One long frame format is used for extended range applications and uses a higher number of LTF symbols and a SIG field modulation by MCS0 with repetition 2. Also, one short frame format uses 2 LTF symbols as in current in accordance with IEEE 802.11 and a SIG field modulation by MCS0 as in current IEEE 802.11 compliant systems.

In some embodiments, such a new 32 FFT LTF sequence is designed to ensure that it meets the following criteria:

Zero cross correlation with the 64 FFT LTF sequence as specified by the described above with respect to the considerations and/or metrics described above such that a cross-correlation value may be specified particularly in accordance with the metric described with respect to ensuring that the 32

FFT LTF sequence and the 64 FFT LTF sequence are orthogonal with respect to one another at least with respect to one of the following considerations and/or metrics:

$$\sum_k p_{32}(k) p_{32}(k+1)^* p_{64U}(k) p_{64U}(k+1)^* = 0$$

$$\sum_k p_{32}(k) p_{32}(k+1)^* p_{64D}(k) p_{64D}(k+1)^* = 0$$

It is also noted that if other constraints can't be met, a relatively slightly higher cross correlation may be allowed in some embodiments. Zero cross correlation with the first 32 FFT LTF sequence as specified above, and again, a slightly higher cross correlation may be allowed if other constraints can't be met in some embodiments.

A relatively high negative cross correlation with the chosen STF may be provided to allow a quick drop off of the autocorrelator metric as shown in FIG. 36. For example, a relatively low PAPR (e.g., it is also noted that, in accordance with IEEE 802.11ah, that a relatively low PAPR can also mean low PAPR of a sequence with flipped polarity in the pilot locations of the LTF—so two numbers need to be checked in accordance with such an embodiment). Generally speaking, values lower than 6 dB may be viewed as being good or acceptable since DATA PAPR is around 9 dB.

In accordance with the various design criteria described above and elsewhere herein, the following sequence for LTF (shown below as LTF2) meets all such criteria:

LTF2=[0 0 0 1 -1 1 1 -1 1 -1 1 -1 -1 1 1 -1 0 -1 -1 -1 -1 -1 1 1 1 -1 -1 -1 1 -1 0 0]

This sequence provides a PAPR<4.1 dB, a cross correlation with the 64 FFT LTF metric value is 0, and the cross correlation with the first 32 FFT LTF sequence metric value is 1. As may be seen within FIG. 36, a rapid autocorrelation drop may be seen in the diagram whereby the first 32 FFT LTF in the diagram of FIG. 36 refers to the 1$^{st}$ proposed LTF, optimal zero (0) cross-correlation metric value, 3.7 dB PAPR described above and again shown below as follows:

1$^{st}$ proposed LTF=[0 0 0 1 -1 1 -1 -1 1 -1 1 1 1 -1 1 1 1 0 -1 -1 -1 1 -1 -1 1 1 -1 1 1 1 -1 0 0].

The second 32 FFT LTF in the diagram of FIG. 36 is LTF2 shown above and again shown below as follows:

LTF2=[0 0 0 1 -1 1 1 -1 1 -1 1 -1 -1 1 1 -1 0 -1 -1 -1 -1 -1 1 1 1 -1 -1 -1 1 -1 0 0]

Figure 37:
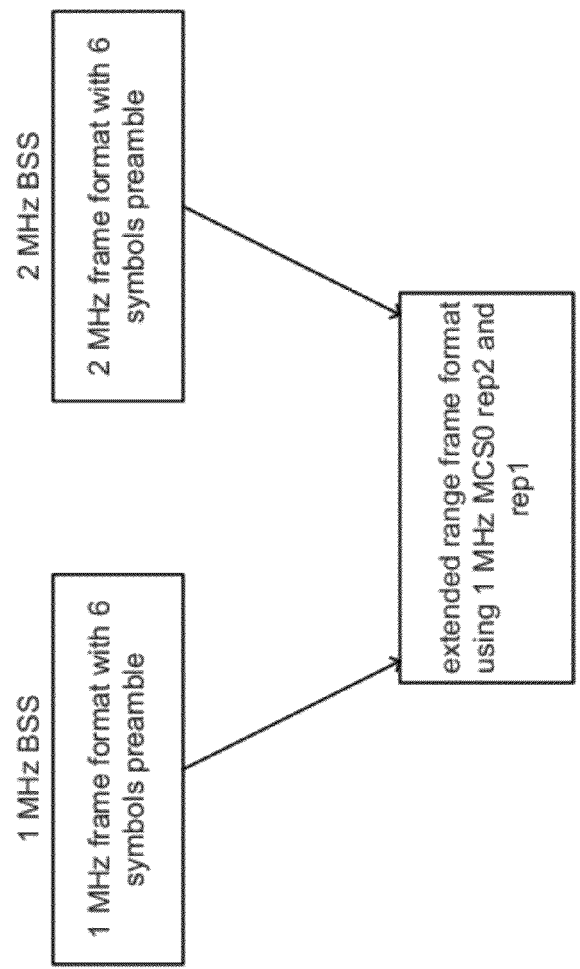
FIG. 37 illustrates an embodiment of symmetrical frame formats having a common number of symbols each.

FIG. 37 illustrates an embodiment 3700 of symmetrical frame formats having a common number of symbols each. In accordance with a novel design of frame formats including at least two different respective frame formats, two different 32 FFT frame formats may be implemented. For example, a regular (or normal) 1 MHz frame format may be used only for DATA MCS1 as described above, and an extended range frame format may be used only for MCS0 rep2 and MCS0. The reader is referred to the description and references to an extended range frame format as described above with respect to Alternative Preamble Design (1), such as elsewhere herein and following.

The extended range formats uses a relatively more robust frame format (e.g., relatively lower order modulations, relatively lower code rate, etc.) such as MCS0 rep2 and MCS0. For example, such a design allows for a 1 MHz preamble (e.g., such as composed as follows 4×STF+4×LTF+N×SIG symbols, where N is selectable in accordance with design choice). Such an extended range frame format may be limited to two different MCSs and the SIG field content may be optimized as desired, such as in accordance with as shown with respect to FIG. 40 in one preferred embodiment. The STF field may also be boosted for both MCSs to simplify the architecture and design of the extended range packet.

The regular 1 MHz frame format has a 6 symbol preamble (e.g., similar to the 2 MHz frame format). As such, it may be understood that both respective frame formats have a common and symmetrical number of symbols therein.

For example, in one embodiment, a 2 symbol STF (MCS1 requires 3 dB higher SNR than MCS0, whereas halving the STF loses only approximately 1.5 dB, e.g., thereby making such a frame format even more robust). Such an embodiment may also include a 2 symbol LTF (e.g., in most embodiments, this relatively small number of LTF's is sufficient sense 4 LTF's are used only for MCS0 rep2). Also, a two symbol SIG may be employed (e.g., such as for supporting 48 bits of information at MCS1 with content similar to a 2 MHz frame format).

As may be seen with respect to the diagram, a 2 MHz BSS only uses a 2 MHz frame formats or the extended range frame format. However, a 1 MHz BSS only uses a 1 MHz regular frame format or the extended range frame. The extended range frame format using 1 MHz MCS0 rep2 and rep1 is shared between the different respective BSS's.

Generally speaking, as may be understood with respect to the use of a different LTF design, and alternative sequence is presented herein. Also, appropriate division of such a sequence into two respective options allows for an improved classification process. Operating in accordance with the classification process described above and elsewhere herein, at least one additional LTF sequence is designed to assist in such classification between different respective frame formats. Generally speaking, by adding to different 32 FFT LTF sequences, one applicable for the regular/short frame format and another applicable for an extended range frame format, effective classification there between may be achieved.

Figure 38:
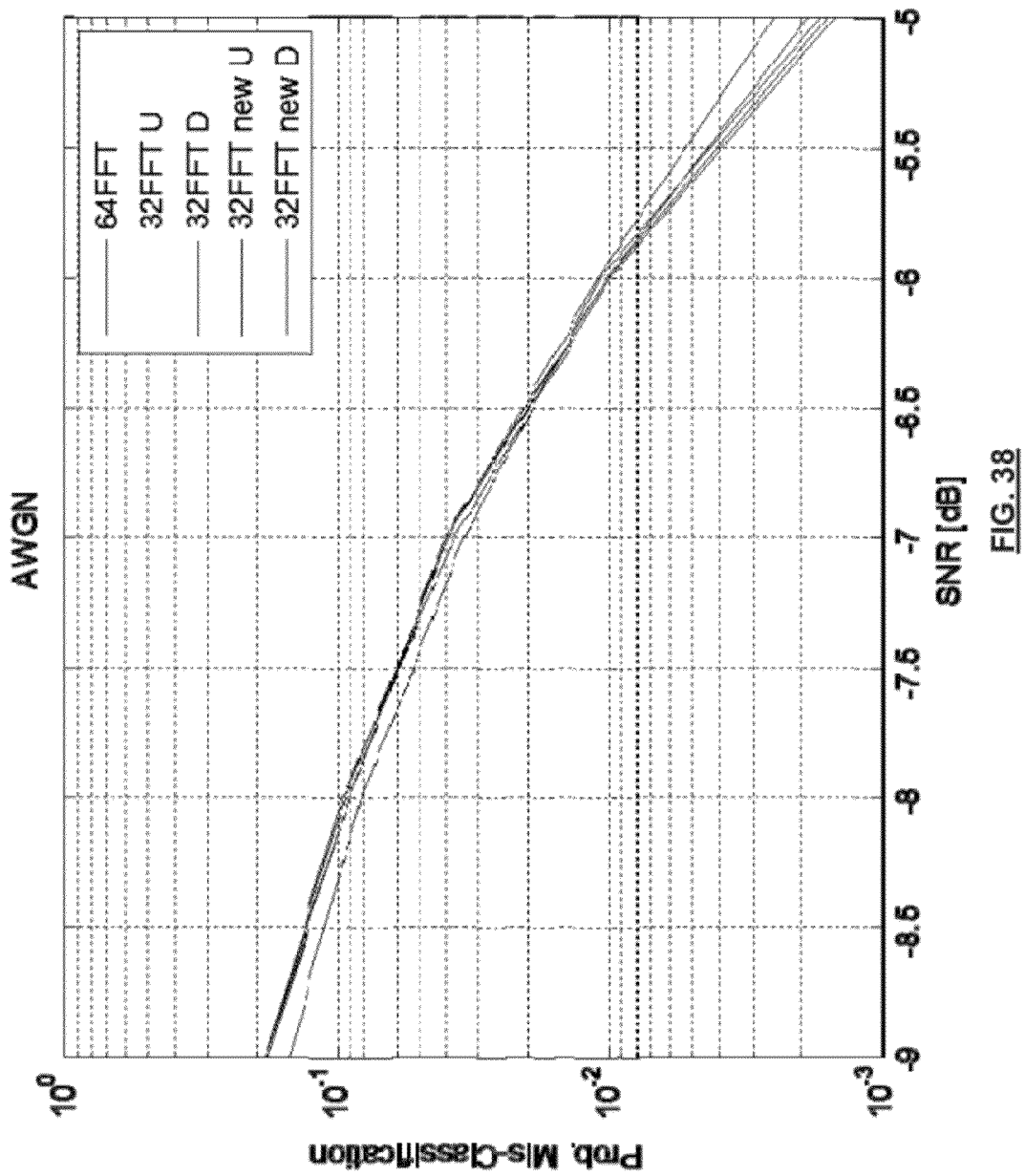
FIG. 38 illustrates an embodiment of a performance diagram of a probability of mis-classification as a function of signal to noise ratio (SNR).

FIG. 38 illustrates an embodiment 3800 of a performance diagram of a probability of mis-classification as a function of signal to noise ratio (SNR).

Figure 39:
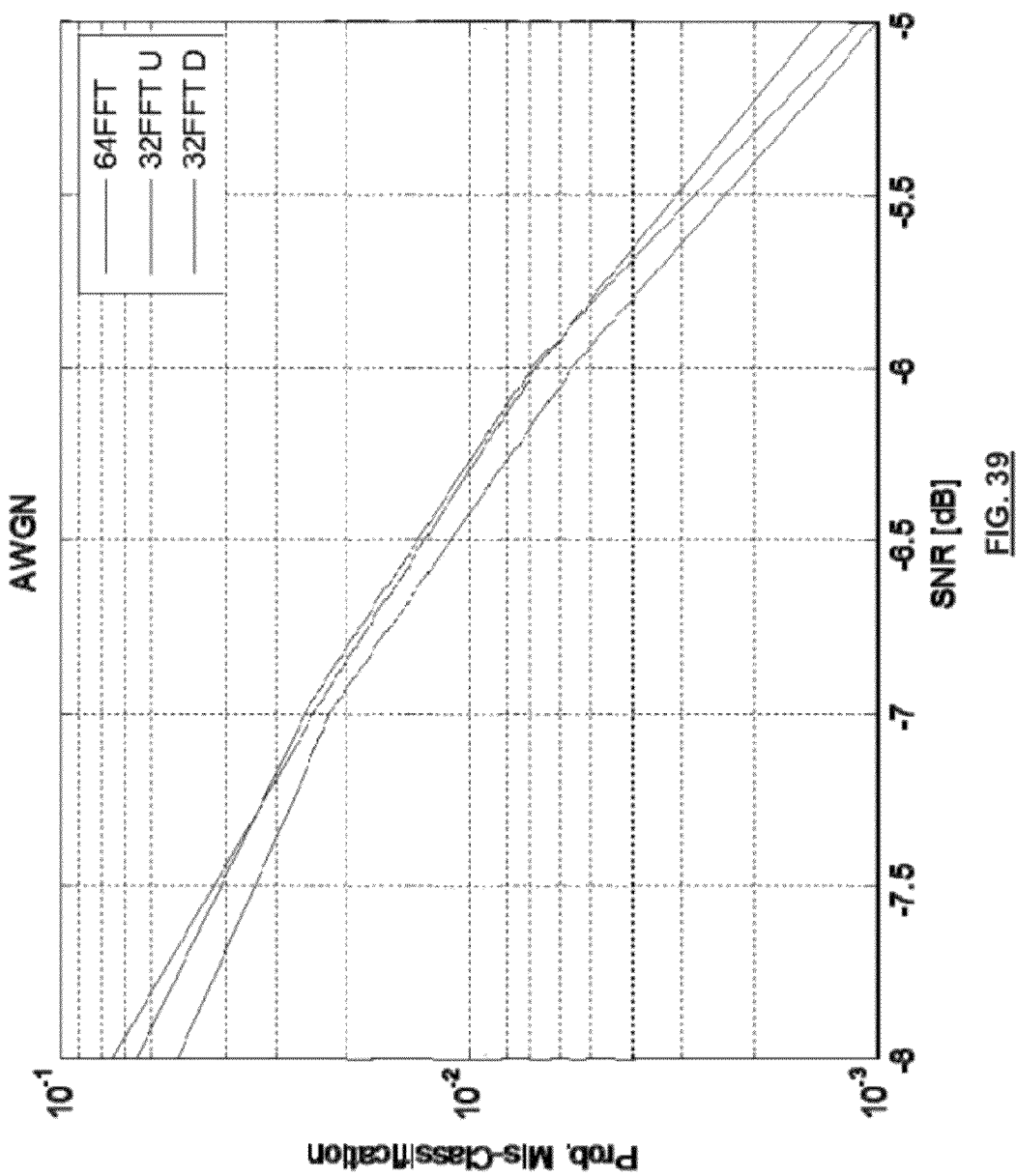
FIG. 39 illustrates an alternative embodiment of a performance diagram of a probability of mis-classification as a function of signal to noise ratio (SNR).

FIG. 39 illustrates an alternative embodiment 3900 of a performance diagram of a probability of mis-classification as a function of signal to noise ratio (SNR).

With respect to the probability of mis-classification as shown within FIG. 38 and FIG. 39, it may be seen that a device in a given BSS may be implemented to classify between two allowed frame formats in that given BSS, and therefore, such a device can reuse the LTF based or SIG field based classification approaches as described elsewhere herein. However, it is noted that an overlapping BSS (OBSS) may be possible where a 2 MHz BSS interferes with a 1 MHz BSS, and vice versa, and therefore more than two respective frame formats may need to be classified. Generally, operation in accordance with such an OBSS may necessitate a three way classification (or more). Generally speaking, the different classification methods as described herein may be expanded to classify all three waveforms with a minimum, if any, increasing complexity. The design of the new LTF as described above allows for three way classification with only a fraction of a decibel (dB) performance loss in comparison to the case of classifying only two respective frame formats (e.g., classifying three respective frame formats incurring only a very modest performance loss when compared classifying two respective frame formats).

Figure 40:
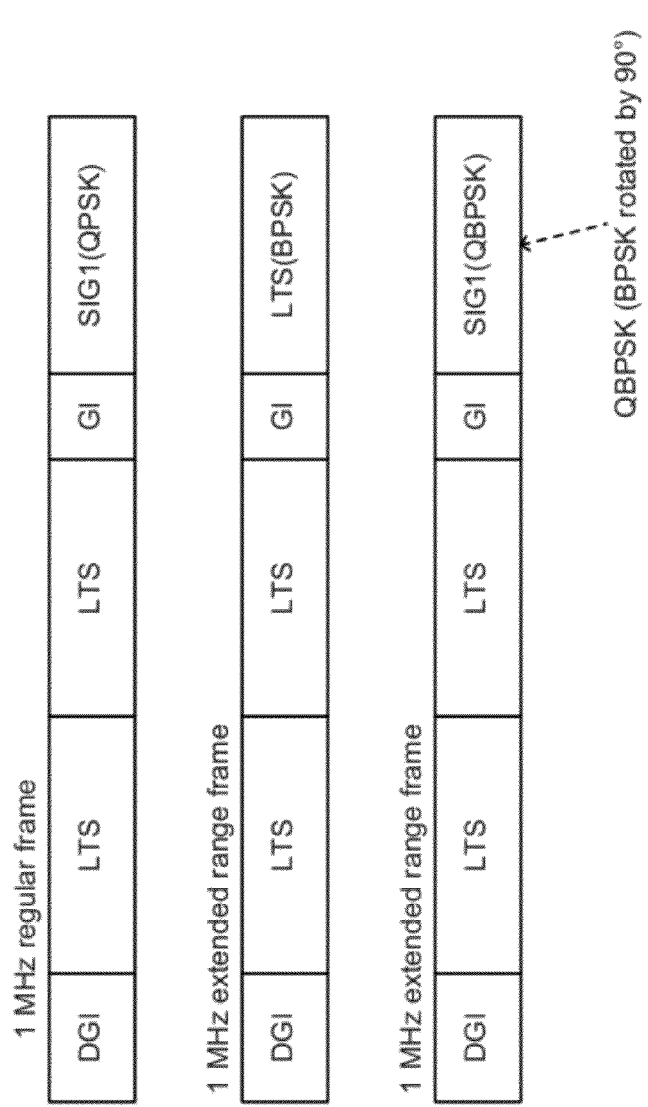
FIG. 40 illustrates an embodiment of different respective frame formats allowable for at least a 3-way classification.

FIG. 40 illustrates an embodiment 4000 of different respective frame formats allowable for at least a 3-way classification. The LTF field employed for the extended range frame format uses binary phase shift keying (BPSK) and the SIG field for the regular/normal 1 MHz frame format uses quadrature phase shift keying (QPSK). A device, such as a receiver, can compare the energy on the in-phase (I) axis to the energy on the quadrature (Q) axis to determine what type of packet and consequently what type of frame format it is receiving. For example, comparisons may be made such that the energy on the I axis and the energy on the Q axis are approximately the same, then it may be concluded that QPSK modulation is employed, and the frame format corresponds to 1 MHz regular/normal frame format. Alternatively, if it is determined that the energy on the I axis is significantly larger than the energy on the Q axis, then it may be concluded that BPSK modulation is employed, and the frame format corresponds to 1 MHz extended range frame format. Alternatively, if it is determined that the energy on the Q axis is significantly larger than the energy on the I axis, then it may be concluded that QBPSK modulation is employed, and the frame format corresponds to 2 MHz frame. As may be understood, such a QBPSK modulation type is analogous to BPSK modulation effectuated on the Q axis, such that the BPSK modulation is effectuated in a 90° rotation, such that the respective signal values correspond to ±j (e.g., as opposed to ±1 for BPSK). As may be understood, such an implementation may allow for a three way classification between at least three different respective frame formats.

Figure 41:
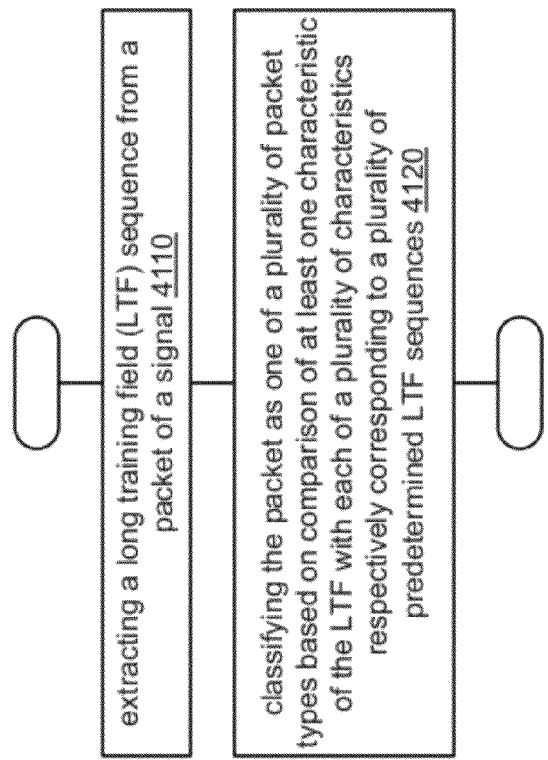

FIG. 41, FIG. 42, and FIG. 43 are diagrams illustrating embodiments of methods for operating one or more wireless communication devices.

Referring to method 4100 of FIG. 41, the method 4100 begins by extracting a long training field (LTF) sequence from a packet of a signal, as shown in a block 4110.

The method 4100 continues by classifying the packet as one of a plurality of packet types based on comparison of at least one characteristic of the LTF with each of a plurality of characteristics respectively corresponding to a plurality of predetermined LTF sequences, as shown in a block 4120. For example, one or more predetermined LTF sequences may be used for comparison with an LTF sequence within a packet of the signal. Any of a number of different types of processing may be performed to determine whether or not the LTF within the packet of a given signal corresponds sufficiently well to one of the predetermined LTF sequences to allow for classification of the packet (or signal) as one of a number of types Referring to method 4200 of FIG. 42, the at least one antenna of the communication device, the method 4200 begins by receiving a signal from at least one additional communication device, as shown in a block 4210. For example, within the context of wireless communications (e.g., such as within a wireless communication system operating in accordance with one or more standards, protocols, and/or recommended practices such as may be associated with one or more of IEEE 802.11x, where x corresponds to the version number, several of which have been described elsewhere herein), such a communication device may be an access point (AP) or a wireless station (STA), and the at least one additional communication device may similarly be an AP or a STA.

The method 4200 continues by operating a physical layer (PHY) of the communication device to support communications with the at least one additional communication device in accordance with a plurality of channel bandwidths, as shown in a block 4220. For example, one of the channel bandwidths may correspond to 1 MHz, while another of the channel bandwidths may correspond to 2 MHz. A PHY of the communication device may be implemented to perform adaptive and selective operation in accordance with any one of these respective plurality of channel bandwidths.

The method 4200 then operates by extracting a long training field (LTF) sequence from a packet of the signal, as shown in a block 4230. The method 4200 continues by classifying the packet as one of a plurality of packet types based on comparison of at least one characteristic of the LTF with each of a plurality of characteristics respectively corresponding to a plurality of predetermined LTF sequences, as shown in a block 4240

Referring to method 4300 of FIG. 43, the method 4300 begins by extracting a long training field (LTF) sequence from a packet of a signal, as shown in a block 4310. The method 4300 continues by performing frequency domain cross-correlation processing of the LTF with each of a plurality of predetermined LTF sequences to generate a plurality of frequency domain cross-correlation results, as shown in a block 4320.

Based on the plurality of frequency domain cross-correlation results, the method 4300 then operates by classifying the packet as one of a plurality of packet types, as shown in a block 4330.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein including one of more baseband processing modules, one or more media access control (MAC) layers, one or more physical layers (PHYs), and/or other components, etc. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

Mode Selection Tables:

TABLE 1

| | | | | | | | | | |
|---|---|---|---|---|---|---|---|---|---|
| 2.4 GHz, 20/22 MHz channel BW, 54 Mbps max bit rate | | | | | | | | | |
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |

TABLE 4

| | | | | | | | | | |
|---|---|---|---|---|---|---|---|---|---|
| 5 GHz, 20 MHz channel BW, 54 Mbps max bit rate | | | | | | | | | |
| Rate | Modulation | Code Rate | NBPSC | NCBPS | NDBPS | EVM | Sensitivity | ACR | AACR |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5-continued

Channelization for Table 4

| Channel | Frequency (MHz) | Country | Channel | Frequency (MHz) | Country |
|---|---|---|---|---|---|
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |

TABLE 10-continued

5 GHz, with 40 MHz channels and max bit rate of 486 Mbps

| Rate | TX Antennas | ST Code Rate | Modulation | Code Rate | NBPSC |
|---|---|---|---|---|---|
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. An apparatus comprising:
a communication interface configured to support communications with at least one additional apparatus in accordance with a plurality of channel bandwidths; and
a processor configured to:
extract a long training field (LTF) sequence from a packet; and
classify the packet as one of a plurality of packet types based on frequency domain cross-correlation processing of the LTF sequence with each of a plurality of predetermined LTF sequences, wherein:
a first of the plurality of predetermined LTF sequences is used for classification of the packet in accordance with a first of the plurality of channel bandwidths;
a second of the plurality of predetermined LTF sequences is used for classification of the packet in accordance with a second of the plurality of channel bandwidths; and
the LTF sequence or at least one of the plurality of predetermined LTF sequences being [0 0 0 1 −1 1 −1 −1 1 1 −1 1 1 −1 1 1 1 0 −1 −1 −1 1 −1 −1 −1 1 −1 1 1 1 −1 0 0].

2. The apparatus of claim 1, wherein:
a first of the plurality of predetermined LTF sequences being a 32 fast Fourier transform (FFT) LTF sequence; and
a second of the plurality of predetermined LTF sequences being a 64 FFT LTF sequence.

3. The apparatus of claim 1, wherein a first of the plurality of predetermined LTF sequences being orthogonal to a second of the plurality of predetermined LTF sequences such that the first of the plurality of predetermined LTF sequences having zero cross-correlation with the second of the plurality of predetermined LTF sequences or a cross-correlation less than a threshold.

4. The apparatus of claim 1, wherein:
a short training field (STF) within the packet and at least one of the plurality of predetermined LTF sequences having a negative cross-correlation greater than a first threshold; and
the STF within the packet and each of the plurality of predetermined LTF sequences respectively having a respective peak to average power ratio (PAPR) less than a second threshold.

5. The apparatus of 1 further comprising:
a wireless station (STA), wherein the at least one additional apparatus is an access point (AP).

6. An apparatus comprising:
a communication interface configured to support communications with at least one additional apparatus in accordance with a plurality of channel bandwidths; and
a processor configured to:
extract a long training field (LTF) sequence from a packet; and
classify the packet as one of a plurality of packet types based on comparison of at least one characteristic of the LTF with each of a plurality of characteristics respectively corresponding of a plurality of predetermined LTF sequences, wherein the LTF sequence or at least one of the plurality of predetermined LTF sequences being [0 0 0 1 −1 1 −1 −1 1 1 −1 1 1 1 −1 1 1 1 1 0 −1 −1 −1 1 −1 −1 −1 1 1 −1 1 1 1 −1 0 0].

7. The apparatus of claim 6, wherein:
a first of the plurality of predetermined LTF sequences being a 32 fast Fourier transform (FFT) LTF sequence; and
a second of the plurality of predetermined LTF sequences being a 64 FFT LTF sequence.

8. The apparatus of claim 6, wherein a first of the plurality of predetermined LTF sequences being orthogonal to a second of the plurality of predetermined LTF sequences such that the first of the plurality of predetermined LTF sequences having zero cross-correlation with the second of the plurality of predetermined LTF sequences or a cross-correlation less than a threshold.

9. The apparatus of claim 6 further comprising:
the processor configured to classify the packet as one of the plurality of packet types based on frequency domain cross-correlation processing of the LTF sequence with each of the plurality of predetermined LTF sequences.

10. The apparatus of claim 6, wherein:
a first of the plurality of predetermined LTF sequences for classification of the packet in accordance with a first of the plurality of channel bandwidths; and
a second of the plurality of predetermined LTF sequences for classification of the packet in accordance with a second of the plurality of channel bandwidths.

11. The apparatus of claim 6, wherein:
a short training field (STF) within the packet and at least one of the plurality of predetermined LTF sequences having a negative cross-correlation greater than a first threshold; and
the STF within the packet and each of the plurality of predetermined LTF sequences respectively having a respective peak to average power ratio (PAPR) less than a second threshold.

12. The apparatus of claim 6 further comprising:
an access point (AP), and the at least one additional communication device is a wireless station (STA).

13. The apparatus of claim 6 further comprising:
a wireless station (STA), wherein the at least one additional apparatus is an access point (AP).

14. A method for execution by a communication device, the method comprising:
operating a communication interface of the communication device to support communications with at least one additional communication device in accordance with a plurality of channel bandwidths;
extracting a long training field (LTF) sequence from a packet; and
classifying the packet as one of a plurality of packet types based on comparison of at least one characteristic of the LTF with each of a plurality of characteristics respectively corresponding of a plurality of predetermined LTF sequences, wherein the LTF sequence or at least one of the plurality of predetermined LTF sequences being [0 0 0 1 −1 1 −1 −1 1 −1 1 1 −1 1 1 1 0 −1 −1 −1 1 −1 −1 −1 1 −1 1 1 1 −1 0 0].

15. The method of claim 14, wherein:
a first of the plurality of predetermined LTF sequences being a 32 fast Fourier transform (FFT) LTF sequence; and
a second of the plurality of predetermined LTF sequences being a 64 FFT LTF sequence; and
the first of the plurality of predetermined LTF sequences being orthogonal to the second of the plurality of predetermined LTF sequences such that the first of the plurality of predetermined LTF sequences having zero cross-correlation with the second of the plurality of predetermined LTF sequences or a cross-correlation less than a threshold.

16. The method of claim 14 further comprising:
classifying the packet as one of the plurality of packet types based on frequency domain cross-correlation processing of the LTF sequence with each of the plurality of predetermined LTF sequences.

17. The method of claim 14, wherein:
a first of the plurality of predetermined LTF sequences for classification of the packet in accordance with a first of the plurality of channel bandwidths; and
a second of the plurality of predetermined LTF sequences for classification of the packet in accordance with a second of the plurality of channel bandwidths.

18. The method of claim 14, wherein:
a short training field (STF) within the packet and at least one of the plurality of predetermined LTF sequences having a negative cross-correlation greater than a first threshold; and
the STF within the packet and each of the plurality of predetermined LTF sequences respectively having a respective peak to average power ratio (PAPR) less than a second threshold.

19. The method of claim 14, wherein the communication device is an access point (AP), and the at least one additional communication device is a wireless station (STA).

20. The method of claim 14, wherein the communication device is a wireless station (STA), and the at least one additional communication device is an access point (AP).

* * * * *